US011811759B2

(12) United States Patent
Kii et al.

(10) Patent No.: US 11,811,759 B2
(45) Date of Patent: Nov. 7, 2023

(54) INFORMATION PROCESSING SYSTEM

(71) Applicant: MegaChips Corporation, Osaka (JP)

(72) Inventors: Yasuyuki Kii, Osaka (JP); Takashi Oshikiri, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 181 days.

(21) Appl. No.: 16/936,527

(22) Filed: Jul. 23, 2020

(65) Prior Publication Data

US 2020/0358763 A1 Nov. 12, 2020

Related U.S. Application Data

(63) Continuation of application No. PCT/JP2018/047739, filed on Dec. 26, 2018.

(30) Foreign Application Priority Data

Feb. 16, 2018 (JP) ................................. 2018-026198
Jul. 27, 2018 (JP) ................................. 2018-141312

(51) Int. Cl.
*G06F 15/173* (2006.01)
*H04L 9/40* (2022.01)
*H04L 67/01* (2022.01)

(52) U.S. Cl.
CPC .......... *H04L 63/0869* (2013.01); *H04L 67/01* (2022.05)

(58) Field of Classification Search
CPC ............................. H04L 63/0869; H04L 67/42
See application file for complete search history.

(56) References Cited

U.S. PATENT DOCUMENTS 7,363,501 B2    4/2008   Watanabe et al.
2002/0138752 A1  9/2002   Tanaka et al.
(Continued)

FOREIGN PATENT DOCUMENTS

JP      2002-305250 A    10/2002
JP      2004-173206 A     6/2004
(Continued)

OTHER PUBLICATIONS

International Preliminary Report on Patentability dated Aug. 18, 2020, issued in corresponding PCT/JP2018/047739.
(Continued)

*Primary Examiner* — Padma Mundur
(74) *Attorney, Agent, or Firm* — XSENSUS LLP

(57) ABSTRACT

An information processing system includes an information processing apparatus having a first function, and a server apparatus being configured to communicate with the information processing apparatus via a communication network. The information processing apparatus includes an operation control apparatus being configured to control the first function. The server apparatus transmits operation permission information indicating operation permission for the first function to the information processing apparatus, in response to satisfaction of a predetermined condition related to the information processing apparatus. The operation control apparatus activates the first function, in response to the operation permission information received by the information processing apparatus.

16 Claims, 47 Drawing Sheets

(56) References Cited

U.S. PATENT DOCUMENTS

| | | | | |
|---|---|---|---|---|
| 2006/0052134 A1* | 3/2006 | Sato | ................ | H04M 1/72403 |
| | | | | 455/556.1 |
| 2008/0046961 A1* | 2/2008 | Pouliot | ................ | H04L 63/20 |
| | | | | 726/1 |
| 2013/0311771 A1* | 11/2013 | Hoggan | ............... | H04L 9/3268 |
| | | | | 713/156 |

FOREIGN PATENT DOCUMENTS

| | | |
|---|---|---|
| JP | 4899248 B2 | 3/2012 |
| JP | 2013-020547 A | 1/2013 |
| JP | 2015-088129 A | 5/2015 |
| JP | 2016-218801 A | 12/2016 |

OTHER PUBLICATIONS

International Search Report and Written Opinion dated Mar. 12, 2019 for PCT/JP2018/047739 filed on Dec. 26, 2018, 8 pages including English Translation of the International Search Report.

* cited by examiner

F I G. 3
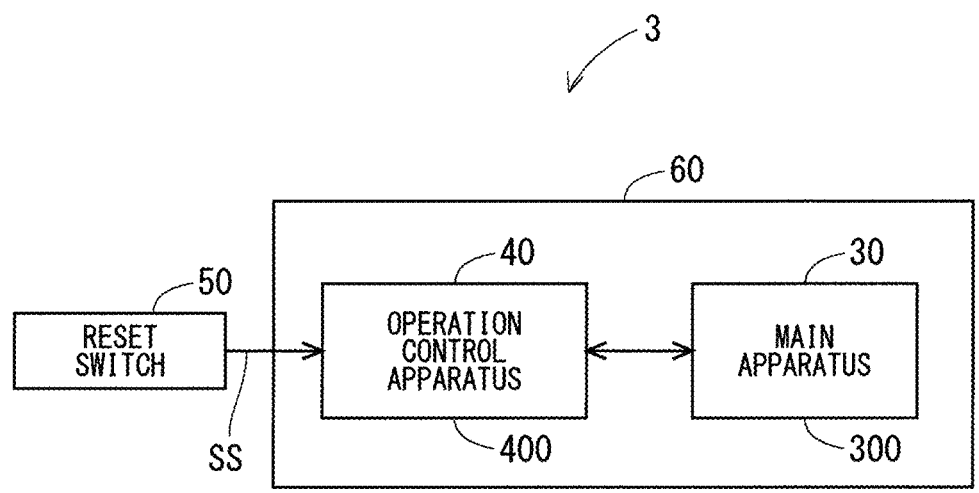

F I G. 8
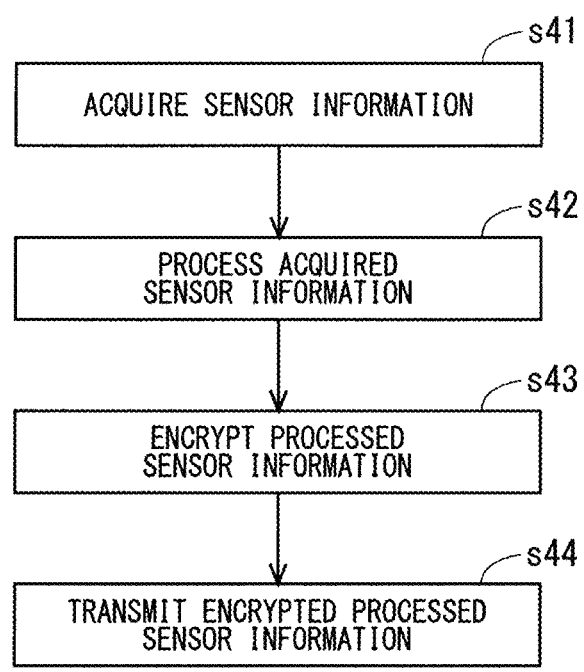

F I G. 1 6
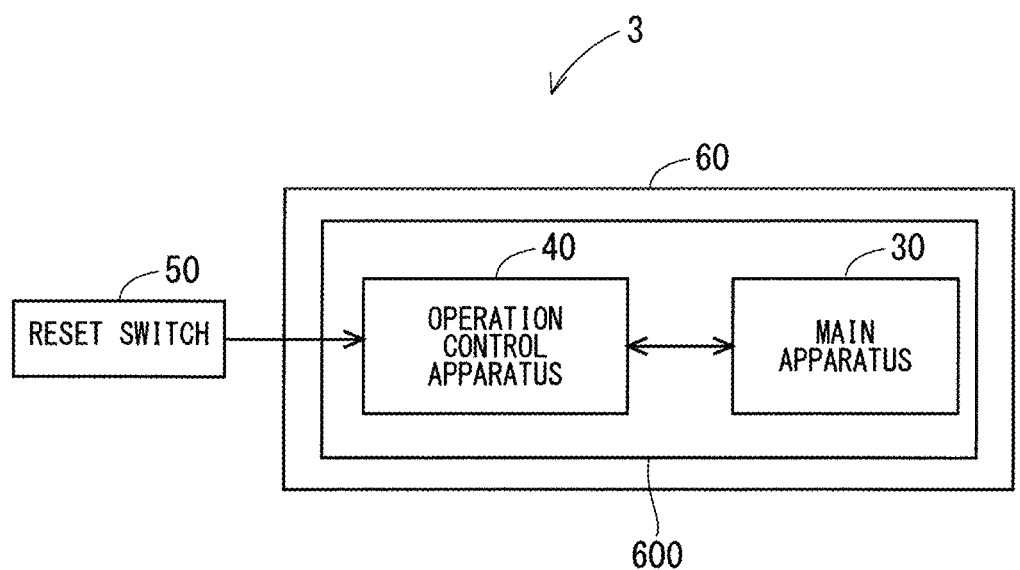

F I G. 1 8
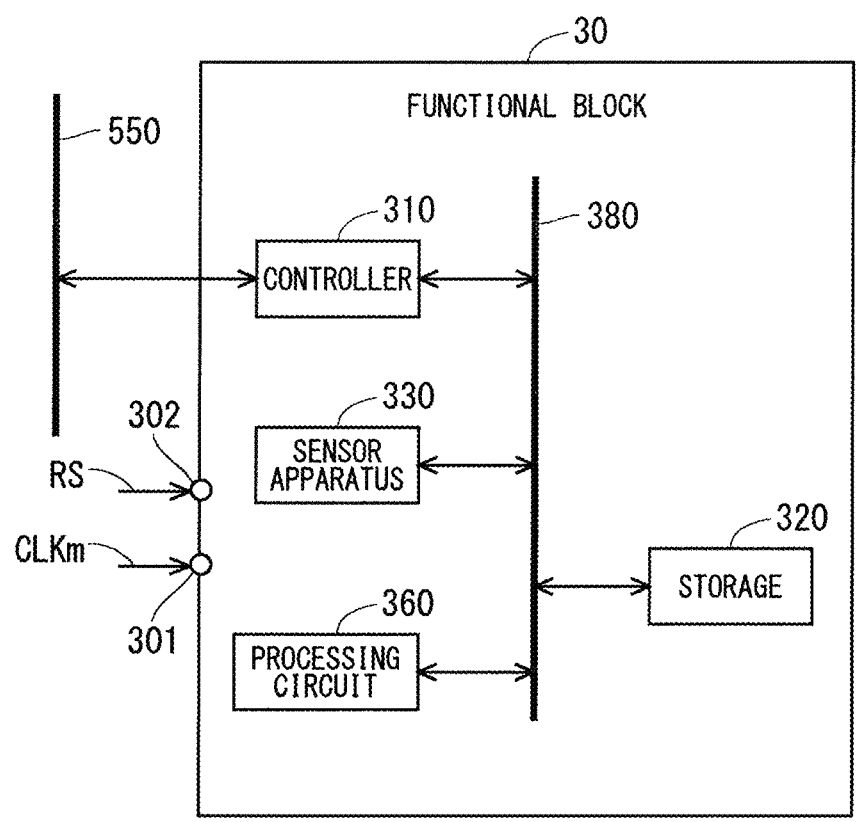

F I G. 1 9
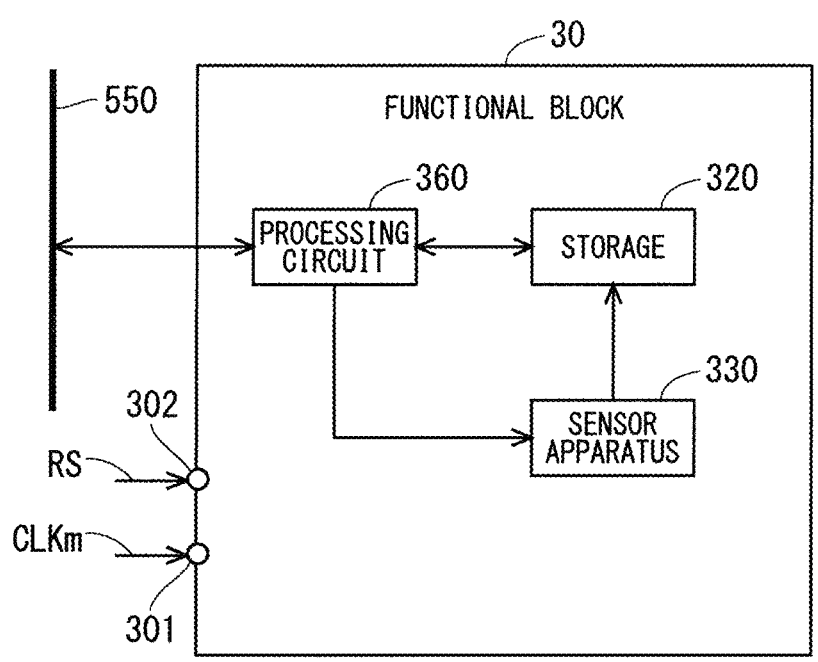

F I G. 2 3
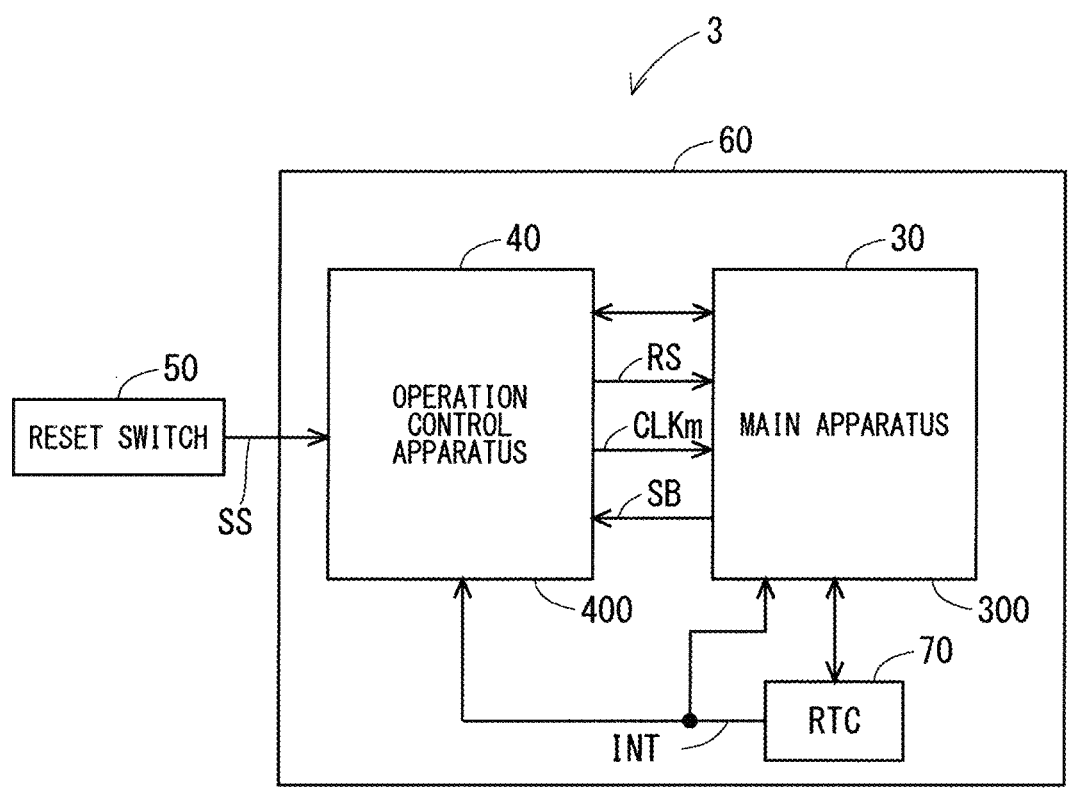

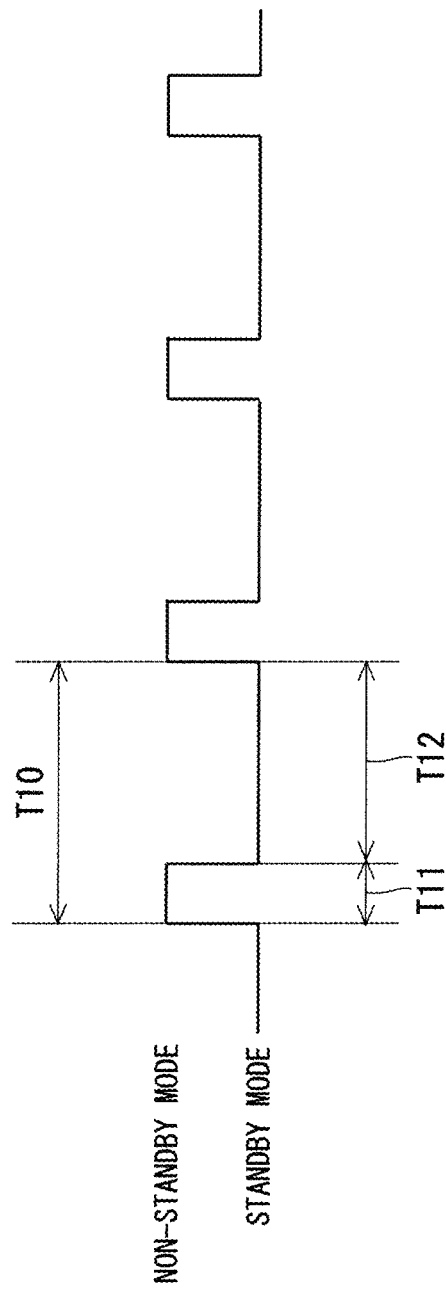

F I G. 3 1
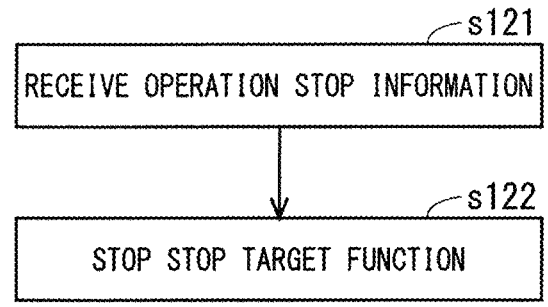

F I G. 3 6
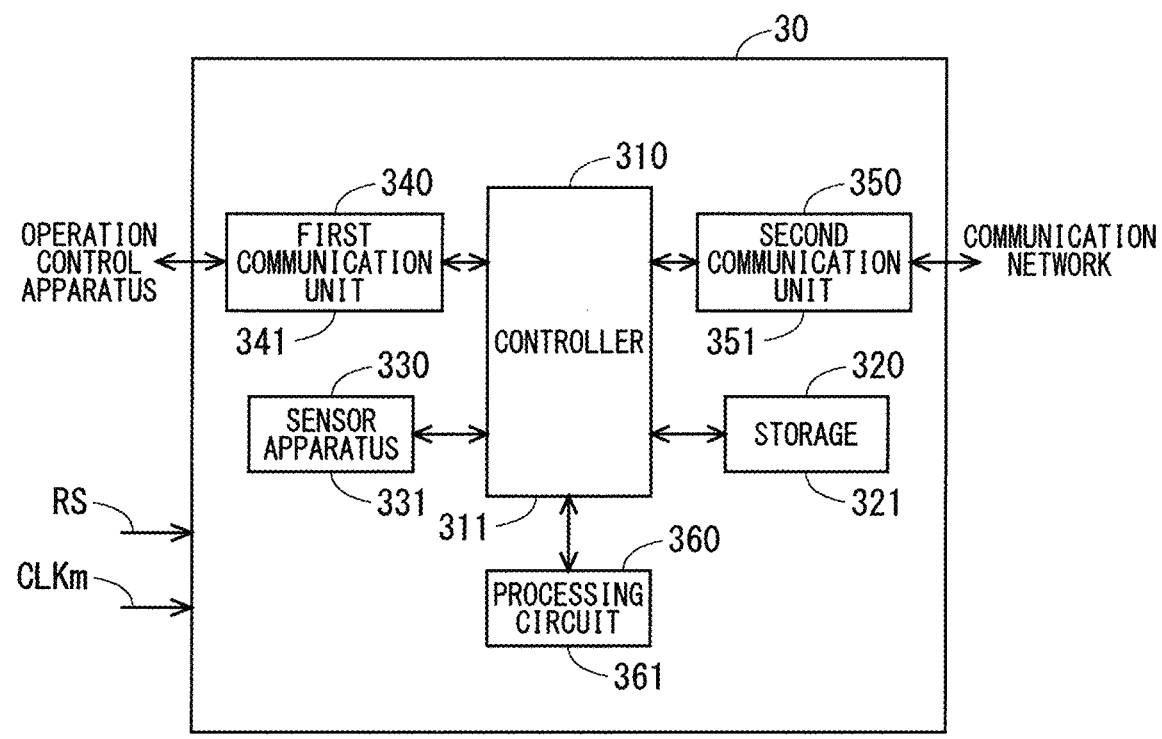

F I G. 3 7
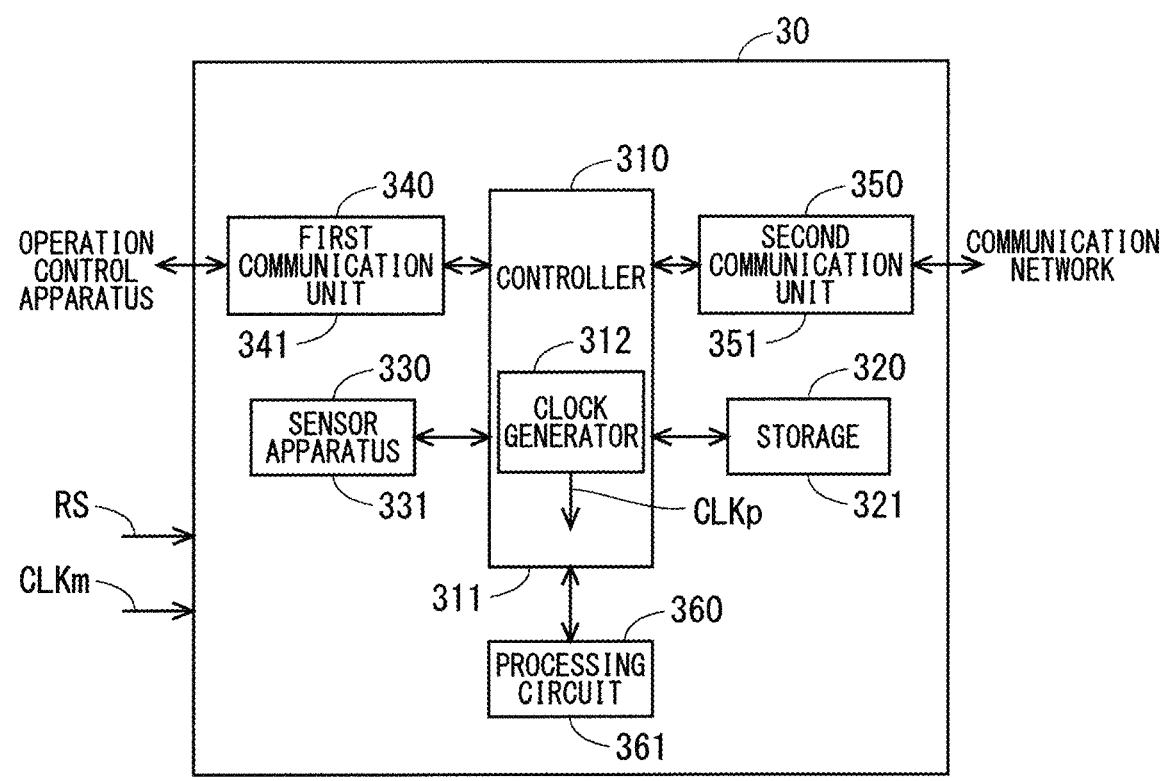

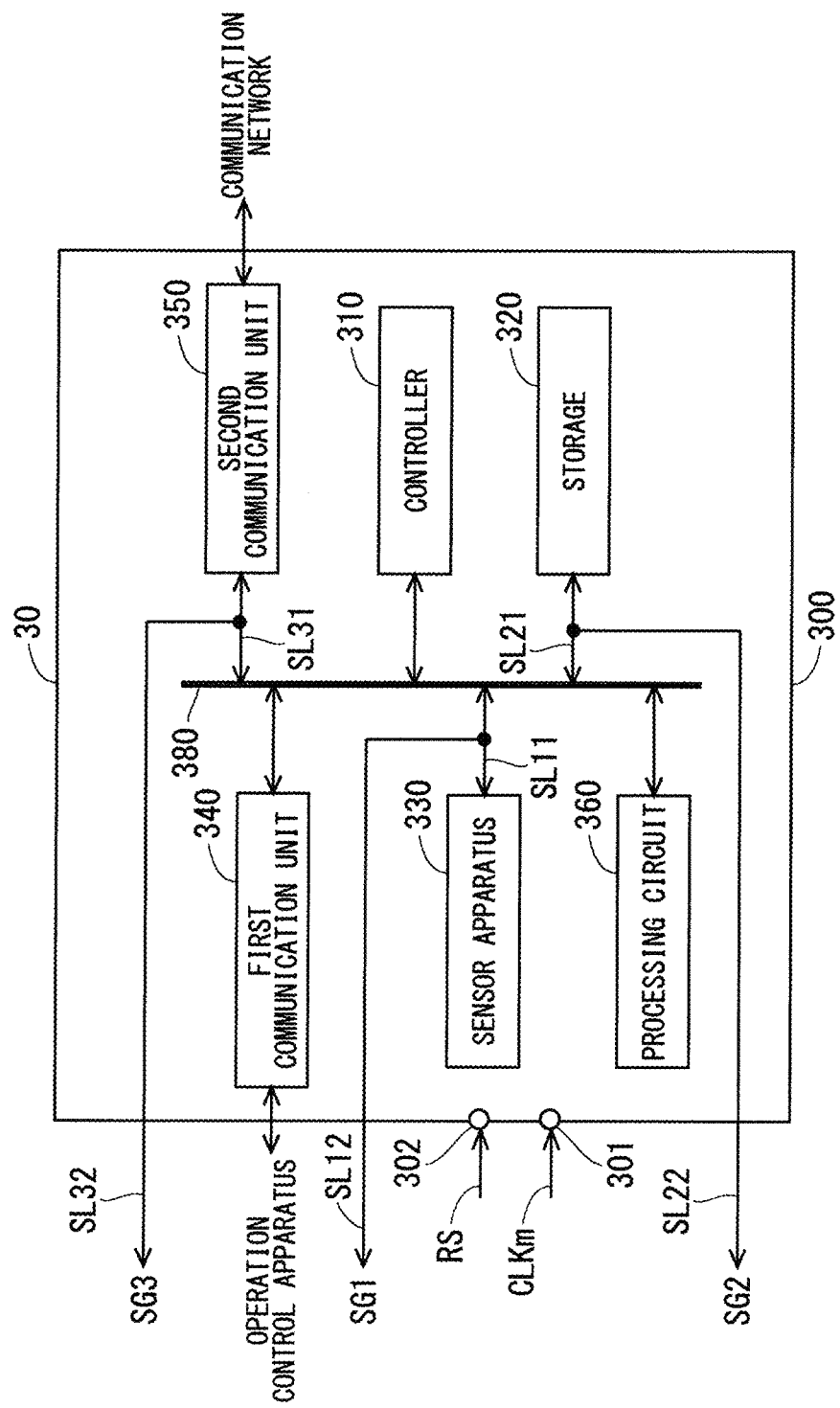
F I G. 48

INFORMATION PROCESSING SYSTEM

CROSS-REFERENCE TO RELATED APPLICATIONS

The present application is a bypass continuation of PCT Application No. PCT/JP2018/047739, filed Dec. 26, 2018, which claims priority to JP 2018-026198, filed Feb. 16, 2018, and JP 2018-141312, filed Jul. 27, 2018, the entire contents of each are incorporated herein by reference.

BACKGROUND OF THE INVENTION

Field of the Invention

The present disclosure relates to an information processing apparatus.

Description of the Background Art

Japanese Patent Application Laid-Open No. 2004-173206, Japanese Patent Application Laid-Open No. 2002-305250, and Japanese Patent No. 4899248 disclose a technology related to a semiconductor integrated circuit.

SUMMARY

One aspect of an information processing system comprises an information processing apparatus having a first function, and a server apparatus being configured to communicate with the information processing apparatus via a communication network. The information processing apparatus includes an operation control apparatus being configured to control the first function. The server apparatus transmits operation permission information indicating operation permission for the first function to the information processing apparatus, in response to satisfaction of a predetermined condition related to the information processing apparatus. The operation control apparatus activates the first function, in response to the operation permission information received by the information processing apparatus.

Further, one aspect of a server apparatus is the server apparatus of the information processing system.

Further, one aspect of an information processing apparatus is the information processing apparatus of the information processing system.

Further, one aspect of an operation control apparatus is the operation control apparatus of the information processing system.

Further, one aspect of an operating method of an information processing system is an operating method of an information processing system comprising an information processing apparatus, and a server apparatus being configured to communicate with the information processing apparatus via a communication network. The operating method comprises the steps (a) and (b). In the step (a), the server apparatus transmits operation permission information indicating operation permission for a predetermined function of the information processing apparatus to the information processing apparatus, in response to satisfaction of a predetermined condition related to the information processing apparatus. In the step (b), the information processing apparatus activates the predetermined function, in response to the operation permission information that the information processing apparatus receives.

Further, one aspect of an information processing apparatus is an information processing apparatus having a predetermined function. The information processing apparatus comprises a storage, a first processing unit, a second processing unit, and a third processing unit. The storage is configured to store operation permission information indicating operation permission for the predetermined function. The first processing unit is configured to acquire operation information related to operation of the information processing apparatus. The second processing unit is configured to determine whether or not the operation of the information processing apparatus is abnormal, based on the operation information acquired by the first processing unit. The third processing unit is configured to rewrite the operation permission information in the storage into operation unable information indicating that the predetermined function is unable to operate so as to stop the predetermined function when the second processing unit determines that the operation of the information processing apparatus is abnormal.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram illustrating one example of a configuration of an information processing apparatus.

FIG. 8 is a flowchart illustrating one example of operation of the information processing apparatus.

FIG. 16 is a diagram illustrating one example of a configuration of the information processing apparatus.

FIG. 18 is a diagram illustrating one example of a configuration of a functional block.

FIG. 19 is a diagram illustrating one example of a configuration of the functional block.

FIG. 23 is a diagram illustrating one example of a configuration of the information processing apparatus.

FIG. 24 is a diagram for illustrating one example of operation of the information processing apparatus.

FIG. 31 is a flowchart illustrating one example of operation of the information processing apparatus.

FIG. 36 is a diagram illustrating one example of a configuration of the main apparatus.

FIG. 37 is a diagram illustrating one example of a configuration of the main apparatus.

FIG. 48 is a diagram illustrating one example of a configuration of the main apparatus.

DESCRIPTION OF THE PREFERRED EMBODIMENTS

<Overview of System>

Figure 1:
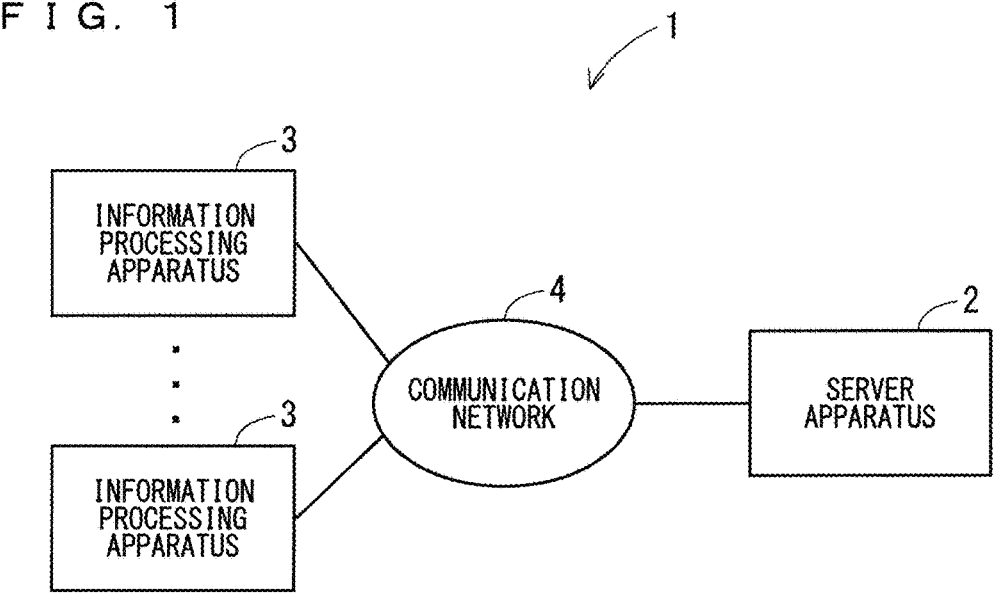
FIG. 1 is a diagram illustrating one example of a configuration of an information processing system.

FIG. 1 is a diagram illustrating one example of a configuration of an information processing system 1. As illustrated in FIG. 1, the information processing system 1 includes a server apparatus 2, and a plurality of information processing apparatuses 3 connected to the server apparatus 2 via a communication network 4. Each information processing apparatus 3 can communicate with the server apparatus 2 via the communication network 4.

The communication network 4 includes at least one of a wireless network and a wired network. In this example, for example, the communication network 4 includes a network of a mobile phone system including a base station and so on, a wireless Local Area Network (LAN), the Internet, etc.

The server apparatus 2 is a type of a computer apparatus, and is referred to as a cloud server, for example. The server apparatus 2 can control each information processing apparatus 3.

For example, each information processing apparatus 3 includes a sensor, and can transmit information detected by the sensor to the server apparatus 2. For example, the information processing apparatus 3 is a terminal for Internet of Things (IoT) used at home, in an office, at a factory, in an outdoor space, or the like.

The server apparatus 2 can perform various types of processing, based on information received from the information processing apparatus 3. For example, the server apparatus 2 analyzes the information received from the information processing apparatus 3. Based on results of the analysis, the server apparatus 2 can control the information processing apparatus 3 or control other information processing apparatuses 3. Further, the server apparatus 2 may display the analysis results. Further, the server apparatus 2 may collect pieces of information transmitted by a plurality of information processing apparatuses 3, and may display the collected pieces of information. Note that the information processing system 1 may include a plurality of server apparatuses 2. Further, the server apparatus 2 may be able to communicate with apparatuses other than the information processing apparatuses 3.

<Configuration Example of Server Apparatus>

Figure 2:
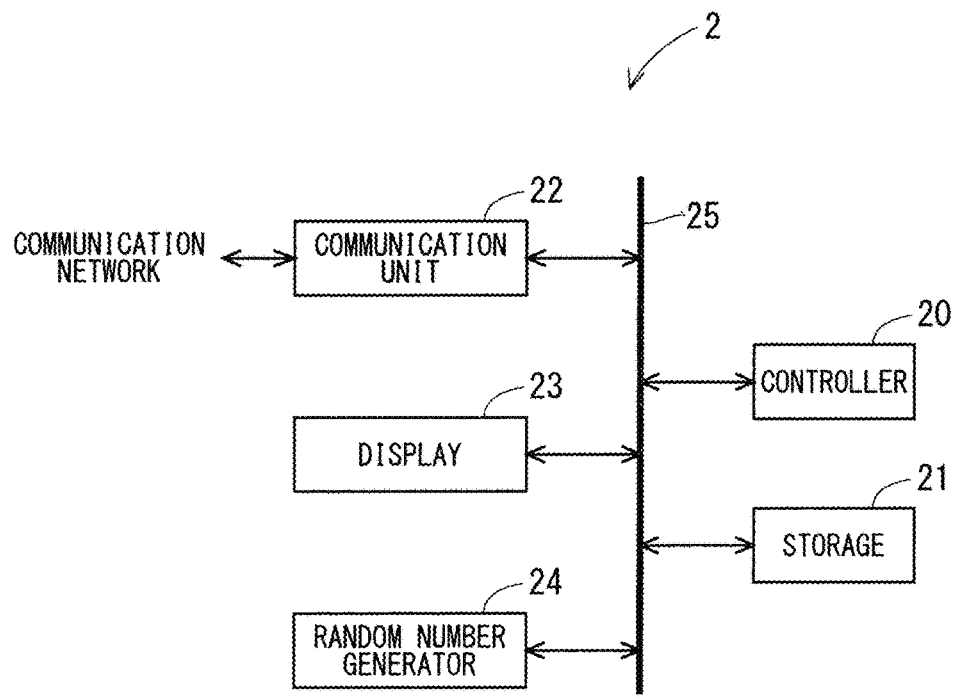
FIG. 2 is a diagram illustrating one example of a configuration of a server apparatus.

FIG. 2 is a diagram illustrating one example of a configuration of the server apparatus 2. As illustrated in FIG. 2, for example, the server apparatus 2 includes a controller 20, a storage 21, a communication unit 22 connected to the communication network 4, a display 23, and a random number generator 24. For example, the controller 20, the storage 21, the communication unit 22, the display 23, and the random number generator 24 are electrically connected to one another via a bus 25.

For example, the display 23 is a liquid crystal display or an organic EL display. The display 23 can display various types of information, such as letters, symbols, and graphics, when being controlled by the controller 20.

For example, the random number generator 24 generates random numbers to be used for two-way authentication between the server apparatus 2 and the information processing apparatus 3. The random number generator 24 generates true random numbers, for example. It can also be said that the random number generator 24 is a random number generation circuit. Note that the random number generator 24 may generate pseudo-random numbers. The two-way authentication between the server apparatus 2 and the information processing apparatus 3 will be described later in detail.

The storage 21 includes a computer-readable non-transitory recording medium, such as read only memory (ROM) and random access memory (RAM). The storage 21 stores a control program for controlling the server apparatus 2.

The controller 20 can integrally manage operation of the server apparatus 2 by controlling other components of the server apparatus 2. It can also be said that the controller 20 is a control circuit. For example, the controller 20 includes a central processing unit (CPU). Various functions of the controller 20 are implemented by the CPU of the controller 20 executing the control program in the storage 21.

The communication unit 22 is connected to the communication network 4 by means of wired connection or wireless connection. It can also be said that the communication unit 22 is a communication circuit. The communication unit 22 can communicate with apparatuses connected to the communication network 4, such as the information processing apparatuses 3 using the communication network 4. The communication unit 22 can input information received from the communication network 4 into the controller 20. Further, the communication unit 22 can output information received from the controller 20 into the communication network 4.

Note that the configuration of the server apparatus 2 is not limited to the example of FIG. 2. For example, the controller 20 may include a plurality of CPUs. Further, the controller 20 may include at least one digital signal processor (DSP). Further, all of the functions of the controller 20 or a part of the functions of the controller 20 may be implemented with a hardware circuit that does not require software to implement its functions.

Further, the storage 21 may include a computer-readable non-transitory recording medium other than the ROM and the RAM. For example, the storage 21 may include a small-sized hard disk drive, a solid state drive (SSD), or the like.

Further, the server apparatus 2 may include components other than the controller 20, the storage 21, the communication unit 22, and the display 23. For example, the server apparatus 2 may include an input apparatus used by a user to input information into the server apparatus 2, such as a touch panel.

<Configuration Example of Information Processing Apparatus>

FIG. 3 is a diagram illustrating one example of a configuration of the information processing apparatus 3. In this example, for example, the main function of the information processing apparatus 3 is to detect information by using a sensor and perform predetermined processing on the detected information. The main function of the information processing apparatus 3 is not limited to the above, and may be other functions.

As illustrated in FIG. 3, the information processing apparatus 3 includes a main apparatus 30 that executes the main function of the information processing apparatus 3, an operation control apparatus 40 that enhances security of the information processing apparatus 3 by controlling the main apparatus 30, and a reset switch 50 to be operated by a user.

For example, the main apparatus 30 is an integrated circuit contained in a package 300 made of resin or the like. The main apparatus 30 may consist of a plurality of dies, or may consist of a single die. The die is also referred to as a wafer chip. For example, the operation control apparatus 40 is an integrated circuit contained in a package 400 made of resin or the like. The operation control apparatus 40 may consist of a plurality of dies, or may consist of a single die. The main apparatus 30 and the operation control apparatus 40 are mounted on the same substrate 60, for example. The main apparatus 30 and the operation control apparatus 40 are electrically connected to each other by wiring provided in the substrate 60.

The main apparatus 30 and the operation control apparatus 40 can exchange information with each other by communicating with each other. For example, the main apparatus 30 and the operation control apparatus 40 can communicate with each other, based on Serial Peripheral Interface (SPI) or Inter-Integrated Circuit (I2C). Note that a communication method used between the main apparatus 30 and the operation control apparatus 40 is not limited to the above. Further, in this example, the main apparatus 30 and the operation control apparatus 40 perform wired communication with each other, but may perform wireless communication with each other.

The main apparatus 30 includes a sensor, and transmits information detected by the sensor to the server apparatus 2 via the communication network 4. Further, the main apparatus 30 performs operation, based on a clock signal output by the operation control apparatus 40. As will be described later, the operation control apparatus 40 can stop the operation of the main apparatus 30 by not supplying the clock signal to the main apparatus 30. It can also be said that the operation control apparatus 40 can control the functions of the main apparatus 30.

The reset switch 50 is provided in the information processing apparatus 3 so as to be exposed from a case of the information processing apparatus 3, in such a manner that a user can operate the reset switch 50. When the reset switch 50 is operated (e.g., pressed) by a user, the reset switch 50 outputs an operation signal SS, which indicates that the reset switch 50 has been operated, to the operation control apparatus 40. Based on the operation signal SS and so on, the operation control apparatus 40 can assert a reset signal to be input into various circuits of the operation control apparatus 40. With this, the operation of the operation control apparatus 40 is initialized. Further, the operation control apparatus 40 can assert a reset signal to be input into the main apparatus 30. With this, the operation of the main apparatus 30 is initialized.

<Configuration Example of Main Apparatus>

Figure 4:
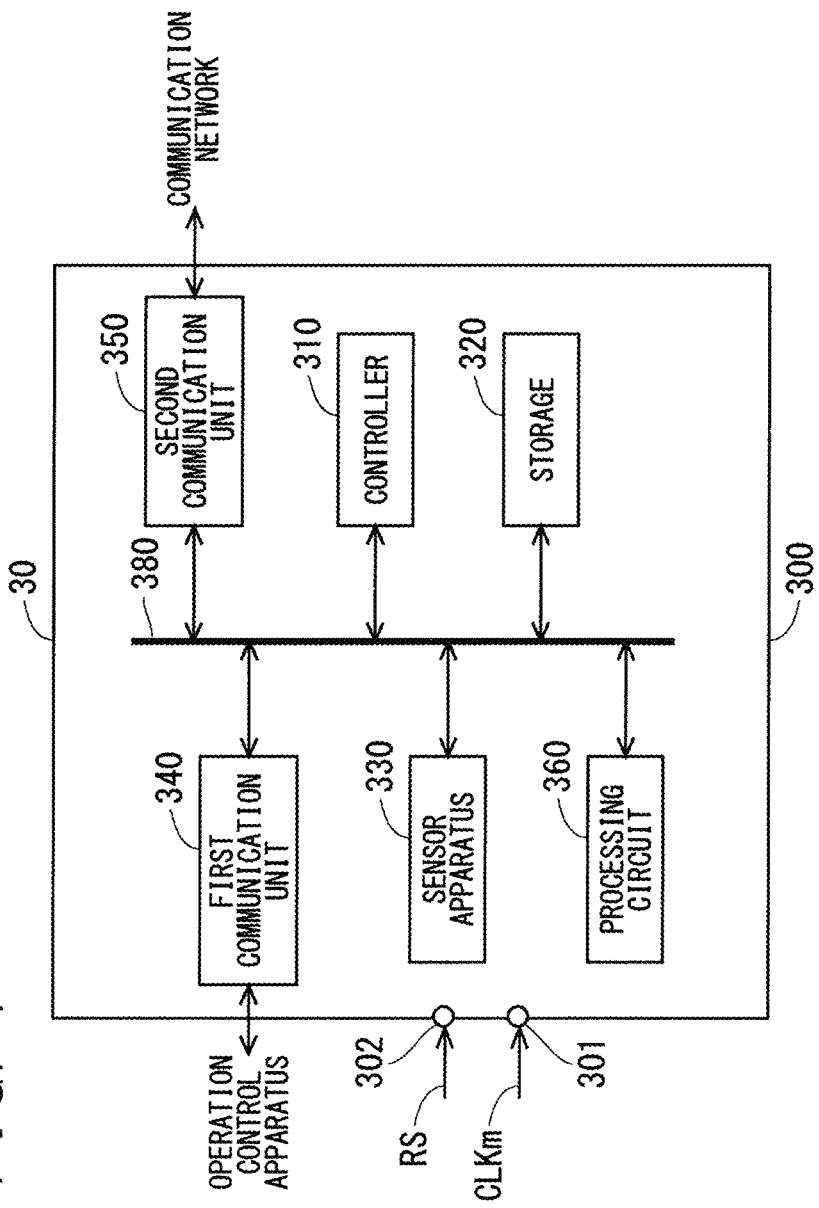
FIG. 4 is a diagram illustrating one example of a configuration of a main apparatus.

FIG. 4 is a diagram illustrating one example of a configuration of the main apparatus 30. As illustrated in FIG. 4, for example, the main apparatus 30 includes a controller 310, a storage 320, a sensor apparatus 330 including at least one sensor, a first communication unit 340, a second communication unit 350, and a processing circuit 360. These components of the main apparatus 30 are contained in the package 300. For example, the controller 310, the storage 320, the sensor apparatus 330, the first communication unit 340, the second communication unit 350, and the processing circuit 360 are electrically connected to one another via a bus 380. It can also be said that the main apparatus 30 is a main circuit that implements the main function of the information processing apparatus 3.

The storage 320 includes a computer-readable non-transitory recording medium, such as ROM and RAM. Further, the storage 320 may include a register. The storage 320 stores a control program for controlling the main apparatus 30.

The controller 310 can integrally manage operation of the main apparatus 30 by controlling other components of the main apparatus 30. It can also be said that the controller 310 is a control circuit. For example, the controller 310 includes a CPU. Various functions of the controller 310 are implemented by the CPU of the controller 310 executing the control program in the storage 320.

For example, the sensor apparatus 330 includes at least one of a temperature sensor, an accelerometer, a geomagnetic sensor, a gyro sensor, a pressure sensor, and an image sensor. The sensors of the sensor apparatus 330 are not limited to the above, and the sensor apparatus 330 may include other sensors. Information (for example, temperature, acceleration, etc.) detected in the sensor apparatus 330 is stored in the storage 320. The information detected in the sensor apparatus 330 may be hereinafter referred to as "sensor information".

The first communication unit 340 can communicate with the operation control apparatus 40, based on SPI or I2C, for example. It can also be said that the first communication unit 340 is a communication circuit. The first communication unit 340 can input information received from the operation control apparatus 40 into the controller 310. Further, the first communication unit 340 can output information received from the controller 310 into the operation control apparatus 40.

The second communication unit 350 is connected to the communication network 4 by means of wired connection or wireless connection. It can also be said that the second communication unit 350 is a communication circuit. The second communication unit 350 can use the communication network 4 to communicate with apparatuses connected to the communication network 4, such as the server apparatus 2. The second communication unit 350 can input information received from the communication network 4 into the controller 310. Further, the second communication unit 350 can output information received from the controller 310 into the communication network 4.

The processing circuit 360 can perform predetermined processing on the sensor information in the storage 320, wen being controlled by the controller 310. The processing circuit 360 retrieves the sensor information from the storage 320, and performs processing including filter processing or the like on the retrieved sensor information, for example. The processing circuit 360 stores the sensor information that has been subjected to the processing in the storage 320 as processed sensor information. In this example, the main function of the information processing apparatus 3 is to detect information by using the sensor apparatus 330 and process the detected information by using the processing circuit 360. The processing circuit 360 is implemented with a hardware circuit that does not require software to implement its functions. Note that the processing executed by the processing circuit 360 is not limited to the above.

The main apparatus 30 includes a clock input port 301 and a reset input port 302, through which a clock signal CLKm and a reset signal RS output from the operation control apparatus 40 are input, respectively. In this example, each of the clock input port 301 and the reset input port 302 is a metal terminal provided in the package 300. Thus, in this example, it can also be said that the clock input port 301 and the reset input port 302 are a clock input terminal 301 and a reset input terminal 302, respectively. The main apparatus 30 performs operation, based on the clock signal CLKm input through the clock input port 301. Further, the main apparatus 30 initializes its operation when the reset signal RS to be input into the reset input port 302 is asserted.

Note that the configuration of the main apparatus 30 is not limited to the examples of FIGS. 3 and 4. For example, the plurality of circuits of the main apparatus 30 may be separately contained in a plurality of packages. Further, the controller 310 may include a plurality of CPUs. Further, the controller 310 may include at least one DSP. Further, all of the functions of the controller 310 or apart of the functions of the controller 310 may be implemented with a hardware circuit that does not require software to implement its functions. Further, the storage 320 may include a computer-readable non-transitory recording medium other than the ROM and the RAM. For example, the storage 320 may include a small-sized hard disk drive, an SSD, or the like.

As described above, in this example, the main apparatus 30 executes the main function of the information processing apparatus 3. Further, the main apparatus 30 can communicate with the server apparatus 2, and thus also executes a function of communicating with the server apparatus 2. The function that allows the information processing apparatus 3 to communicate with the server apparatus 2 may be hereinafter referred to as a "server communication function". It can be said that the main apparatus 30 is a circuit that implements the main function and the server communication function of the information processing apparatus 3.

<Configuration Example of Operation Control Apparatus>

Figure 5:
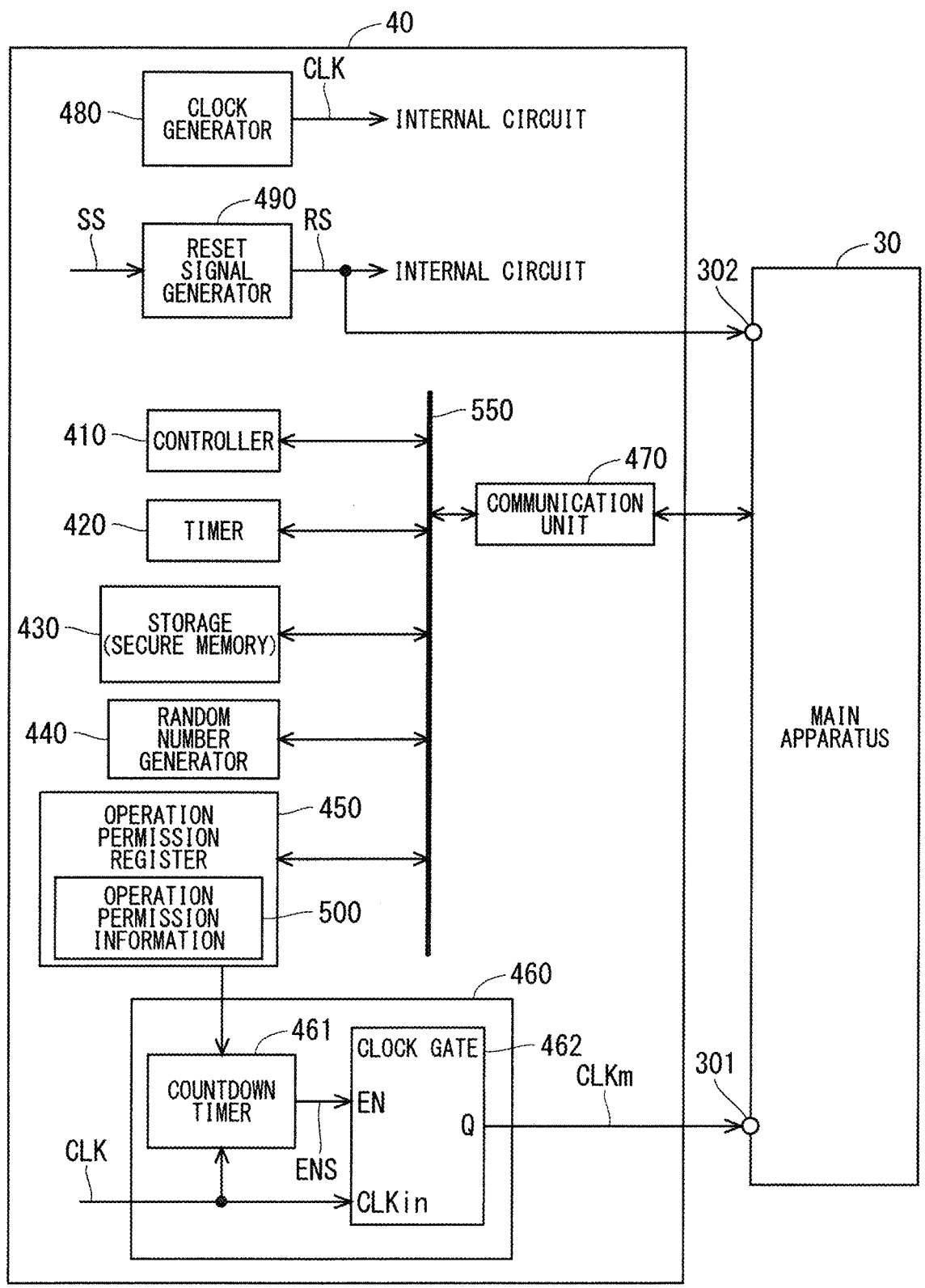
FIG. 5 is a diagram illustrating one example of a configuration of an operation control apparatus.

FIG. 5 is a diagram illustrating one example of a configuration of the operation control apparatus 40. As illustrated in FIG. 5, for example, the operation control apparatus 40 includes a controller 410, a timer 420, a storage 430, a random number generator 440, an operation permission register 450, an operation controller 460, a communication unit 470, a clock generator 480, and a reset signal generator 490. These components of the operation control apparatus 40 are contained in the package 400. For example, the controller 410, the timer 420, the storage 430, the random number generator 440, the operation permission register 450, and the communication unit 470 are electrically connected to one another via a bus 550.

The clock generator 480 generates a clock signal CLK to be used as a reference for operation of the information processing apparatus 3. It can also be said that the clock generator 480 is a clock generation circuit. The clock signal CLK is supplied to an internal circuit of the operation control apparatus 40 including the controller 410, the communication unit 470, etc. The operation control apparatus 40 operates based on the clock signal CLK. The clock generator 480 may include a crystal oscillator, or may include an oscillator not using crystals. One example of such an oscillator not using crystals is an oscillator using microelectromechanical systems (MEMS).

When the operation signal SS is input from the reset switch 50, the reset signal generator 490 asserts the reset signal RS for a certain period of time. It can also be said that the reset signal generator 490 is a reset signal generation circuit. Further, when power of the information processing apparatus 3 is switched from ON to OFF, the reset signal generator 490 asserts the reset signal RS for a certain period of time. The reset signal RS is input into an internal circuit of the operation control apparatus 40 including the controller 410, the communication unit 470, etc. With this, when the reset switch 50 is operated, the operation of the operation control apparatus 40 is initialized. Further, when power of the information processing apparatus 3 is switched from OFF to ON, the operation of the operation control apparatus 40 is initialized. The reset signal RS generated in the reset signal generator 490 is also input into the reset input port 302 of the main apparatus 30.

The storage 430 includes a computer-readable non-transitory recording medium, such as ROM and RAM. The storage 430 stores a control program for controlling the operation control apparatus 40.

The controller 410 can integrally manage operation of the operation control apparatus 40 by controlling other components of the operation control apparatus 40. It can also be said that the controller 410 is a control circuit. For example, the controller 410 includes a CPU. Various functions of the controller 410 are implemented by the CPU of the controller 410 executing the control program in the storage 430.

In this example, the controller 410 can encrypt information to be transmitted from the information processing apparatus 3 to the server apparatus 2. Further, the controller 410 can decrypt encrypted information that the information processing apparatus 3 receives from the server apparatus 2.

The storage 430 stores keys necessary for encryption and decryption. The controller 410 encrypts information to be transmitted from the information processing apparatus 3 to the server apparatus 2 by using the key in the storage 430. Further, the controller 410 decrypts encrypted information that the information processing apparatus 3 receives from the server apparatus 2 by using the key in the storage 430.

The timer 420 is a circuit that can measure a predetermined time period set by the controller 410. For example, the random number generator 440 generates random numbers to be used for two-way authentication between the information processing apparatus 3 and the server apparatus 2. The random number generator 440 generates true random numbers, for example. It can also be said that the random number generator 440 is a random number generation circuit. Note that the random number generator 440 may generate pseudo-random numbers.

The communication unit 470 can communicate with the main apparatus 30, based on SP or I2C, for example. It can also be said that the communication unit 470 is a communication circuit. The communication unit 470 can input information received from the main apparatus 30 into the controller 410. Further, the communication unit 470 can output information received from the controller 410 into the main apparatus 30.

The operation permission register 450 can store operation permission information 500 that the information processing apparatus 3 receives from the server apparatus 2. It can be said that the operation permission register 450 is a type of storage. In other words, it can be said that the operation permission register 450 is a type of storage circuit. Here, the operation permission information 500 is information indicating operation permission for a predetermined function of the information processing apparatus 3. The information processing apparatus 3 activates the predetermined function according to the operation permission information. The predetermined function may be hereinafter referred to as a "permission target function".

For example, the permission target function includes the main function and the server communication function of the information processing apparatus 3. In the information processing apparatus 3, the main apparatus 30 receives the operation permission information 500 from the server apparatus 2, and transmits the received operation permission information 500 to the operation control apparatus 40. The operation control apparatus 40 uses the communication unit 470 to receive the operation permission information 500 from the main apparatus 30. The controller 410 stores the operation permission information 500 received in the communication unit 470 in the operation permission register 450.

The operation controller 460 can control the permission target function, based on the operation permission information 500 in the operation permission register 450. It can also be said that the operation controller 460 is an operation control circuit. In this example, the operation controller 460 controls the permission target function by controlling the operation of the main apparatus 30 based on the operation permission information 500. The operation controller 460 can control whether or not to activate the main apparatus 30 by controlling supply of the clock signal to the main apparatus 30.

For example, the operation controller 460 includes a countdown timer 461 and a clock gate 462. The countdown timer 461 is a circuit that can measure a predetermined time period. The clock gate 462 is a circuit that can output an input clock signal CLK into the clock input port 301 of the main apparatus 30 as the clock signal CLKm only while the countdown timer 461 measures the predetermined time period. The clock signal CLK is input into the countdown timer 461 and the clock gate 462.

Here, in this example, the operation permission information 500 includes period information, which indicates an operable period in which the permission target function is allowed to operate. In this example, it can also be said that the period information indicates an operable period in which the main apparatus 30 that executes the permission target function is allowed to operate. For example, the operable period indicated by the period information is set to several hours to several tens of hours. Note that the operable period indicated by the period information is not limited to the above. The term "operable period" by itself hereinafter refers to the operable period indicated by the period information (i.e., the operable period indicated by the operation permission information 500). The operable period is represented by T1. T1 indicates several hours to several tens of hours.

In this example, the period information included in the operation permission information 500 is represented by the number of input clocks that allows the main apparatus 30 to operate based on the clock signal CLK. In other words, the operable period T1 is represented by the number of input clocks of the clock signal CLK.

Here, the clock refers to a rise (i.e., rising edge) or a fall (i.e., falling edge) of the clock signal CLK. The input clock refers to an input rise (i.e., rising edge) or an input fall (i.e., a falling edge) of the clock signal CLK. Thus, the number of input clocks refers to the number of input rises (i.e., number of rising edges) or the number of input falls (i.e., number of falling edges) of the clock signal CLK. The number of input clocks that allows the main apparatus 30 to operate based on the clock signal CLK may be hereinafter referred to as the "operable number of clocks". Further, the operable number of clocks may be represented by N.

When the operation permission information 500 is written in the operation permission register 450, the operable number N of clocks included in the operation permission information 500 in the operation permission register 450 is automatically set to a count value of the countdown timer 461. When the count value is set, the countdown timer 461 starts count operation. With this, the countdown timer 461 counts down the count value by 1 every time the clock signal CLK rises or falls. In other words, the countdown timer 461 counts down the count value by 1 every time the clock is input. Then, when the count value reaches 0, the countdown timer 461 stops the count operation. With this, the countdown timer 461 can count as many input clocks as the operable number N of clocks. In other words, the countdown timer 461 can measure the operable period indicated by the operation permission information 500.

The countdown timer 461 inputs an enable signal ENS for controlling the operation of the clock gate 462 into an enable input port EN of the clock gate 462. The countdown timer 461 sets the enable signal ENS to the Low level when the countdown timer 461 does not perform the count operation, and sets the enable signal ENS to the High level when the countdown timer 461 performs the count operation. The clock gate 462 outputs the clock signal CLK input through a clock input port CLKin as the clock signal CLKm only when the enable signal ENS input through the enable input port EN is at the High level. The clock signal CLKm output from the clock gate 462 is input into the clock input port 301 of the main apparatus 30. With this, when the countdown timer 461 counts the operable number of clocks, i.e., the number of input clocks, as many clocks of the clock signal CLKm as the operable number of clocks are input into the main apparatus 30. In other words, the clock signal CLKm is input into the main apparatus 30 only during the operable period indicated by the operation permission information 500. Consequently, the main apparatus 30 can operate for the operable period indicated by the operation permission information 500. In other words, the main apparatus 30 can execute the permission target function while the clock signal CLKm is input. In this example, the main apparatus 30 can detect information in the sensor apparatus 330 and process the detected information in the processing circuit 360 while the clock signal CLKm is input. Further, the main apparatus 30 can execute the server communication function while the clock signal CLKm is input.

In this manner, the information processing apparatus 3 activates the permission target function, in response to the period information included in the operation permission information 500 transmitted from the server apparatus 2. Thus, it can be said that the server apparatus 2 can control the permission target function of the information processing apparatus 3 by transmitting the operation permission information 500 to the information processing apparatus 3.

In this example, an operation mode of the controller 410 of the operation control apparatus 40 includes a normal mode, and a secure mode for enhancing security of the operation control apparatus 40. Basically, the operation mode of the controller 410 is set to the normal mode. The operation mode of the controller 410 is exceptionally set to the secure mode when enhancement of security of the operation control apparatus 40 is required.

In this example, the controller 410 can access the storage 430 only while the operation mode is set to the secure mode. In other words, when the controller 410 accesses the storage 430, the set operation mode is the secure mode. Thus, the controller 410 can execute the control program in the storage 430 only while the operation mode is set to the secure mode. Further, the controller 410 can encrypt information or decrypt encrypted information by using the key in the storage 430 only while the operation mode is set to the secure mode. The storage 430 as described above is also referred to as secure memory.

In this example, when reset of the operation control apparatus 40 is released. i.e., the reset signal RS is negated, the controller 410 first sets the operation mode to the secure mode. Then, the controller 410 executes the control program in the storage 430, and performs initial settings of the operation control apparatus 40. Subsequently, the controller 410 sets the operation mode to the normal mode. After this operation, the controller 410 sets the operation mode to the secure mode only when necessary.

Further, the controller 410 can write information in the operation permission register 450 only while the operation mode is set to the secure mode. In other words, when the controller 410 writes information in the operation permission register 450, the set operation mode is the secure mode. Further, the controller 410 can set a predetermined period to be measured by the timer 420 in the timer 420 only while the operation mode is set to the secure mode. When the communication unit 470 communicates with the main apparatus 30, the operation mode is set to the normal mode. Note that, when the communication unit 470 communicates with the main apparatus 30, the operation mode may be set to the secure mode.

As described above, the operation mode of the controller 410 includes the normal mode and the secure mode. Accordingly, even if the operation control apparatus 40 operating in the normal mode is hacked, the operation control apparatus 40 operating in the secure mode can be protected. Consequently, the probability that important information in the storage 430 and the operation permission register 450 is rewritten can be reduced. In addition, the probability that important information in the storage 430 leaks to the outside can be reduced. As a result, security of the operation control apparatus 40 can be enhanced.

Note that the configuration of the operation control apparatus 40 is not limited to the examples of FIGS. 3 and 5. For example, the plurality of circuits of the operation control apparatus 40 may be separately contained in a plurality of packages. Further, the controller 410 may include a plurality of CPUs. Further, the controller 410 may include at least one DSP. Further, all of the functions of the controller 410 or a part of the functions of the controller 410 may be implemented with a hardware circuit that does not require software to implement its functions. Further, the storage 430 may include a computer-readable non-transitory recording medium other than the ROM and the RAM. For example, the storage 430 may include a small-sized hard disk drive, an SSD, or the like. Further, information in the storage 430 may be encrypted. Further, the operation control apparatus 40 need not include the reset signal generator 490. In this case, for example, the reset signal generator 490 may be contained in a package different from that for the operation control apparatus 40 and the main apparatus 30, and mounted on the substrate 60.

<One Example of Two-Way Authentication>

Figure 6:
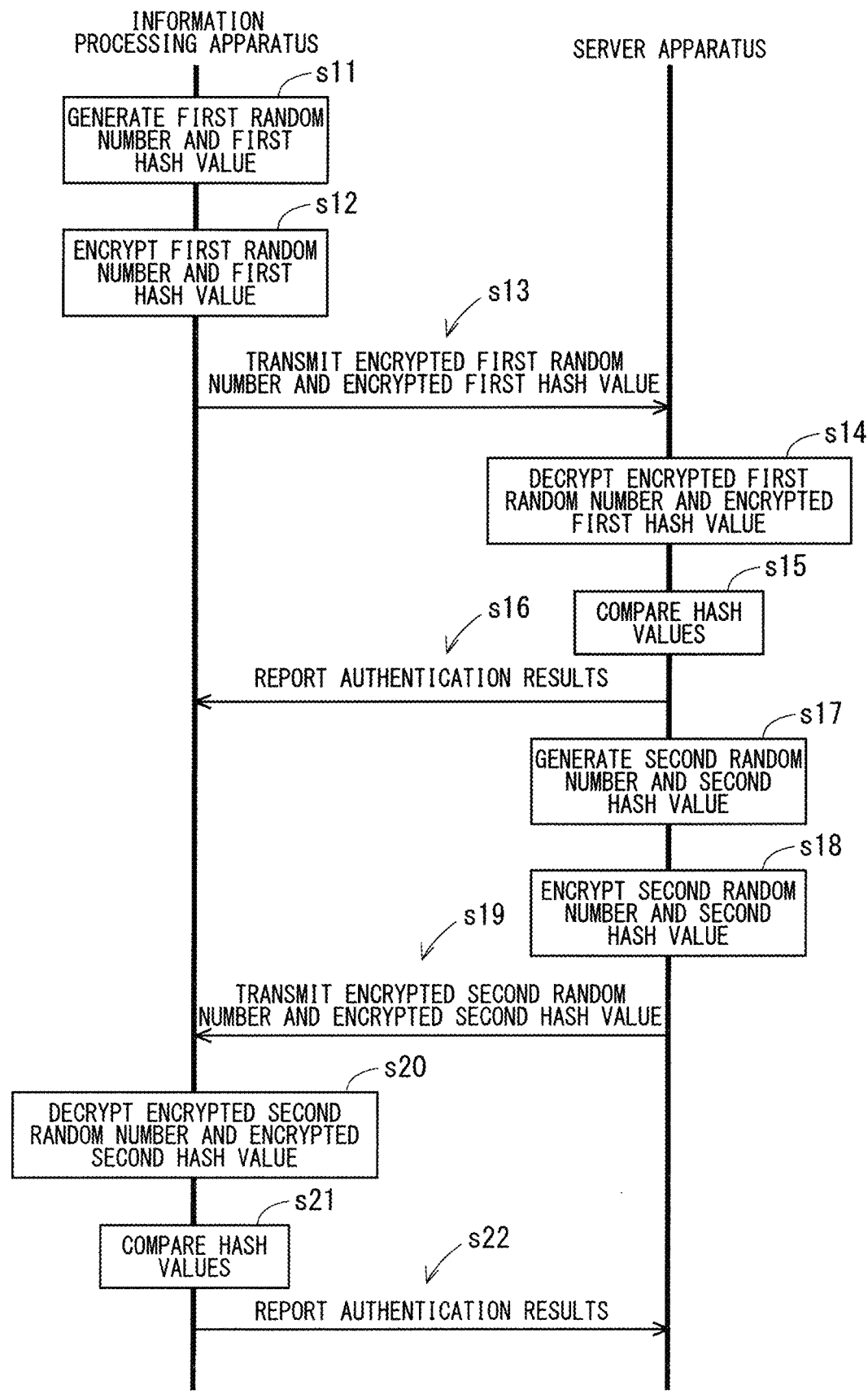
FIG. 6 is a diagram illustrating one example of operation of the information processing system.

FIG. 6 is a flowchart illustrating one example of two-way authentication processing between the server apparatus 2 and the information processing apparatus 3. The two-way authentication processing is executed immediately after reset of the information processing apparatus 3 is released and the operation of the information processing apparatus 3 is initialized. For example, public-key cryptography is used in the two-way authentication processing.

In this example, when reset of the information processing apparatus 3 is released, an initial value M (>0) is set in the operation permission register 450 of the operation control apparatus 40. For example, the initial value M is set to such a value as to allow the main apparatus 30 to operate for several seconds. In other words, the initial value M is set to such as a value as to allow the clock signal CLKm to be input into the main apparatus 30 for several seconds. When the initial value M is set in the operation permission register 450, the countdown timer 461 sets the initial value M to the count value and performs count operation. With this, as many clocks as the number indicated by the initial value M are input into the main apparatus 30, unless the value of the operation permission register 450 is rewritten. In other words, the clock signal CLKm is supplied to the main apparatus 30 for several seconds. Consequently, after reset of the information processing apparatus 3 is released, the main apparatus 30 can operate. A period according to the initial value M during which the main apparatus 30 is allowed to operate may be hereinafter referred to as an "initial operable period". The two-way authentication processing illustrated in FIG. 6 is executed in the initial operable period. The initial operable period is represented by T0. T0 indicates approximately several seconds, and T0<T1 holds. In other words, the initial operable period T0 is shorter than the operable period T1 indicated by the operation permission information 500. Note that T0≥T1 may hold.

As illustrated in FIG. 6, in Step s11, the information processing apparatus 3 generates an authentication random number for the server apparatus 2 to authenticate the information processing apparatus 3. In Step s11, the controller 410 of the operation control apparatus 40 causes the random number generator 440 to generate an authentication random number. The controller 410 stores the random number generated in the random number generator 440 in the storage 430. The random number is hereinafter referred to as a "first random number".

Further, in Step s11, the controller 410 generates a hash value from the first random number, and stores the generated hash value in the storage 430. The hash value is hereinafter referred to as a "first hash value". Next, in Step s12, the controller 410 encrypts the first random number in the storage 430 by using a public key of the server apparatus 2. Further, the controller 410 encrypts the first hash value in the storage 430 by using a private key of the information processing apparatus 3. The public key of the server apparatus 2 and the private key of the information processing apparatus 3 used in the encryption are stored in the storage 430. The first random number that has been encrypted is hereinafter referred to as an "encrypted first random number", and the first hash value that has been encrypted is hereinafter referred to as an "encrypted first hash value".

Next, in Step s13, the information processing apparatus 3 transmits the encrypted first random number and the encrypted first hash value generated in Step s12 to the server apparatus 2. In Step s13, the main apparatus 30 receives the encrypted first random number and the encrypted first hash value from the operation control apparatus 40, and transmits the received encrypted first random number and encrypted first hash value to the server apparatus 2.

In Step s14, the server apparatus 2 decrypts the received encrypted first random number and encrypted first hash value. In Step s14, the controller 20 of the server apparatus 2 decrypts the encrypted first random number received by the communication unit 22 by using a private key of the server apparatus 2 corresponding to the public key of the server apparatus 2. Further, the controller 20 decrypts the encrypted first hash value received by the communication unit 22 by using a public key of the information processing apparatus 3 corresponding to the private key of the information processing apparatus 3. The private key of the server apparatus 2 and the public key of the information processing apparatus 3 used in the decryption are stored in the storage 21. The controller 20 stores a random number obtained by decrypting the encrypted first random number in the storage 21 as a received random number. Further, the controller 20 stores a hash value obtained by decrypting the encrypted first hash value in the storage 21 as a received hash value.

Next, in Step s15, the controller 20 calculates a hash value from the received random number in the storage 21. Then, the controller 20 compares the calculated hash value and the received hash value in the storage 21. If both the hash values match, the controller 20 determines that the authentication of the information processing apparatus 3 has succeeded. In this case, the received random number in the storage 21 matches the first random number generated in the information processing apparatus 3. Thus, the first random number is stored in the storage 21. In contrast, if both the hash values do not match, the controller 20 determines that the authentication of the information processing apparatus 3 has failed.

Next, in Step s16, the server apparatus 2 reports authentication results of the information processing apparatus 3 to the information processing apparatus 3. In the information processing apparatus 3, when the main apparatus 30 receives the authentication results from the server apparatus 2, the main apparatus 30 transmits the received authentication results to the operation control apparatus 40. In the operation control apparatus 40, the authentication results received in the communication unit 470 are input into the controller 410. With this, the controller 410 can know whether or not the server apparatus 2 has succeeded in the authentication of the information processing apparatus 3.

After Step s16, in Step s17, the server apparatus 2 generates an authentication random number for the information processing apparatus 3 to authenticate the server apparatus 2. In Step s17, the controller 20 causes the random number generator 24 to generate an authentication random number. The controller 20 stores the random number generated in the random number generator 24 in the storage 21. The random number is hereinafter referred to as a "second random number".

Further, in Step s17, the controller 20 generates a hash value from the second random number, and stores the generated hash value in the storage 21. The hash value is hereinafter referred to as a "second hash value".

Next, in Step s18, the controller 20 encrypts the second random number in the storage 21 by using a public key of the information processing apparatus 3. Further, the controller 20 encrypts the second hash value in the storage 21 by using a private key of the server apparatus 2. The public key of the information processing apparatus 3 and the private key of the server apparatus 2 used in the encryption are stored in the storage 21. The second random number that has been encrypted is hereinafter referred to as an "encrypted second random number", and the second hash value that has been encrypted is hereinafter referred to as an "encrypted second hash value".

Next, in Step s19, the server apparatus 2 transmits the encrypted second random number and the encrypted second hash value generated in Step s18 to the information processing apparatus 3.

In Step s20, the information processing apparatus 3 decrypts the received encrypted second random number and encrypted second hash value. In Step s20, the controller 310 of the main apparatus 30 causes the first communication unit 340 to transmit the encrypted second random number and the encrypted second hash value received by the second communication unit 350. With this, the encrypted second random number and the encrypted second hash value are input into the operation control apparatus 40. In the operation control apparatus 40, the controller 410 decrypts the encrypted second random number received in the communication unit 470 by using a private key of the information processing apparatus 3 corresponding to the public key of the information processing apparatus 3. Further, the controller 410 decrypts the encrypted second hash value received in the communication unit 470 by using a public key of the server apparatus 2 corresponding to the private key of the server apparatus 2. The private key of the information processing apparatus 3 and the public key of the server apparatus 2 used in the decryption are stored in the storage 430. The controller 410 stores a random number obtained by decrypting the encrypted second random number in the storage 430 as a received random number. Further, the controller 410 stores a hash value obtained by decrypting the encrypted second hash value in the storage 430 as a received hash value.

Next, in Step s21, the controller 410 calculates a hash value from the received random number in the storage 430. Then, the controller 410 compares the calculated hash value and the received hash value in the storage 430. If both the hash values match, the controller 410 determines that the authentication of the server apparatus 2 has succeeded. In this case, the received random number in the storage 410 matches the second random number generated in the server apparatus 2. Thus, the second random number is stored in the storage 410. In contrast, if both the hash values do not match, the controller 410 determines that the authentication of the server apparatus 2 has failed.

Next, in Step s22, the information processing apparatus 3 reports authentication results of the server apparatus 2 to the server apparatus 2. In Step s22, the main apparatus 30 receives the authentication results of the server apparatus 2 from the operation control apparatus 40, and transmits the received authentication results to the server apparatus 2. In the server apparatus 2, the authentication results received in the communication unit 22 are input into the controller 20. With this, the controller 20 can know whether or not the information processing apparatus 3 has succeeded in the authentication of the server apparatus 2.

In this manner, two-way authentication is performed between the information processing apparatus 3 and the server apparatus 2. The controller 20 of the server apparatus 2 and the controller 410 of the operation control apparatus 40 determine that the two-way authentication between the two succeeded if the information processing apparatus 3 succeeded in the authentication of the server apparatus 2 and the server apparatus 2 succeeded in the authentication of the information processing apparatus 3. In contrast, the controllers 20 and 410 determine that the two-way authentication between the two failed if the information processing apparatus 3 failed in the authentication of the server apparatus 2 or the server apparatus 2 failed in the authentication of the information processing apparatus 3.

<Operation Example of Information Processing System when Server Apparatus Transmits Operation Permission Information>

In this example, the server apparatus 2 transmits the operation permission information to the information processing apparatus 3, in response to satisfaction of a predetermined condition related to the information processing apparatus 3. The predetermined condition may be referred to as an "operation permission condition".

One possible example of the operation permission condition is a success in two-way authentication between the server apparatus 2 and the information processing apparatus 3. In this example, when the server apparatus 2 determines that two-way authentication with the information processing apparatus 3 has succeeded, the server apparatus 2 transmits the operation permission information to the information processing apparatus 3, using the success in the two-way authentication as a condition.

Figure 7:
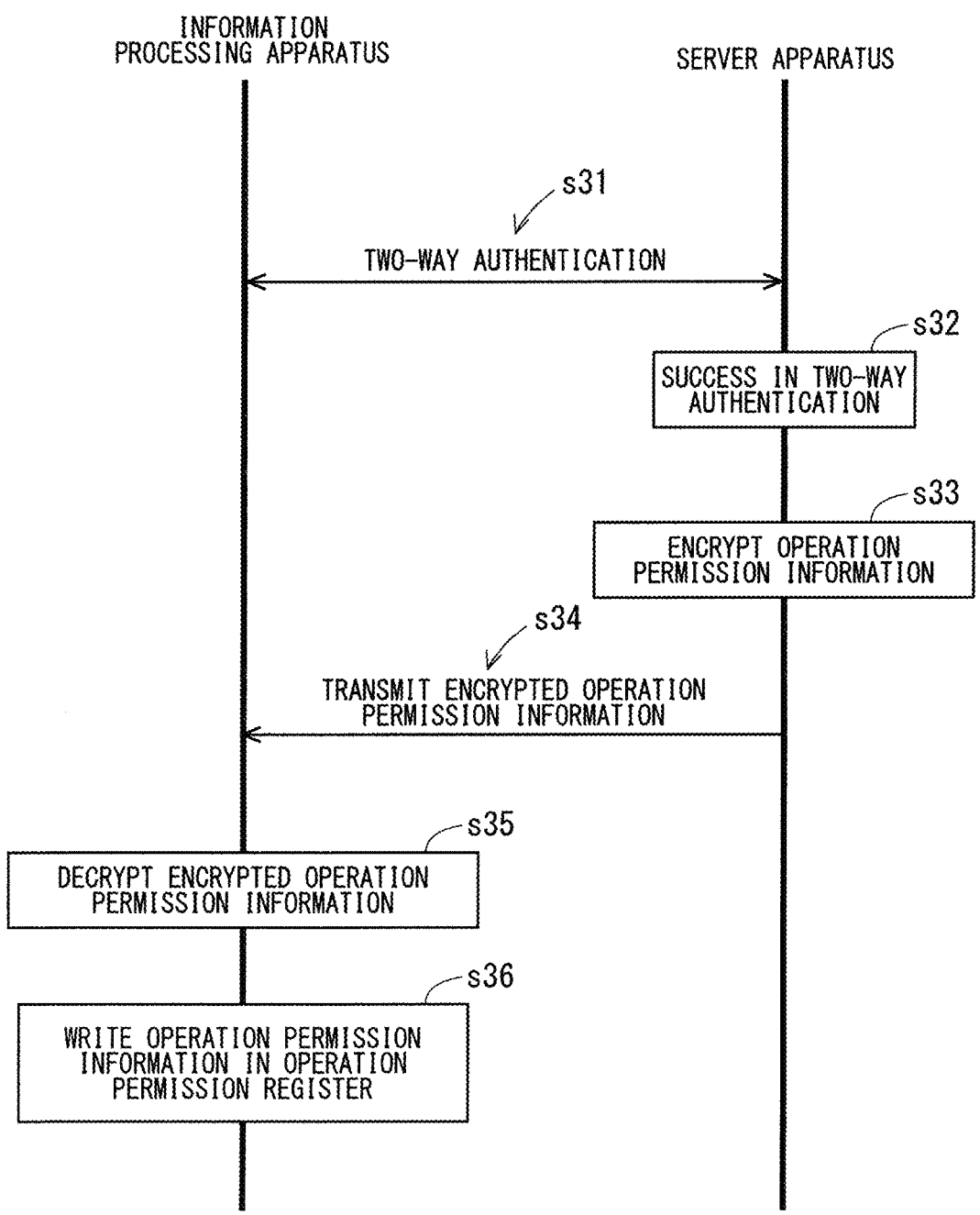
FIG. 7 is a diagram illustrating one example of operation of the information processing system.

FIG. 7 is a flowchart illustrating one example of operation of the server apparatus 2 and the information processing apparatus 3 after two-way authentication. As illustrated in FIG. 7, in Step s31, two-way authentication between the server apparatus 2 and the information processing apparatus 3 is performed as described above. Subsequently, when the controller 20 of the server apparatus 2 determines that the two-way authentication has succeeded in Step s32, the controller 20 generates operation permission information, and encrypts the generated operation permission information in Step s33.

Here, in this example, after succeeding in the two-way authentication, the server apparatus 2 encrypts information by using a key in the storage 21 that is generated based on the first and second random numbers used in the two-way authentication as a common key. For example, the controller 20 of the server apparatus 2 calculates an exclusive or of the first and second random numbers in the storage 21, and stores a result of the calculation in the storage 21 as the common key. In a similar manner, after succeeding in the two-way authentication, the information processing apparatus 3 decrypts information by using a key in the storage 430 of the operation control apparatus 40 that is generated based on the first and second random numbers used in the two-way authentication as a common key. For example, the controller 410 of the operation control apparatus 40 calculates an exclusive or of the first and second random numbers in the storage 430, and stores a result of the calculation in the storage 430 as the common key. When the server apparatus 2 receives the encrypted information from the information processing apparatus 3 after succeeding in the two-way authentication, the server apparatus 2 decrypts the information by using the common key in the storage 21. In a similar manner, when the information processing apparatus 3 receives the encrypted information from the server apparatus 2 after succeeding in the two-way authentication, the information processing apparatus 3 decrypts the information by using the common key in the storage 430. Note that the keys used by the server apparatus 2 and the information processing apparatus 3 to encrypt information after the success in the two-way authentication are not limited to the above examples. The term "key" by itself hereinafter refers to the common key generated based on the first and second random numbers.

In Step s33, the controller 20 encrypts the operation permission information by using the key in the storage 21. Next, in Step s34, the controller 20 causes the communication unit 22 to transmit the operation permission information that the controller 20 has encrypted (which may be hereinafter also referred to as "encrypted operation permission information") to the information processing apparatus 3. Note that the server apparatus 2 does not transmit the operation permission information if the server apparatus 2 failed in the two-way authentication.

When the information processing apparatus 3 receives the encrypted operation permission information, the information processing apparatus 3 decrypts the received encrypted operation permission information in Step s35. In Step s35, the controller 310 of the main apparatus 30 causes the first communication unit 340 to transmit the encrypted operation permission information received in the second communication unit 350. With this, the encrypted operation permission information is input into the operation control apparatus 40. In the operation control apparatus 40, the controller 410 decrypts the encrypted operation permission information received in the communication unit 470. Specifically, the controller 20 decrypts the encrypted operation permission information by using the key in the storage 430. With this, cleartext operation permission information is obtained.

Next, in Step s36, the controller 410 writes the cleartext operation permission information in the operation permission register 450. With this, the count value of the countdown timer 461 is set to the operable number N of clocks indicated by the operation permission information in the operation permission register 450. After this operation, the main apparatus 30 can operate for the operable period (for example, several hours to several tens of hours) indicated by the operation permission information in the operation permission register 450.

The processing of Steps s31 to s36 described above is executed during the initial operable period of the information processing apparatus 3. Thus, when Step s36 is executed after the success in the two-way authentication, the main apparatus 30 can continuously operate even after Step s36. After the operation permission information is written in the operation permission register 450, the information processing apparatus 3 executes the permission target function.

In contrast, when the two-way authentication failed, the operation permission information is not set in the operation permission register 450. Accordingly, the supply of the clock signal CLK to the main apparatus 30 stops after the elapse of the initial operable period. With this, the operation of the main apparatus 30 stops. When the two-way authentication failed, the information processing apparatus 3 does not execute the permission target function.

Note that the server apparatus 2 may transmit the operation permission information to the information processing apparatus 3 without encrypting the operation permission information.

<Operation Example of Information Processing Apparatus in Execution of Main Function>

FIG. 8 is a flowchart illustrating one example of operation of the information processing apparatus in execution of the main function. As illustrated in FIG. 8, in Step s41, the information processing apparatus 3 acquires sensor information. In Step s41, the controller 310 of the main apparatus 30 activates the sensor apparatus 330, and causes the sensor apparatus 330 to detect information. Then, the controller 310 stores the sensor information detected in the sensor apparatus 330 in the storage 320. With this, the sensor information is acquired.

Next, in Step s42, the information processing apparatus 3 performs predetermined processing on the acquired sensor information. In Step s42, the controller 310 activates the processing circuit 360. The processing circuit 360 acquires the sensor information from the storage 320, and performs the predetermined processing on the acquired sensor information. Then, the processing circuit 360 stores the sensor information that has been subjected to the processing in the storage 320 as processed sensor information.

Next, in Step s43, the information processing apparatus 3 encrypts the processed sensor information. In Step s43, the controller 310 retrieves the processed sensor information from the storage 320, and inputs the retrieved processed sensor information into the first communication unit 340. The first communication unit 340 transmits the input processed sensor information to the operation control apparatus 40. In the operation control apparatus 40, the controller 410 encrypts the processed sensor information received in the communication unit 470 by using the key in the storage 430. The processed sensor information that has been encrypted may be hereinafter referred to as "encrypted processed sensor information".

Next, in Step s44, the information processing apparatus 3 transmits the encrypted processed sensor information obtained in Step s43 to the server apparatus 2. In Step s44, the main apparatus 30 receives the encrypted processed sensor information from the operation control apparatus 40, and transmits the received encrypted processed sensor information to the server apparatus 2.

The information processing apparatus 3 repeatedly executes the processing of Steps s41 to s44 described above during the operable period, i.e., while the clock signal CLK is supplied to the main apparatus 30. The acquisition and transmission of the sensor information illustrated in FIG. 8 may be hereinafter referred to as "information acquisition and transmission processing".

In the server apparatus 2, when the communication unit 22 receives the encrypted processed sensor information, the controller 20 decrypts the received encrypted processed sensor information by using the key in the storage 21. With this, cleartext processed sensor information is obtained.

Then, the controller 20 stores the cleartext processed sensor information in the storage 21. Subsequently, the controller 20 performs processing using the processed sensor information in the storage 21. For example, the controller 20 analyzes the processed sensor information and causes the display 23 to display results of the analysis, or causes the display 23 to display pieces of processed sensor information from a plurality of information processing apparatuses 3 in graph form.

Note that the information processing apparatus 3 may transmit the processed sensor information to the server apparatus 2 without encrypting the processed sensor information.

<Repeated Transmission of Operation Permission Information>

As can be understood from the description above, if the information processing apparatus 3 does not receive new operation permission information in an operable period indicated by operation permission information after receiving the operation permission information from the server apparatus 2, the information processing apparatus 3 stops the permission target function after the elapse of the operable period. Accordingly, in this case, it is difficult for the information processing apparatus 3 to execute the permission target function for a long period.

In view of this, in this example, in the operable period indicated by the operation permission information received from the server apparatus 2, the information processing apparatus 3 performs processing with the server apparatus 2 so that the information processing apparatus 3 receives operation permission information from the server apparatus 2. The processing may be hereinafter referred to as "processing for operation permission". It can also be said that the information processing apparatus 3 performs processing with the server apparatus 2 in the operable period indicated by the operation permission information received from the server apparatus 2 so that the server apparatus 2 transmits operation permission information again. It can also be said that the processing for operation permission is processing in which the information processing apparatus 3 requests operation permission for the permission target function from the server apparatus 2.

The server apparatus 2 transmits operation permission information to the information processing apparatus 3, in response to satisfaction of an operation permission condition dependent on the processing for operation permission. With this, the information processing apparatus 3 can receive new operation permission information before the elapse of the operable period. Consequently, the information processing apparatus 3 can keep the main apparatus 30 activated for a long period. In other words, the information processing apparatus 3 can execute the permission target function for a long period.

One possible example of the processing for operation permission is processing in which the information processing apparatus 3 transmits a request signal for requesting transmission of operation permission information to the server apparatus 2. Further, one possible example of the operation permission condition dependent on the processing for operation permission is a condition that the server apparatus 2 receives the request signal transmitted from the information processing apparatus 3. In this example, the information processing apparatus 3 transmits the request signal in the operable period. In response to receiving the request signal, the server apparatus 2 transmits operation permission information to the information processing apparatus 3.

Note that, when the two-way authentication succeeds, the server apparatus 2 transmits operation permission information. Thus, it can be said that the two-way authentication performed by the information processing apparatus 3 with the server apparatus 2 is the processing for operation permission.

Further, in the above example, the operation permission condition for the server apparatus 2 to transmit operation permission information for the first time after release of reset of the information processing apparatus 3 is a success in the two-way authentication. In contrast, the operation permission condition for the server apparatus 2 to transmit operation permission information for the second time or later after release of reset of the information processing apparatus 3 is a condition that the server apparatus 2 receives a request signal.

As described above, in this example, the operation permission condition for the server apparatus 2 as to the first transmission of operation permission information and the operation permission condition for the server apparatus 2 as to the second or later transmission of operation permission information are different from each other.

Figure 9:
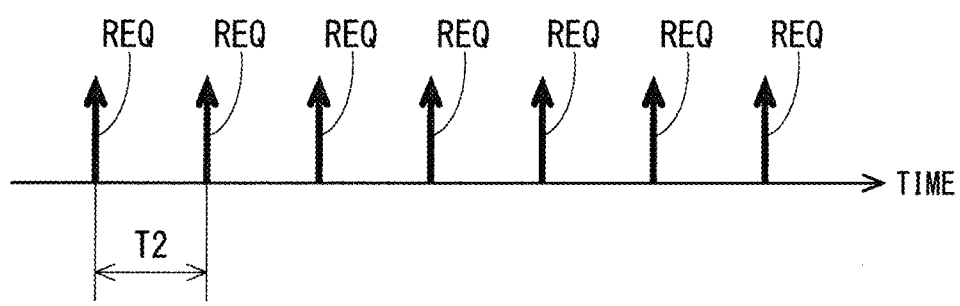
FIG. 9 is a diagram for illustrating one example of operation of the information processing apparatus.

FIG. 9 is a diagram illustrating how the information processing apparatus 3 transmits the request signal. In this example, the information processing apparatus 3 repeatedly transmits a request signal REQ once every transmission interval T2 while the main apparatus 30 operates after Step s36. The transmission interval T2 is set to be equal to or shorter than the operable period T1. In other words, the execution interval of the processing for operation permission is set to be equal to or shorter than the operable period T1. The transmission interval T2 is set to one hour, for example. Note that the transmission interval T2 may not be fixed.

Figure 10:
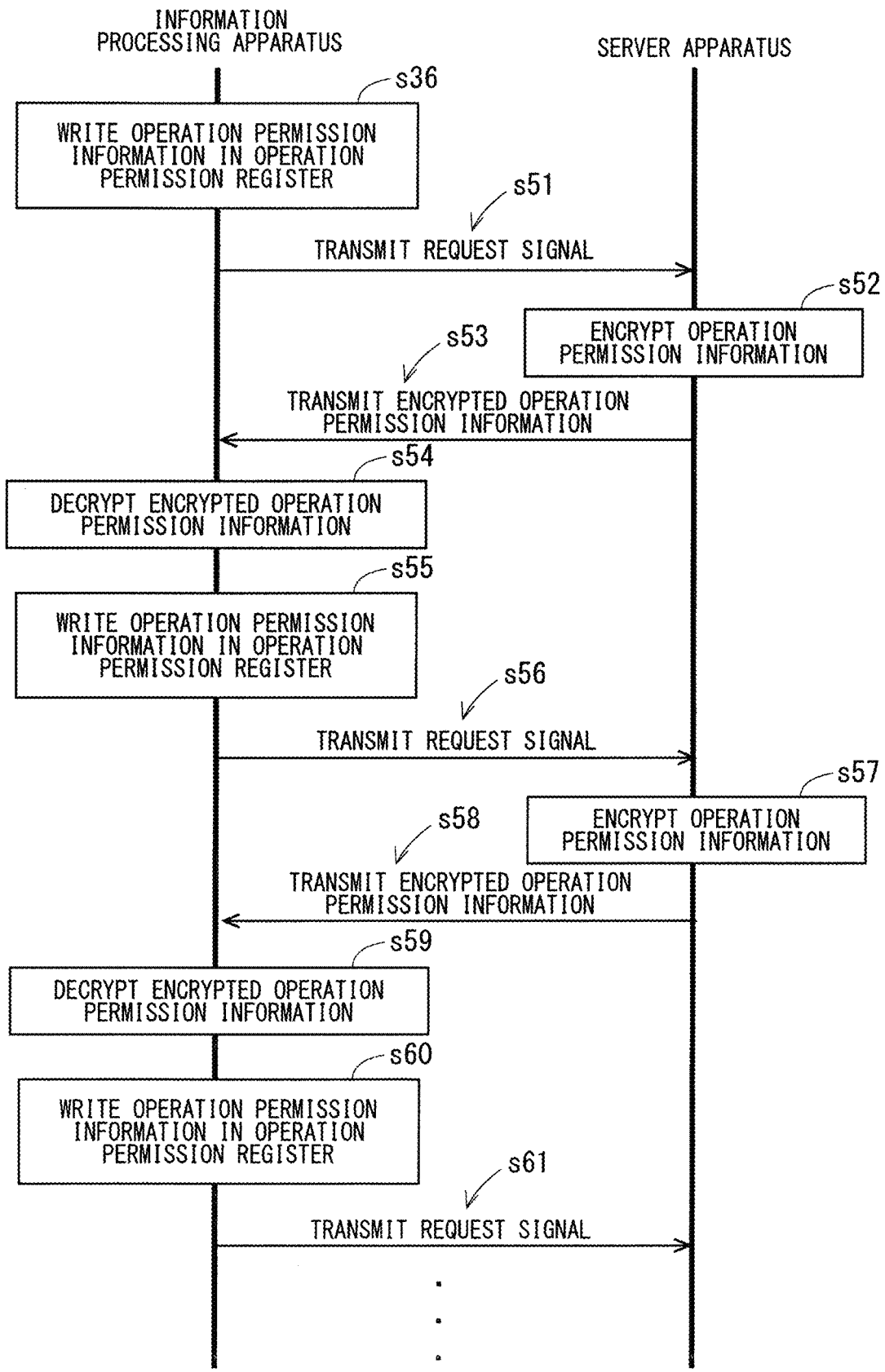
FIG. 10 is a diagram illustrating one example of operation of the information processing system.

FIG. 10 is a flowchart illustrating one example of operation of the server apparatus 2 and the information processing apparatus 3. As illustrated in FIG. 10, after Step s36 described above, in Step s51, the information processing apparatus 3 transmits the request signal within the operable period T1. In Step s51, the controller 410 of the operation control apparatus 40 generates the request signal, and causes the communication unit 470 to transmit the generated request signal. With this, the request signal is input into the main apparatus 30. The main apparatus 30 transmits the request signal received in the first communication unit 340 to the server apparatus 2.

When the server apparatus 2 receives the request signal, i.e., when the operation permission condition is satisfied, in Step s52, the server apparatus 2 generates encrypted operation permission information, in a similar manner to Step s33 described above. Then, in Step s53, the server apparatus 2 transmits the encrypted operation permission information to the information processing apparatus 3.

In Step s54, the information processing apparatus 3 decrypts the received encrypted operation permission information, in a similar manner to Step s35 described above. Then, in Step s55, the information processing apparatus 3 sets cleartext operation permission information in the operation permission register 450 of the operation control apparatus 40, in a similar manner to Step s36. With this, operation permission information is set in the operation permission register 450 again, and a new operable period T1 is set. In other words, the operable period T1 is updated.

After Step s55, the information processing apparatus 3 transmits a request signal to the server apparatus 2 again after the transmission interval T2 has elapsed from the execution of Step s51 (Step s56). When the server apparatus 2 receives the request signal, in Step s57, the server apparatus 2 generates encrypted operation permission information, in a similar manner to Step s33. Then, in Step s58, the server apparatus 2 transmits the encrypted operation permission information to the information processing apparatus 3.

In Step s59, the information processing apparatus 3 decrypts the received encrypted operation permission information, in a similar manner to Step s35. Then, in Step s60, the information processing apparatus 3 sets cleartext operation permission information in the operation permission register 450 of the operation control apparatus 40, in a similar manner to Step s36. With this, operation permission information is set in the operation permission register 450 again, and the operable period T1 is further updated.

After Step s60, the information processing apparatus 3 transmits a request signal to the server apparatus 2 again after the transmission interval T2 has elapsed from the execution of Step s56 (Step s61). After this operation, each of the information processing apparatus 3 and the server apparatus 2 operates in a similar manner.

Note that, when the information processing apparatus 3 transmits the request signal to the server apparatus 2, the information processing apparatus 3 may transmit an encrypted request signal to the server apparatus 2.

As described above, when the information processing apparatus 3 transmits the request signal to the server apparatus 2 once every operable period T1 or less, the information processing apparatus 3 can receive new operation permission information before the elapse of the operable period T1. In other words, when the information processing apparatus 3 executes the processing for operation permission once every operable period T1 or less, the information processing apparatus 3 can receive new operation permission information before the elapse of the operable period T1. Consequently, the information processing apparatus 3 can update the operable period T1 before the elapse of the operable period T1. With this, the information processing apparatus 3 can continuously keep the main apparatus 30 activated after the success in the two-way authentication. Consequently, the information processing apparatus 3 can execute the permission target function for a long period.

Figure 11:
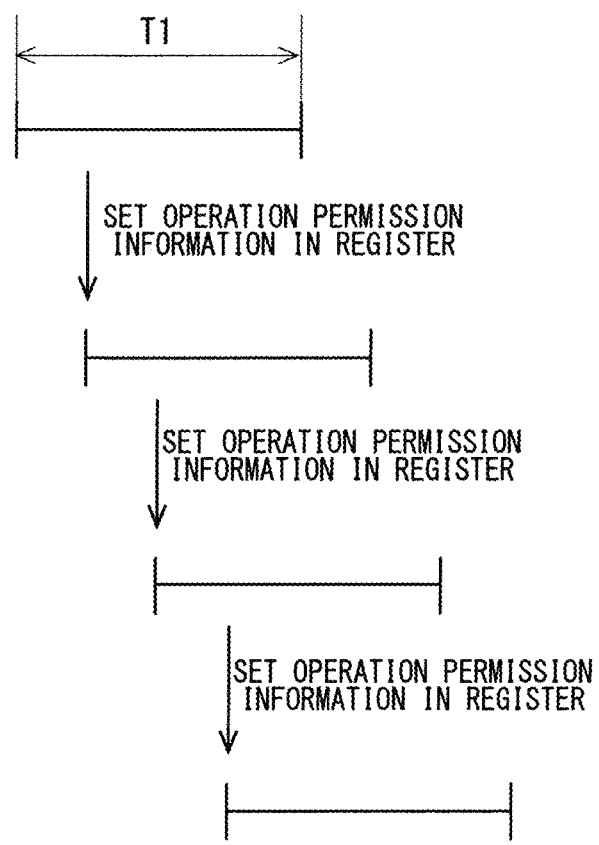
FIG. 11 is a diagram for illustrating one example of operation of the information processing apparatus.

FIG. 11 is a diagram illustrating one example of how the operable period T1 is updated. As illustrated in FIG. 11, in this example, the main apparatus 30 can continuously operate through repetition of processing of updating the operable period T in response to setting of the operation permission information in the operation permission register 450 within the operable period T1.

Further, when the transmission interval T2 is set to be shorter than half the operable period T1, the probability that the information processing apparatus 3 can update the operable period T1 before the elapse of the operable period T1 can be increased even if communication between the information processing apparatus 3 and the server apparatus 2 is not appropriately performed temporarily. This will be described below.

For example, the operable period T1 set in Step s55 of FIG. 10 described above is referred to as an "operable period T1t". Further, the request signals REQ transmitted in Steps s56 and s61 are referred to as request signals REQ1 and REQ2, respectively. Further, a request signal REQ transmitted by the information processing apparatus 3 subsequently to the request signal REQ2 is referred to as a request signal REQ3.

When the request signal REQ1 transmitted by the information processing apparatus 3 does not reach the server apparatus 2 due to temporary deterioration in communication quality or the like, Steps s57 to s60 are not executed. Thus, the information processing apparatus 3 cannot execute update of the operable period in response to transmission of the request signal REQ1. Further, when operation permission information transmitted by the server apparatus 2 that has received the request signal REQ1 transmitted by the information processing apparatus 3 does not reach the information processing apparatus 3 due to temporary deterioration in communication quality or the like, Steps s59 and s60 are not executed. Thus, the information processing apparatus 3 cannot execute update of the operable period in response to transmission of the request signal REQ1.

Figure 12:
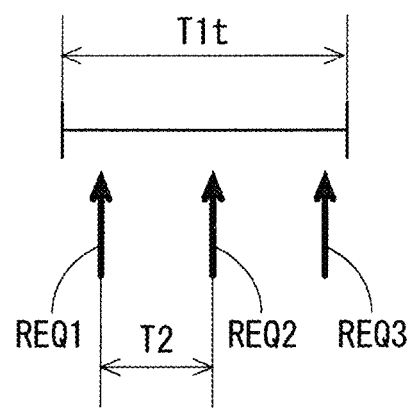
FIG. 12 is a diagram for illustrating one example of operation of the information processing apparatus.

As described above, when the information processing apparatus 3 fails to receive operation permission information transmitted in response to the transmitted request signal REQ1, the information processing apparatus 3 cannot execute update of the operable period in response to transmission of the request signal REQ1. In such a case, when the transmission interval T2 is set to be shorter than half the operable period T1, as illustrated in FIG. 12, the information processing apparatus 3 can transmit the next request signal REQ2 in the operable period T1$t$ in which the request signal REQ1 is transmitted. In other words, even if the information processing apparatus 3 fails to receive operation permission information transmitted in response to a transmitted request signal, the information processing apparatus 3 can transmit a request signal again within the same operable period in which the request signal is transmitted. With this, the probability that the information processing apparatus 3 can receive operation permission information in the operable period T1$t$ is increased. In other words, the probability that the information processing apparatus 3 can update the operable period before the elapse of the operable period can be increased.

Further, even if the information processing apparatus 3 fails to receive operation permission information transmitted in response to the transmitted request signal REQ2 due to temporary deterioration in communication quality or the like, as illustrated in FIG. 12, the information processing apparatus 3 may be able to transmit the next request signal REQ3 in the operable period T1$t$, depending on the transmission interval T2. In this case, the information processing apparatus 3 may be able to receive operation permission information transmitted in response to the request signal REQ3 in the operable period T1$t$. Consequently, the probability that the information processing apparatus 3 can receive operation permission information in the operable period Tit is increased even if the information processing apparatus 3 fails to receive operation permission information transmitted in response to the request signals REQ1 and REQ2. With this, the probability that the information processing apparatus 3 can update the operable period before the elapse of the operable period can be increased.

As described above, when the information processing apparatus 3 does not receive operation permission information transmitted in response to a request signal transmitted in the operable period, the information processing apparatus 3 repeatedly transmits a request signal so that the information processing apparatus 3 can transmit the request signal again within the same operable period. This can increase the probability that the information processing apparatus 3 can update the operable period before the elapse of the operable period. In other words, when the information processing apparatus 3 does not receive operation permission information transmitted in response to processing for operation permission executed in the operable period, the information processing apparatus 3 repeatedly executes processing for operation permission so that the information processing apparatus 3 can execute the processing for operation permission again within the same operable period. This can increase the probability that the information processing apparatus 3 can update the operable period before the elapse of the operable period.

Note that, in the above example, the operation permission condition for the server apparatus 2 as to the first transmission of operation permission information and the operation permission condition for the server apparatus 2 as to the second or later transmission of operation permission information are different from each other. However, both the operation permission conditions may be the same.

Figure 13:
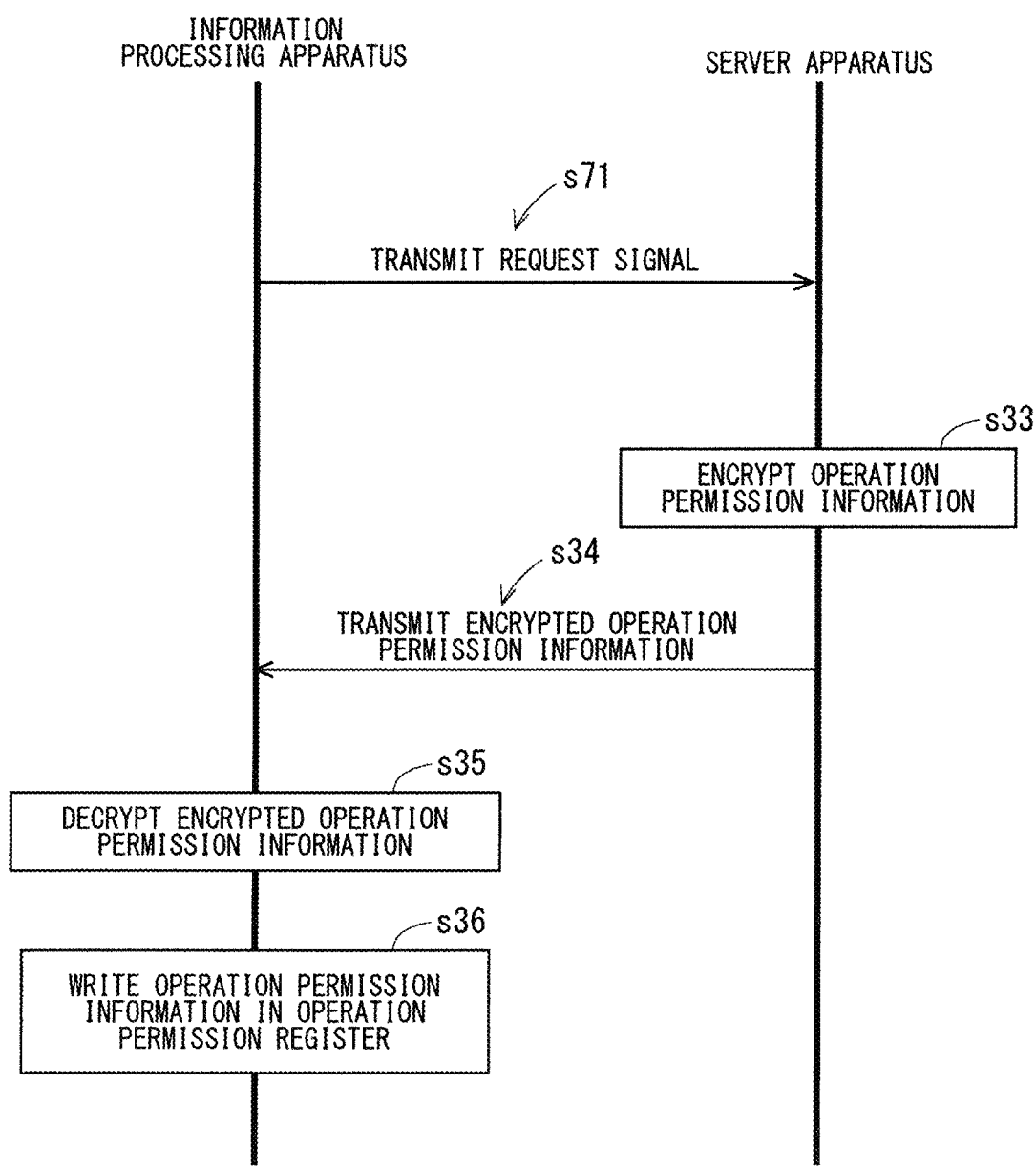
FIG. 13 is a diagram illustrating one example of operation of the information processing system.

For example, the operation permission condition for the server apparatus 2 as to the first transmission of operation permission information may be a condition that the server apparatus 2 receives the request signal REQ. FIG. 13 is a diagram illustrating one example of operation of the server apparatus 2 and the information processing apparatus 3 in such a case. FIG. 13 corresponds to FIG. 7 described above.

As illustrated in FIG. 13, after reset of the information processing apparatus 3 is released, the two-way authentication is not executed, and in Step s71, the information processing apparatus 3 transmits a request signal REQ to the server apparatus 2. When the server apparatus 2 receives the request signal REQ, the server apparatus 2 executes Steps s33 and s34 described above, and transmits encrypted operation permission information to the information processing apparatus 3. When the information processing apparatus 3 receives the encrypted operation permission information, the information processing apparatus 3 executes Steps s35 and s36 described above, and writes cleartext operation permission information in the operation permission register 450. With this, the operable period is set in the information processing apparatus 3 for the first time.

Figure 14:
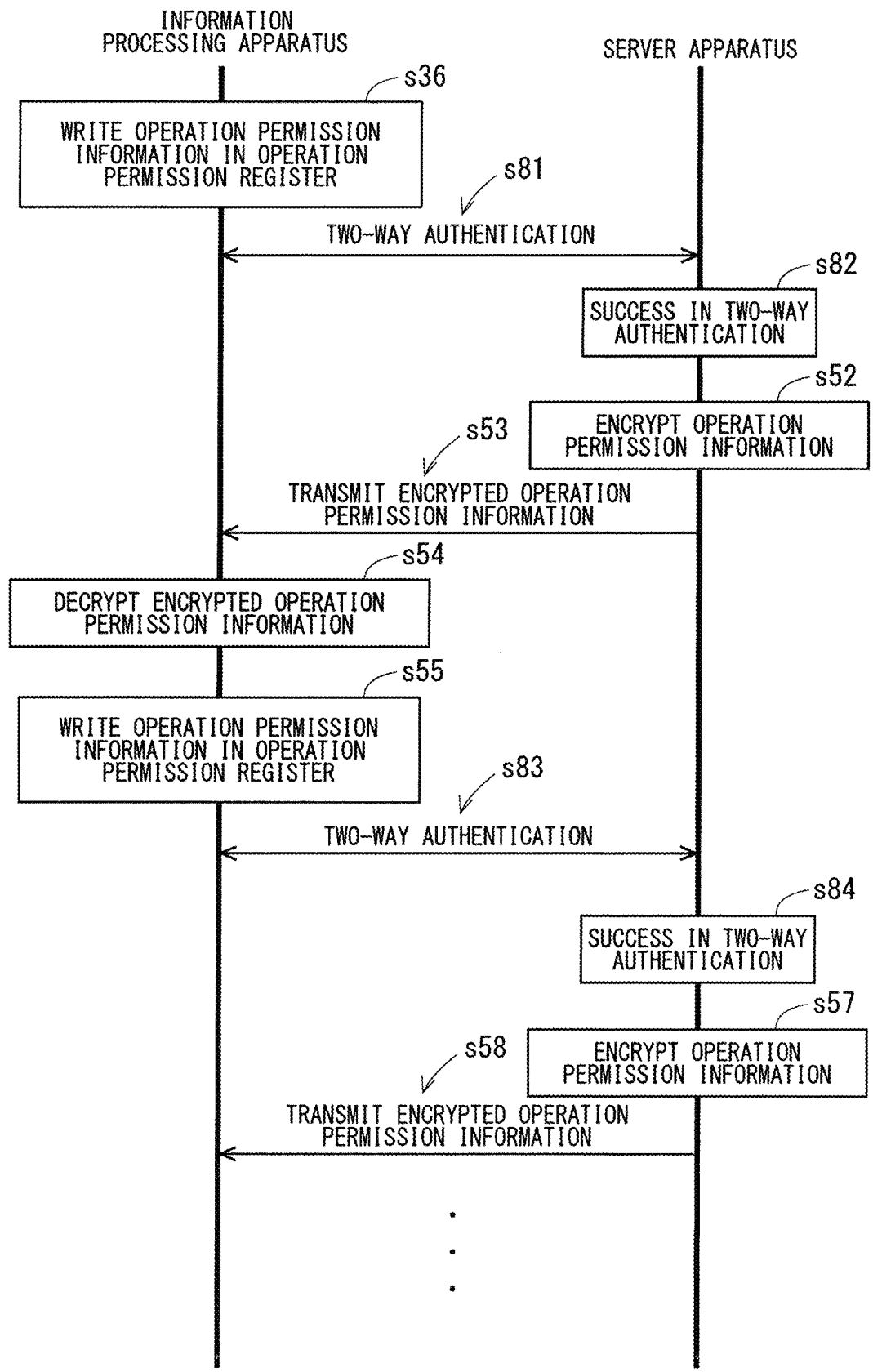
FIG. 14 is a diagram illustrating one example of operation of the information processing system.

Further, the operation permission condition for the server apparatus 2 as to the second or later transmission of operation permission information may be a success in the two-way authentication. FIG. 14 is a diagram illustrating one example of operation of the server apparatus 2 and the information processing apparatus 3 in such a case. FIG. 14 corresponds to FIG. 10 described above.

As illustrated in FIG. 14, after Step s36, in Step s81, two-way authentication between the server apparatus 2 and the information processing apparatus 3 is performed. Subsequently, when the server apparatus 2 determines that the two-way authentication has succeeded in Step s82, the server apparatus 2 executes Steps s52 and s53 described above, and transmits encrypted operation permission information to the information processing apparatus 3.

When the information processing apparatus 3 receives the encrypted operation permission information, the information processing apparatus 3 executes Steps s54 and s55 described above, and writes cleartext operation permission information in the operation permission register 450. With this, the operable period is updated.

Next, in Step s83, two-way authentication between the server apparatus 2 and the information processing apparatus 3 is performed. Subsequently, when the server apparatus 2 determines that the two-way authentication has succeeded in Step s84, the server apparatus 2 executes Steps s57 and s58 described above, and transmits encrypted operation permission information to the information processing apparatus 3. After this operation, each of the information processing apparatus 3 and the server apparatus 2 operates in a similar manner.

Note that, in the second or later transmission of operation permission information performed by the server apparatus 2, the operation permission condition of a success in the two-way authentication and the operation permission condition of reception of a request signal in the server apparatus 2 may be used together. For example, Step s51 of FIG. 10 may be executed instead of Steps s81 and s82 in the flowchart of FIG. 14.

In the above example, the operation mode of the controller 410 includes the normal mode and the secure mode. However, the controller 410 may invariably operate in the secure mode. In this case, all the above-described operation of the controller 410 is executed in the secure mode.

As described above, in this example, the information processing apparatus 3 activates the permission target function, in response to the operation permission information received from the server apparatus 2. Thus, the information processing apparatus 3 can stop the permission target function when the information processing apparatus 3 is hacked and is thereby inhibited from receiving the operation permission information from the server apparatus 2. Consequently, the probability that the permission target function of the information processing apparatus 3 is used by a hacker can be reduced. As a result, security of the information processing apparatus 3 is enhanced.

For example, suppose the main apparatus 30 connected to the communication network 4 is hacked, and the information processing apparatus 3 is thereby caused to frequently communicate with a communication apparatus different from the server apparatus 2 being an intended communication destination, as in a case of a denial of service (DoS) attack. In this case, the server apparatus 2 being an intended communication destination of the information processing apparatus 3 cannot receive a signal from the information processing apparatus 3. Thus, the operation permission condition is not satisfied. As a result, the server apparatus 2 does not transmit operation permission information. With this, the operation of the main apparatus 30 of the information processing apparatus 3 stops. As a result, the probability that the main function and the server communication function of the information processing apparatus 3 are used by a hacker can be reduced. In addition, the stop of the server communication function of the information processing apparatus 3 can reduce the probability that a hacked information processing apparatus 3 causes an adverse external influence.

As another example, suppose the operation control apparatus 40 in the normal mode capable of communicating with the main apparatus 30 is hacked when the operation mode of the controller 410 includes the normal mode and the secure mode, and the communication unit 470 of the operation control apparatus 40 is thereby inhibited from communicating with the main apparatus 30. In this case, the server apparatus 2 cannot receive a signal (for example, a request signal, a random number to be used for two-way authentication, or the like) necessary for satisfaction of the operation permission condition from the information processing apparatus 3, and thus does not transmit operation permission information. With this, the operation of the main apparatus 30 of the information processing apparatus 3 stops. As a result, the probability that the permission target function is used by a hacker can be reduced.

Further, in this example, the main apparatus 30, i.e., a circuit for implementing the permission target function of the information processing apparatus 3, and the operation control apparatus 40 are contained in packages different from each other. Thus, for example, a high-security information processing apparatus 3 can be easily implemented by separately connecting the operation control apparatus 40 to a finished existing device functioning as the main apparatus 30.

A series of processing from execution of the processing for operation permission performed by the information processing apparatus 3 to writing of the operation permission information into the operation permission register 450 performed by the information processing apparatus 3, such as the series of processing of Steps s51 to s55 illustrated in FIG. 10 described above and the series of processing of Steps s81, s82, and s52 to s55 illustrated in FIG. 14 described above, may be hereinafter referred to as a "series of processing from an operation permission request to operation permission".

<One Example of Procedure for Restoring Operation of Main Apparatus>

When the supply of the clock signal CLK to the main apparatus 30 stops and the operation of the main apparatus 30 stops accordingly, for example, the user can cause the information processing apparatus 3 to restore the operation of the main apparatus 30 by operating the reset switch 50.

When the reset switch 50 is operated, the reset signal generator 490 asserts the reset signal RS. With this, the operation of the information processing apparatus 3 is initialized. When the operation of the information processing apparatus 3 is initialized, as described above, the initial value M is set in the operation permission register 450, enabling the main apparatus 30 to operate for the initial operable period. In the initial operable period, the information processing apparatus 3 executes processing for operation permission (for example, two-way authentication or transmission of a request signal) with the server apparatus 2. When the operation permission condition is satisfied as a result of the execution of the processing for operation permission, operation permission information is set in the operation permission register 450. With this, the operable period is set in the information processing apparatus 3, enabling the main apparatus 30 to operate continuously.

Note that, as described above, the reset signal generator 490 asserts the reset signal RS when power of the information processing apparatus 3 is switched from OFF to ON. Thus, when a power switch is provided in the information processing apparatus 3, the user can cause the information processing apparatus 3 to restore the operation of the main apparatus 30 by operating the power switch, specifically, by turning off power of the information processing apparatus 3 once and then turning on the power again.

Figure 15:
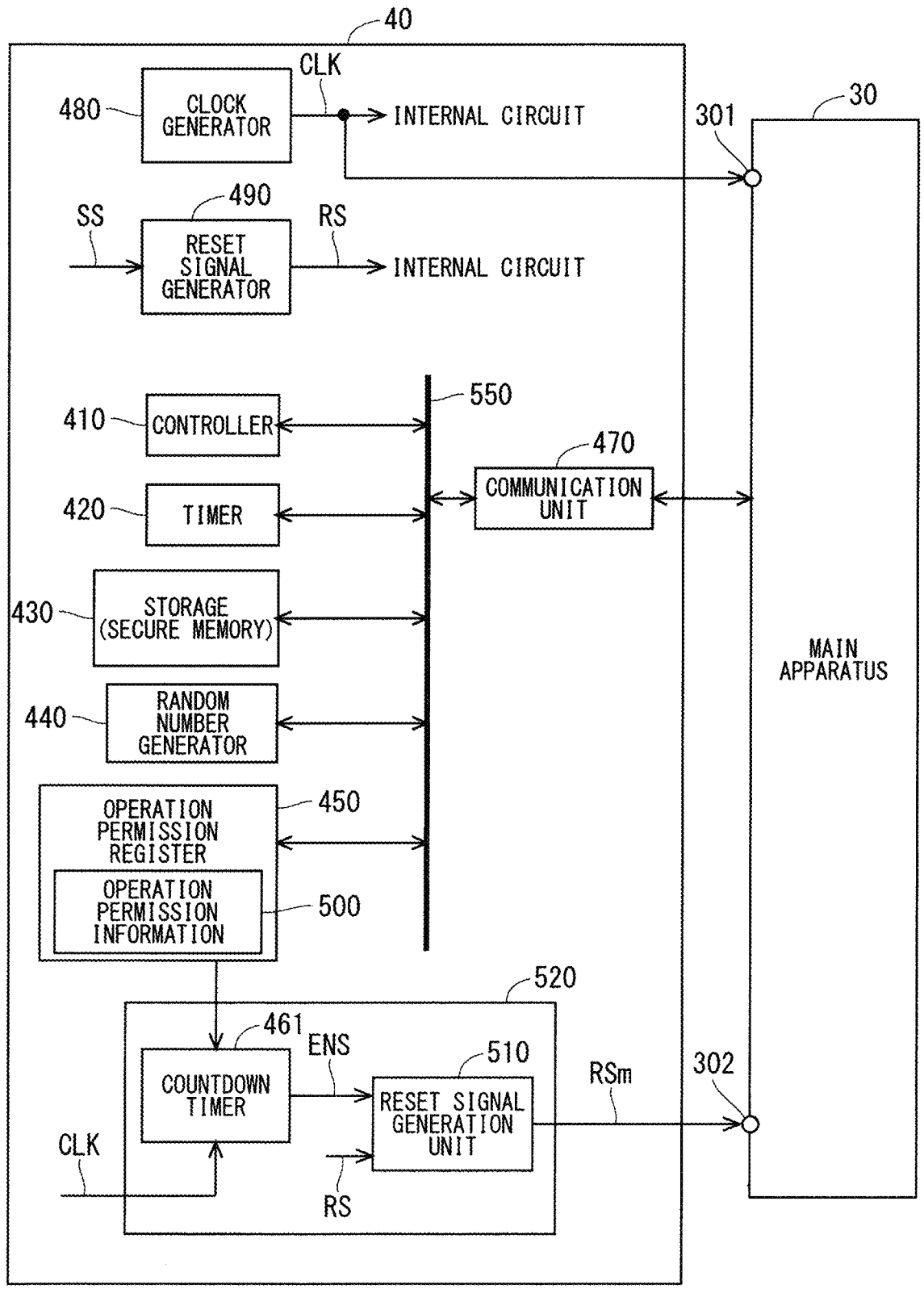
FIG. 15 is a diagram illustrating one example of a configuration of the operation control apparatus.

In the above example, the information processing apparatus 3 stops the permission target function by stopping the supply of the clock signal CLKm to the main apparatus 30. However, the information processing apparatus 3 may stop the permission target function by asserting a reset signal to be input into the main apparatus 30. FIG. 15 is a diagram illustrating one example of a configuration of the operation control apparatus 40 of the information processing apparatus 3 in such a case. The operation control apparatus 40 illustrated in FIG. 15 generates a reset signal RSm for the main apparatus 30, separately from the reset signal RS. It can also be said that the reset signal RS is a reset signal for the operation control apparatus 40.

In comparison with the operation control apparatus 40 illustrated in FIG. 5, the operation control apparatus 40 illustrated in FIG. 15 does not include the clock gate 462. Further, in the operation control apparatus 40 illustrated in FIG. 15, the clock signal CLK output by the clock generator 480 is directly input into the clock input port 301 of the main apparatus 30. Further, a reset signal generator 510 for generating the reset signal RSm is provided in the operation control apparatus 40 illustrated in FIG. 15. Instead of the reset signal RS, the reset signal RSm is input into the reset input port 302 of the main apparatus 30. In the example of FIG. 15, the countdown timer 461 and the reset signal generator 510 constitute an operation controller 520 that controls whether or not to activate the main apparatus 30.

The reset signal RS and the enable signal ENS output from the countdown timer 461 are input into the reset signal generator 510. When the reset signal RS to be input is asserted, the reset signal generator 510 asserts the reset signal RSm for the main apparatus 30. Thus, when the reset signal RS is asserted, the reset signal RSm is asserted. With this, the operation of the main apparatus 30 is initialized.

Further, the reset signal generator 510 asserts the reset signal RSm when the enable signal ENS is at the Low level. In other words, the reset signal generator 510 asserts the reset signal RSm when the countdown timer 461 does not perform count operation. In contrast, the reset signal generator 510 does not assert the reset signal RSm when the enable signal ENS is at the High level. In other words, the reset signal generator 510 negates the reset signal RSm when the countdown timer 461 performs count operation. Other operation of the operation control apparatus 40 illustrated in FIG. 15 is similar to that of the operation control apparatus 40 illustrated in FIG. 5 described above.

In the operation control apparatus 40 having such a configuration, when the initial value is set in the operation permission register 450 after reset of the information processing apparatus 3 is released, the enable signal ENS shifts from the Low level to the High level, and the reset signal RSm to be input into the reset input port 302 of the main apparatus 30 is negated accordingly. With this, the main apparatus 30 can operate for the initial operable period. When the operation permission condition is satisfied in the initial operable period and the operation permission information 500 is set in the operation permission register 450, the enable signal ENS remains at the High level, and the main apparatus 30 continues its operation. If the operation permission information 500 in the operation permission register 450 is not updated afterwards, the reset signal RSm to be input into the reset input port 302 is asserted after the elapse of the operable period currently set in the information processing apparatus 3. As a result, the operation of the main apparatus 30 is stopped.

As described above, also when the permission target function is stopped by the information processing apparatus 3 asserting the reset signal to be input into the main apparatus 30, security of the information processing apparatus 3 can be enhanced in a manner similar to the above.

Further, the main apparatus 30 and the operation control apparatus 40 may be contained in the same package. FIG. 16 is a diagram illustrating one example of a configuration of the information processing apparatus 3 in such a case. In the example illustrated in FIG. 16, the main apparatus 30 and the operation control apparatus 40 are contained in the same package 600 made of resin or the like. Further, the main apparatus 30 and the operation control apparatus 40 contained in the same package 600 are mounted on the substrate 60. The main apparatus 30 and the operation control apparatus 40 are electrically connected to each other by wiring provided in the package 600. An integrated circuit including the main apparatus 30 and the operation control apparatus 40 contained in the same package 600 may consist of a plurality of dies, or may consist of a single die.

Figure 17:
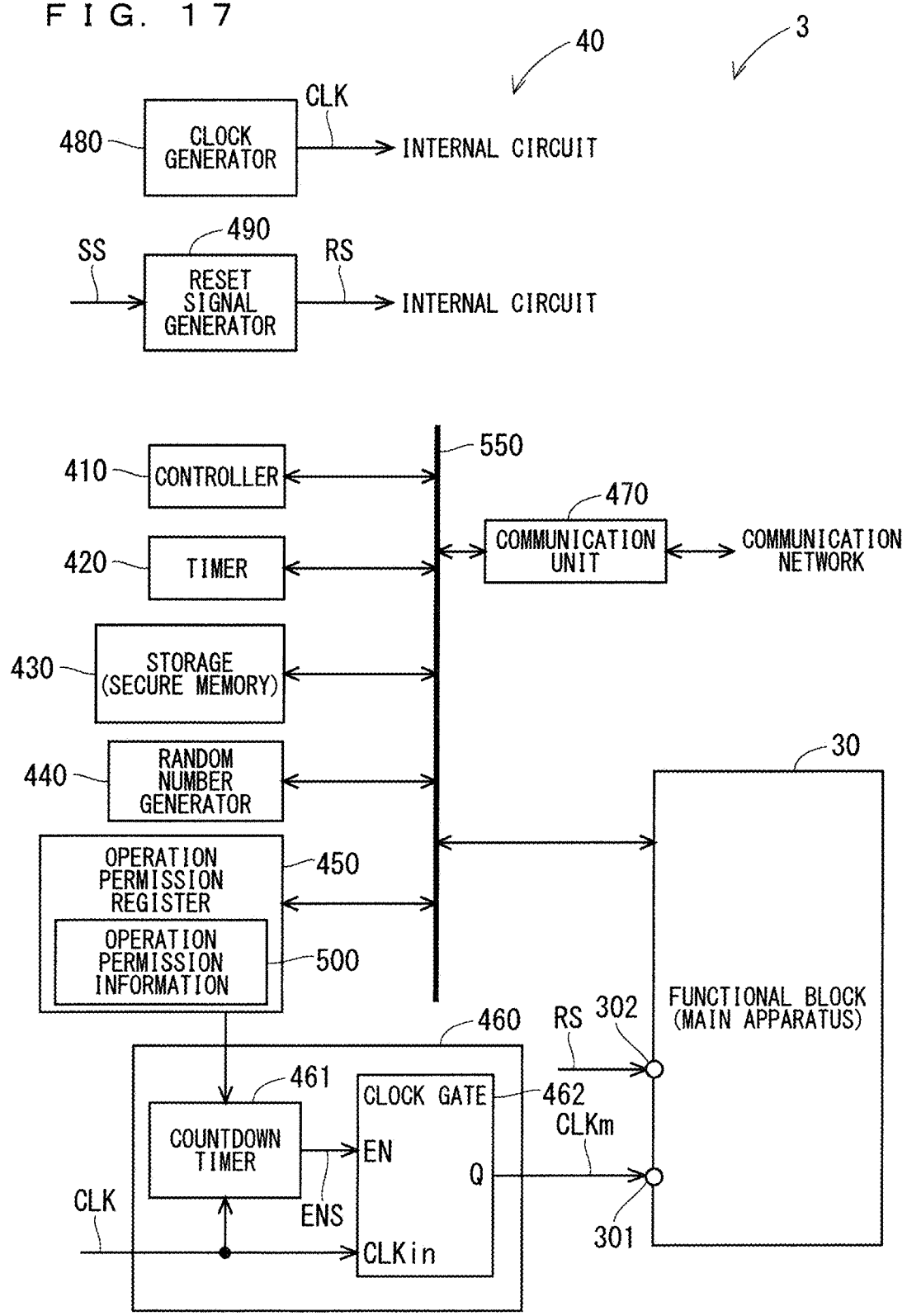
FIG. 17 is a diagram illustrating one example of a configuration of the information processing apparatus.

Further, when the main apparatus 30 and the operation control apparatus 40 are contained in the same package 600 as in FIG. 16, the communication unit 470 of the operation control apparatus 40 may communicate with the communication network 4, instead of the second communication unit 350 of the main apparatus 30. FIG. 17 is a diagram illustrating one example of a configuration of the information processing apparatus 3 in such a case. FIG. 17 omits illustration of the reset switch 50.

In the example of FIG. 17, the communication unit 470 of the operation control apparatus 40 is connected to the communication network 4. The communication unit 470 can communicate with the server apparatus 2 via the communication network 4. Further, the main apparatus 30 is connected to the bus 550. The main apparatus 30 connected to the bus 550 may be hereinafter referred to as a "functional block 30".

As illustrated in FIG. 18, for example, the functional block 30 includes the controller 310, the storage 320, the sensor apparatus 330, and the processing circuit 360 described above, and these are connected to the bus 380. The functional block 30 does not include the first communication unit 340 and the second communication unit 350 described above. The controller 310 is connected to the bus 550 of the operation control apparatus 40, and exchanges information with the controller 410 via the bus 550. The controller 410 of the operation control apparatus 40 exchanges information with the controller 310 of the functional block 30 when the operation mode is the normal mode. Further, the controller 310 of the functional block 30 is inhibited from directly accessing the timer 420, the storage 430, and the operation permission register 450 of the operation control apparatus 40 via the bus 550.

In the information processing apparatus 3 having such a configuration, information to be transmitted from the information processing apparatus 3 to the server apparatus 2, such as a random number, a request signal, and processed sensor information, is transmitted from the communication unit 470 to the server apparatus 2. Further, information to be transmitted from the server apparatus 2 to the information processing apparatus 3, such as a random number and operation permission information, is received in the communication unit 470.

Further, in the information acquisition and transmission processing illustrated in FIG. 8 described above, in Step s43, the controller 410 receives processed sensor information from the controller 310 of the functional block 30 via the bus 550, and encrypts the received processed sensor information. Subsequently, in Step s44, the controller 310 causes the communication unit 470 to transmit the encrypted processed sensor information to the server apparatus 2.

Also in the example illustrated in FIG. 17, security of the information processing apparatus 3 can be enhanced in a manner similar to the above. For example, suppose the operation control apparatus 40 in the normal mode capable of communicating with the server apparatus 2 is hacked, and the information processing apparatus 3 is thereby caused to frequently communicate with a communication apparatus different from the server apparatus 2 being an intended communication destination, as in a case of a DoS attack. In this case, the server apparatus 2 being an intended communication destination of the information processing apparatus 3 cannot receive a signal from the information processing apparatus 3. Thus, the operation permission condition is not satisfied. As a result, the server apparatus 2 does not transmit operation permission information. With this, the operation of the functional block 30 of the information processing apparatus 3 stops. As a result, the probability that the permission target function of the information processing apparatus 3 is used by a hacker can be reduced. In the example of FIG. 17, when the supply of the clock signal CLK to the functional block 30 stops, the main function of the information processing apparatus 3 stops accordingly, but the server communication function does not stop. This means that, in the example of FIG. 17, the server communication function is not included in the permission target function.

Note that, in the example of FIG. 17, the functional block 30 need not include the controller 310. FIG. 19 is a diagram illustrating one example of a configuration of the functional block 30 in such a case.

In the example of FIG. 19, the functional block 30 includes the storage 320, the sensor apparatus 330, and the processing circuit 360, but does not include the controller 310. The processing circuit 360 is connected to the bus 550 of the operation control apparatus 40, and is controlled by the controller 310 via the bus 550. The processing circuit 360 can control the sensor apparatus 330. Sensor information output from the sensor apparatus 330 is directly written in the storage 320. The controller 410 of the operation control apparatus 40 can control the processing circuit 360 of the functional block 30 when the operation mode is the normal mode.

When the information processing apparatus 3 including the functional block 30 illustrated in FIG. 19 performs the information acquisition and transmission processing illustrated in FIG. 8, in Step s41, the controller 410 activates the sensor apparatus 330 via the processing circuit 360. Sensor information output from the sensor apparatus 330 is written in the storage 320.

Next, in Step s42, the controller 410 controls the processing circuit 360, and causes the processing circuit 360 to execute predetermined processing on the sensor information in the storage 320. The processing circuit 360 inputs generated processed sensor information into the controller 410.

Next, in Step s43, the controller 410 encrypts the input processed sensor information. Then, in Step s44, the controller 410 causes the communication unit 470 to transmit the generated encrypted processed sensor information to the server apparatus 2.

As described above, even when the functional block 30 does not include the controller 310, security of the information processing apparatus 3 can be enhanced in a manner similar to the above.

Note that, in the example of FIG. 17, the information processing apparatus 3 stops the functional block 30 by stopping the supply of the clock signal CLKm to the functional block 30. However, as in the example of FIG. 15 described above, the information processing apparatus 3 may stop the functional block 30 by generating a reset signal RSm for the functional block 30 and asserting the reset signal RSm.

Figure 20:
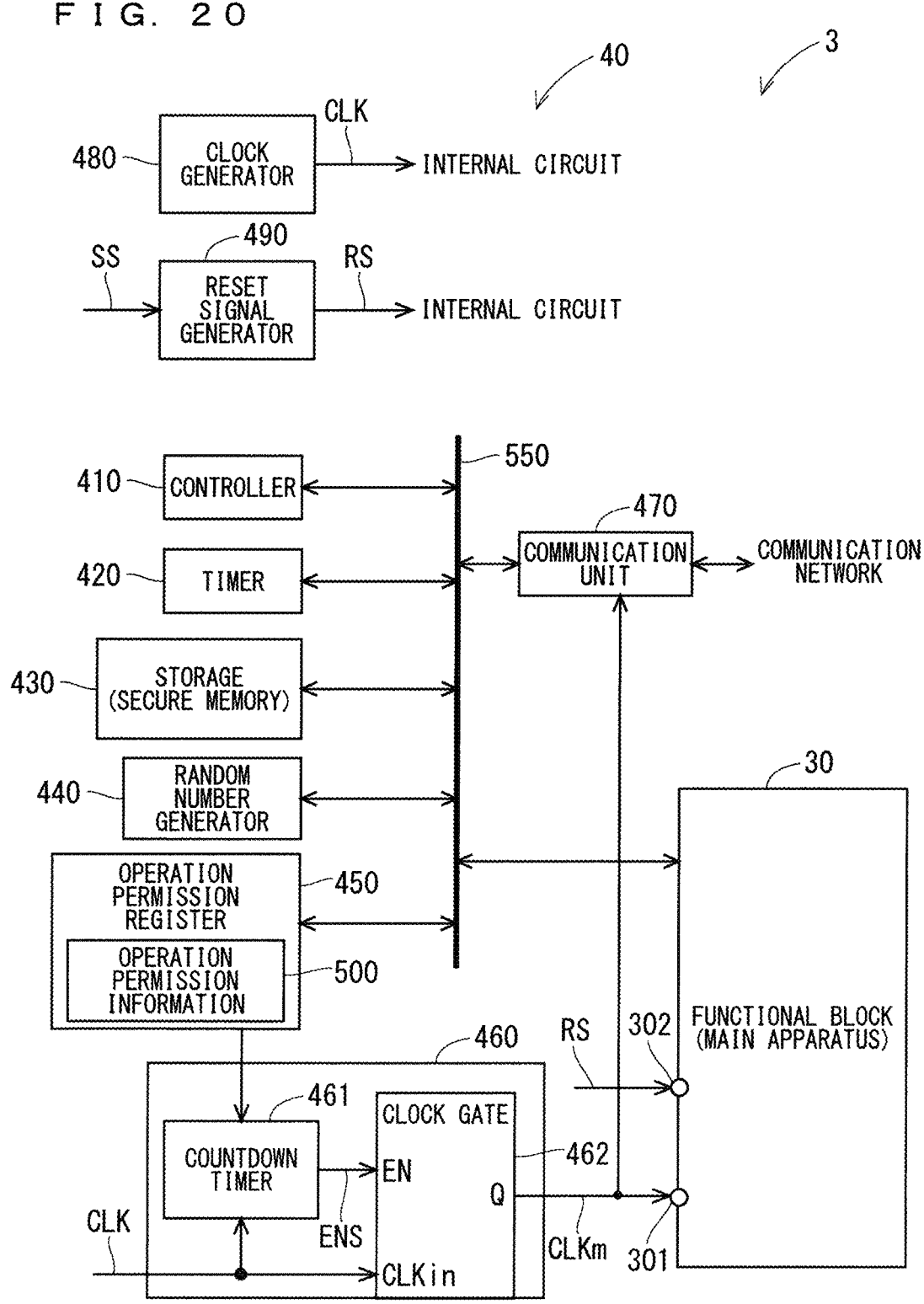
FIG. 20 is a diagram illustrating one example of a configuration of the information processing apparatus.

Further, in the example of FIG. 17, the server communication function is not included in the permission target function. However, the server communication function may be included. For example, as illustrated in FIG. 20, the server communication function can be included in the permission target function by arranging the clock signal CLKm output by the clock gate 462 to be input into the communication unit 470, instead of the configuration in which the clock signal CLK generated by the clock generator 480 is directly input into the communication unit 470.

Figure 21:
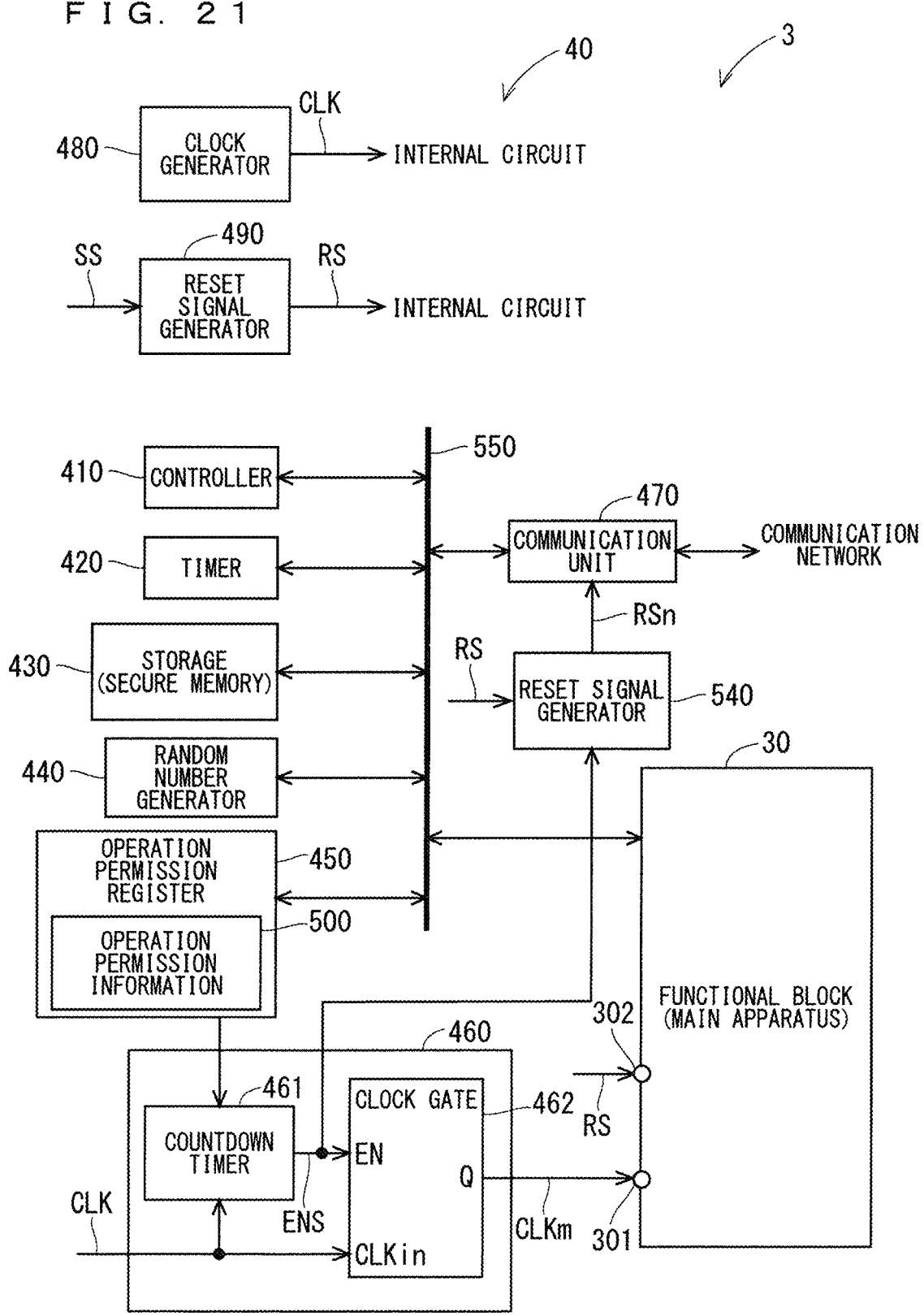
FIG. 21 is a diagram illustrating one example of a configuration of the information processing apparatus.

Further, as illustrated in FIG. 21, the server communication function can be included in the permission target function by providing a reset signal generator 540 that generates a reset signal RSn for the communication unit 470 in the operation control apparatus 40. The reset signal generator 540 asserts the reset signal RSn to be input into the communication unit 470 when the reset signal RS is asserted. Further, the reset signal generator 540 asserts the reset signal RSn when the enable signal ENS shifts to the Low level. With this, the reset signal RSn to be input into the communication unit 470 is negated when the countdown timer 461 performs count operation (when the enable signal ENS is at the High level), and is asserted when the countdown timer 461 does not perform count operation (when the enable signal ENS is at the Low level).

Figure 22:
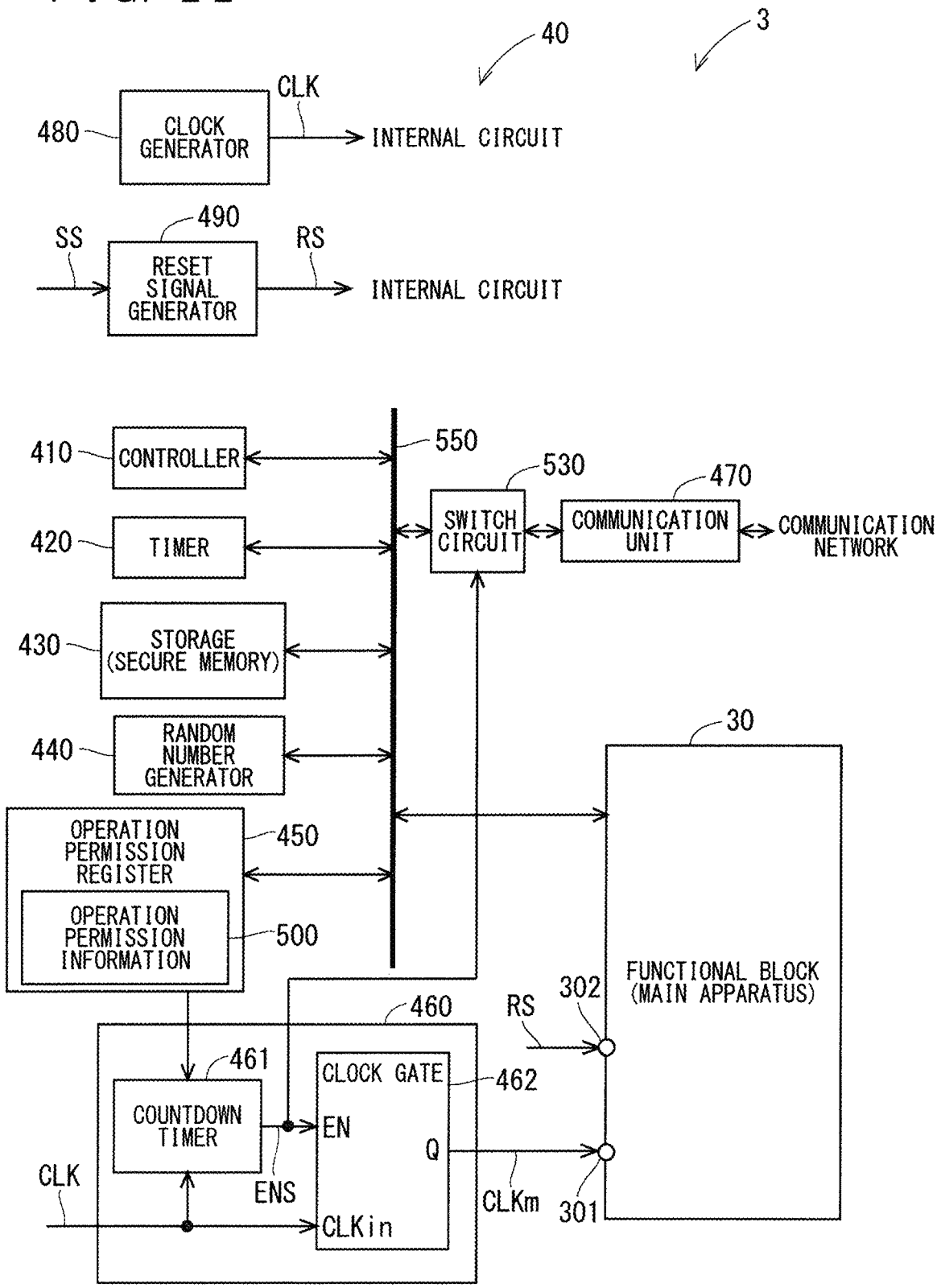
FIG. 22 is a diagram illustrating one example of a configuration of the information processing apparatus.

Further, as illustrated in FIG. 22, the server communication function may be included in the permission target function by providing a switch circuit 530 that controls connection between the bus 550 and the communication unit 470 based on the enable signal ENS. In the example of FIG. 22, the switch circuit 530 connects the communication unit 470 to the bus 550 when the enable signal ENS is at the High level. In this case, the information processing apparatus 3 can communicate with the server apparatus 2 by using the communication unit 470. This causes the server communication function to operate. In contrast, the switch circuit 530 does not connect the communication unit 470 to the bus 550 when the enable signal ENS is at the Low level. In this case, the information processing apparatus 3 cannot communicate with the server apparatus 2 by using the communication unit 470. This causes the server communication function to stop.

In the above example, the main function of the information processing apparatus 3 is included in the permission target function. However, the main function need not be included in the permission target function. For example, in the configuration of FIG. 20, when the clock signal CLK output from the clock generator 480 is directly input into the functional block 30 instead of inputting the clock signal CLKm output from the clock gate 462 into the functional block 30, the main function of the information processing apparatus 3 is omitted from the permission target function. Further, in the configurations of FIGS. 21 and 22, when the clock gate 462 is omitted and the clock signal CLK output by the clock generator 480 is directly input into the functional block 30, the main function of the information processing apparatus 3 is omitted from the permission target function.

<Other Example of Information Processing System>
<Intermittent Operation of Information Processing Apparatus>

FIG. 23 is a diagram illustrating one example of a configuration of the information processing apparatus 3 according to this example in which intermittent operation is performed. In the information processing apparatus 3 according to this example, an operation mode of the entire information processing apparatus 3 includes a non-standby mode, and a standby mode consuming less power than the non-standby mode. The standby mode is also referred to as a low power consumption mode. The information processing apparatus 3 performs intermittent operation by alternately switching the operation mode between the non-standby mode and the standby mode. A period during which the information processing apparatus 3 operates in the non-standby mode may be hereinafter referred to as a "non-standby period", and a period during which the information processing apparatus 3 operates in the standby mode may be hereinafter referred to as a "standby period".

FIG. 24 is a diagram illustrating one example of the intermittent operation of the information processing apparatus 3. As illustrated in FIG. 24, in the information processing apparatus 3, the mode is restored from the standby mode to the non-standby mode once every predetermined period T10. A non-standby period T11 is shorter than a standby period T12. Note that the non-standby period T11 may be longer than the standby period T12, or may be as long as the standby period T12. The predetermined period T10 may be hereinafter referred to as an intermittent operation period T10.

As illustrated in FIG. 23, the information processing apparatus 3 includes a real-time clock (RTC) 70. For example, the RTC 70 is connected to the main apparatus 30 via a communication I/F circuit that can communicate based on SPI or I2C. The RTC 70 can measure a predetermined time period set by the controller 310. After completing measurement of the set predetermined time period, the RTC 70 outputs an interrupt signal INT to the controller 310 of the main apparatus 30 and the operation control apparatus 40.

In the main apparatus 30 according to this example, an operation mode specific to the main apparatus 30 includes a non-standby mode, and a standby mode consuming less power than the non-standby mode. When the operation mode of the main apparatus 30 is the standby mode, for example, the operation of the first communication unit 340, the second communication unit 350, the sensor apparatus 330, the processing circuit 360, etc. stops. The main apparatus 30 performs the intermittent operation of alternately repeating the non-standby mode and the standby mode. The operation mode of the main apparatus 30 is set by the controller 310.

The non-standby mode and the standby mode of the main apparatus 30 may be hereinafter referred to as a "main apparatus-specific non-standby mode" and a "main apparatus-specific standby mode", respectively. Further, the term "non-standby mode" by itself hereinafter refers to the non-standby mode of the entire information processing apparatus 3, and the term "standby mode" by itself hereinafter refers to the standby mode of the entire information processing apparatus 3.

In this example, when the operation mode of the main apparatus 30 is set to the main apparatus-specific standby mode, the operation mode of the entire information processing apparatus 3 is set to the standby mode. Then, when the operation mode of the main apparatus 30 is restored from the main apparatus-specific standby mode to the main apparatus-specific non-standby mode, the operation mode of the information processing apparatus 3 is restored from the standby mode to the non-standby mode.

In the main apparatus 30, when the controller 310 sets the operation mode of the main apparatus 30 to the main apparatus-specific standby mode, the controller 310 outputs a standby signal SB (see FIG. 23) to the operation control apparatus 40. Further, when the controller 310 sets the operation mode of the main apparatus 30 to the main apparatus-specific standby mode, the controller 310 sets a predetermined time period in the RTC 70. The predetermined time period is set to a value substantially the same as the value of the standby period T12.

Figure 25:
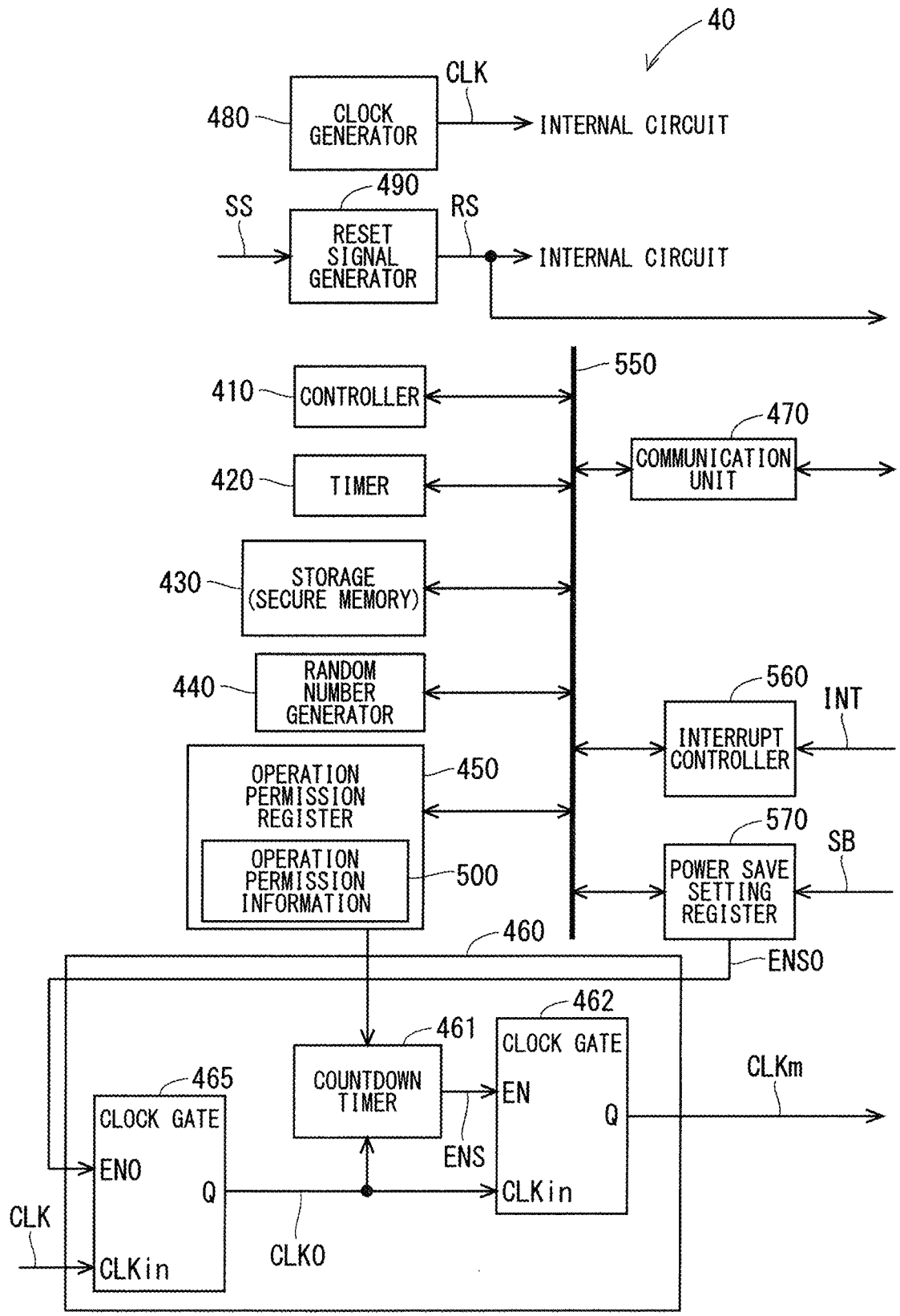
FIG. 25 is a diagram illustrating one example of a configuration of the operation control apparatus.

FIG. 25 is a diagram illustrating one example of a configuration of the operation control apparatus 40 according to this example. The operation control apparatus 40 according to this example includes an interrupt controller 560 and a power save setting register 570. Further, the operation controller 460 of the operation control apparatus 40 according to this example includes a clock gate 465, as well as the countdown timer 461 and the clock gate 462.

The standby signal SB is input into the power save setting register 570. When the standby signal SB is input, power save setting information, which indicates that the information processing apparatus 3 operates in the standby mode, is set in the power save setting register 570.

The power save setting register 570 inputs an enable signal ENS0 for controlling the operation of the clock gate 465 into an enable input port EN0 of the clock gate 465. When the power save setting information is set, the power save setting register 570 sets the enable signal ENS0 to the Low level, whereas when the power save setting information is cleared, the power save setting register 570 sets the enable signal ENS0 to the High level. The clock gate 465 outputs the clock signal CLK input through a clock input port CLKin0 as a clock signal CLK0 only when the enable signal ENS0 input through the enable input port EN0 is at the High level. The clock signal CLK0 output from the clock gate 465 is input into the clock input port CLKin of the clock gate 462. The clock gate 462 outputs the clock signal CLK0 input through the clock input port CLKin as the clock signal CLKm only when the enable signal ENS is at the High level.

When the interrupt signal INT is input from the RTC 70, the interrupt controller 560 reports an interrupt request to the CPU of the controller 410. When the CPU of the controller 410 receives the report of the interrupt request, the CPU clears (i.e., erases) the power save setting information in the power save setting register 570.

The information processing apparatus 3 according to this example having such a configuration as described above operates in the non-standby mode in the initial operable period after reset release. If the operation permission information 500 is set in the operation permission register 450 of the operation control apparatus 40, i.e., if the operation of the main apparatus 30 is permitted by the server apparatus 2, the information processing apparatus 3 performs the intermittent operation of repeating the non-standby mode and the standby mode. The following is a description of one example of operation of the information processing apparatus 3 according to this example when the operation permission information 500 is set in the operation permission register 450.

When the controller 310 of the main apparatus 30 sets the operation mode of the main apparatus 30 to the main apparatus-specific standby mode, the controller 310 outputs the standby signal SB and sets a predetermined time period in the RTC 70.

The standby signal SB output by the main apparatus 30 is input into the power save setting register 570, and power save setting information is set in the power save setting register 570. With this, the enable signal ENS0 output from the power save setting register 570 shifts from the High level to the Low level, and the clock gate 465 stops output of the clock signal CLK0 accordingly. As a result, the clock gate 462 stops output of the clock signal CLKm. With this, the supply of the clock signal CLKm to the main apparatus 30 stops, and the operation mode of the information processing apparatus 3 is set to the standby mode.

After completing measurement of the set predetermined time period after the operation mode of the information processing apparatus 3 is set to the standby mode, for example, the RTC 70 outputs the interrupt signal INT for level detection to the operation control apparatus 40 and the main apparatus 30. In the operation control apparatus 40, when the interrupt controller 560 receives the interrupt signal INT, the interrupt controller 560 reports an interrupt request to the CPU of the controller 410. The CPU of the controller 410 that has received the interrupt request clears the power save setting information in the power save setting register 570. When the power save setting information in the power save setting register 570 is cleared, the enable signal ENS0 shifts from the Low level to the High level. With this, the clock gate 465 outputs the input clock signal CLK to the clock gate 462 as the clock signal CLK0, and the clock gate 462 outputs the input clock signal CLK0 to the main apparatus 30 as the clock signal CLKm. With this, the supply of the clock signal CLKm to the main apparatus 30 is restarted. In contrast, in the main apparatus 30 in which the supply of the clock signal CLKm has been restarted, the controller 310 determines whether or not the interrupt signal INT has been input into the main apparatus 30. When the controller 310 determines that the interrupt signal INT has been input into the main apparatus 30, the controller 310 changes the operation mode of the main apparatus 30 from the main apparatus-specific standby mode to the main apparatus-specific non-standby mode. With this, the operation mode of the information processing apparatus 3 changes from the standby mode to the non-standby mode.

If the controller 310 of the main apparatus 30 sets the operation mode of the main apparatus 30 to the main apparatus-specific standby mode afterwards, the information processing apparatus 3 operates in a similar manner thereafter.

In the information processing apparatus 3 performing the intermittent operation as above, for example, Steps s41 and s42 illustrated in FIG. 8 described above are executed and processed sensor information is stored in storage 320 every time the operation mode is set to the non-standby mode. If the period T10 illustrated in FIG. 24 described above is one hour, for example, in the information processing apparatus 3, sensor information is acquired and processed sensor information is stored in the storage 320 every hour. Further, in the information processing apparatus 3, for example, Steps s43 and s44 described above are executed and encrypted processed sensor information is transmitted to the server apparatus 2 once every X times the operation mode is set to the non-standby mode (X is an integer of 1 or greater). For example, if the period T10 is one hour and X is set to 24, the information processing apparatus 3 encrypts processed sensor information in the storage 320 and transmits the encrypted processed sensor information to the server apparatus 2 once every 24 hours, i.e., once a day.

Further, the information processing apparatus 3 according to the this example performs the series of processing illustrated in FIG. 7 or the series of processing the illustrated in FIG. 13 with the server apparatus 2 when the operation mode is the non-standby mode. Further, the information processing apparatus 3 according to this example executes the series of processing from an operation permission request to operation permission, such as the series of processing of Steps s51 to s55 illustrated in FIG. 10 described above, with the server apparatus 2 when the operation mode is the non-standby mode.

As described above, even when the information processing apparatus 3 performs the intermittent operation according to the operation permission information 500 in the operation permission register 450, security of the information processing apparatus 3 can be enhanced in a manner similar to the above.

Figure 26:
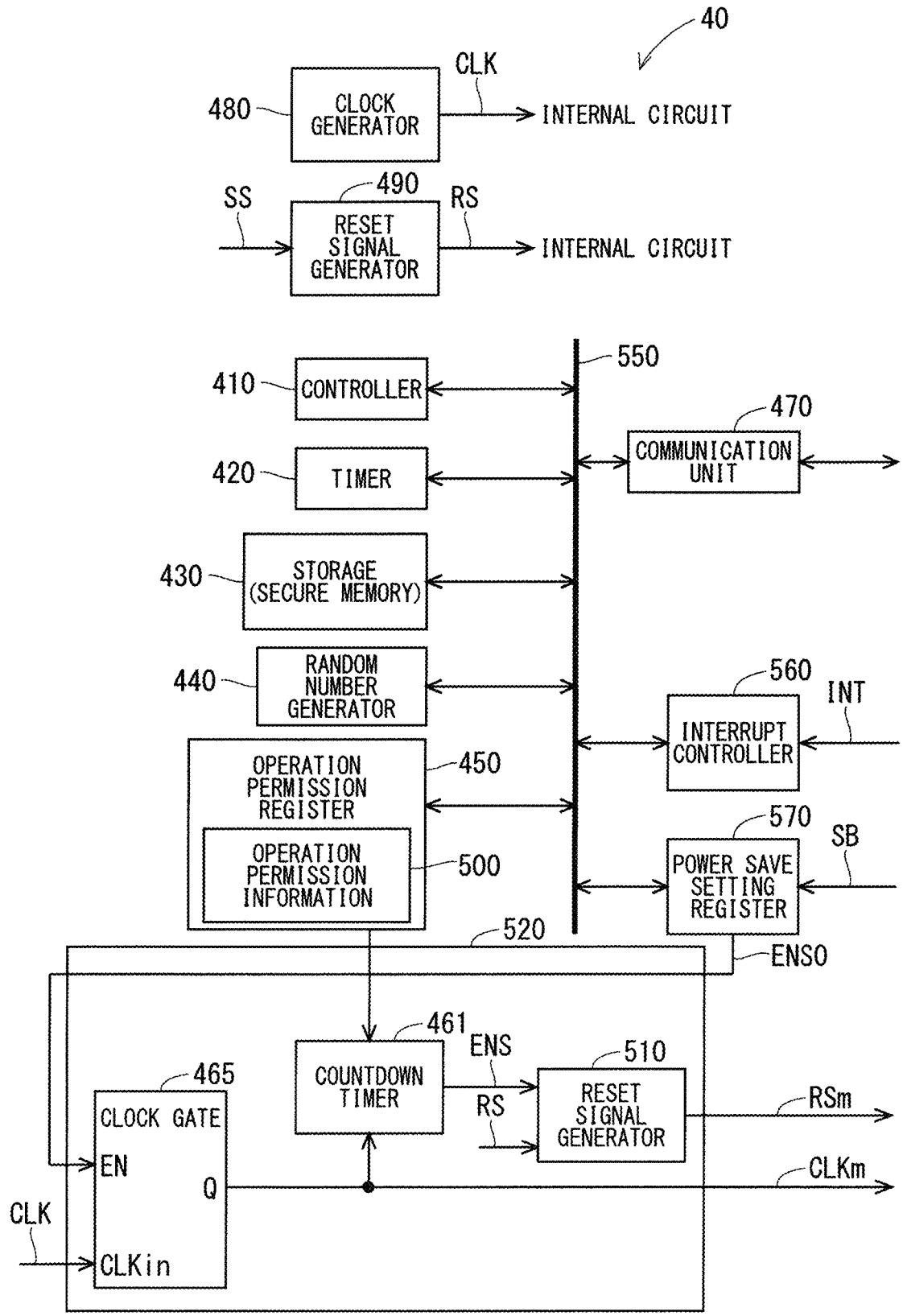
FIG. 26 is a diagram illustrating one example of a configuration of the operation control apparatus.

Note that, as illustrated in FIG. 15, the information processing apparatus 3 that stops the permission target function by generating a reset signal RSm for the main apparatus 30 and negating the reset signal RSm may perform the intermittent operation similar to the above. FIG. 26 is a diagram illustrating one example of a configuration of the operation control apparatus 40 of the information processing apparatus 3 in such a case.

In comparison with the operation control apparatus 40 illustrated in FIG. 15, the operation control apparatus 40 illustrated in FIG. 26 includes the interrupt controller 560, the power save setting register 570, and the clock gate 465 described above. The clock gate 465 is provided in the operation controller 520. The clock gate 465 can output an input clock signal CLK to the main apparatus 30 as the clock signal CLKm.

In the information processing apparatus 3 including the operation control apparatus 40 illustrated in FIG. 26, when the operation mode of the main apparatus 30 is set to the main apparatus-specific standby mode, the standby signal SB is input into the power save setting register 570, and the power save setting information is set in the power save setting register 570. With this, the enable signal ENS0 output from the power save setting register 570 shifts from the High level to the Low level, and the clock gate 465 stops output of the clock signal CLKm accordingly. As a result, the supply of the clock signal CLKm to the main apparatus 30 stops, and the operation mode of the information processing apparatus 3 is set to the standby mode.

When the RTC 70 outputs the interrupt signal INT after the operation mode of the information processing apparatus 3 is set to the standby mode, in the operation control apparatus 40, the interrupt controller 560 reports an interrupt request to the CPU of the controller 410. The CPU of the controller 410 that has received the interrupt request clears the power save setting information in the power save setting register 570. With this, the enable signal ENS0 shifts from the Low level to the High level, and the clock gate 465 outputs the clock signal CLKm to the main apparatus 30 accordingly. In contrast, in the main apparatus 30 in which the supply of the clock signal CLKm has been restarted, the controller 310 determines whether or not the interrupt signal INT has been input into the main apparatus 30. When the controller 310 determines that the interrupt signal INT has been input, the controller 310 changes the operation mode of the main apparatus 30 from the main apparatus-specific standby mode to the main apparatus-specific non-standby mode. With this, the operation mode of the information processing apparatus 3 changes from the standby mode to the non-standby mode. If the operation mode of the main apparatus 30 is set to the main apparatus-specific standby mode afterwards, the information processing apparatus 3 operates in a similar manner thereafter.

Figure 27:
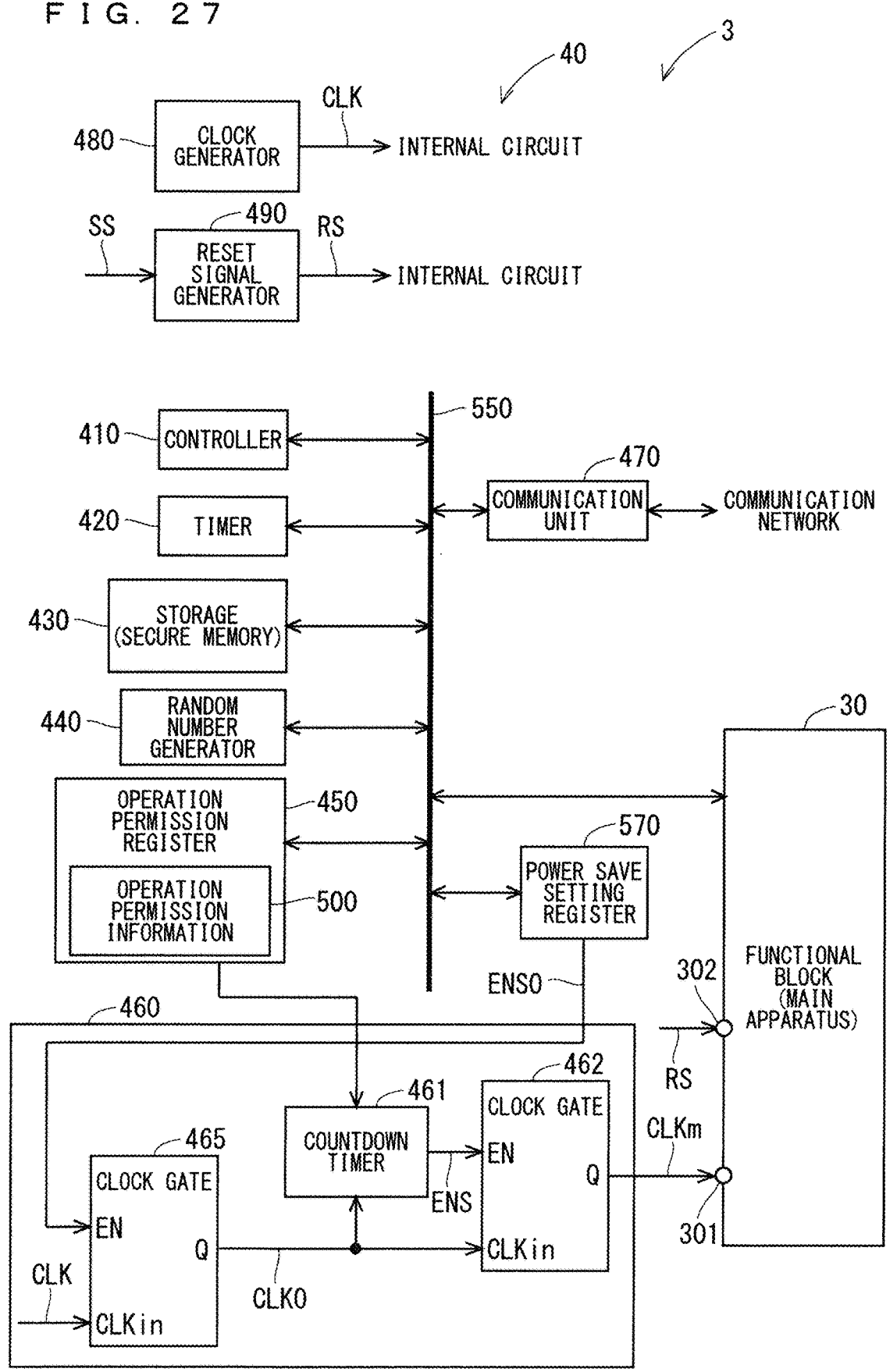
FIG. 27 is a diagram illustrating one example of a configuration of the information processing apparatus.

Further, as illustrated in FIG. 17 described above, the information processing apparatus 3 whose main apparatus 30 as the functional block 30 is connected to the bus 550 of the operation control apparatus 40 may perform the intermittent operation. FIG. 27 is a diagram illustrating one example of a configuration of the information processing apparatus 3 in such a case.

In comparison with the information processing apparatus 3 illustrated in FIG. 17, the information processing apparatus 3 illustrated in FIG. 27 includes the power save setting register 570 and the clock gate 465. The power save setting register 570 is connected to the bus 550. The controller 410 can set power save setting information in the power save setting register 570, and can clear the power save setting information in the power save setting register 570. The clock gate 465 is provided in the operation controller 460, in a similar manner to FIG. 25 described above.

In the information processing apparatus 3 illustrated in FIG. 27, the operation mode is controlled by the controller

410. In the information processing apparatus 3 illustrated in FIG. 27, the operation mode is set to the standby mode when the supply of the clock signal CLKm to the functional block 30 is stopped. Note that, in the example of FIG. 27, the main apparatus-specific non-standby mode and the main apparatus-specific standby mode are not set in the functional block 30.

To set the operation mode to the standby mode, the controller 410 sets power save setting information in the power save setting register 570. With this, the enable signal ENS0 output from the power save setting register 570 shifts from the High level to the Low level, and the clock gate 465 stops output of the clock signal CLK0 accordingly. As a result, the supply of the clock signal CLKm to the functional block 30 stops, and the operation mode of the information processing apparatus 3 is set to the standby mode. Further, the controller 410 sets the power save setting information in the power save setting register 570, and also sets a predetermined time period in the timer 420. The predetermined time period is set to a value the same as the value of the standby period T12.

When the timer 420 ends measurement of the set predetermined time period after the operation mode of the information processing apparatus 3 is set to the standby mode, the controller 410 clears the power save setting information in the power save setting register 570. With this, the enable signal ENS0 shifts from the Low level to the High level, and accordingly, the clock gate 465 outputs the clock signal CLK0 and the clock gate 462 inputs the clock signal CLKm into the functional block 30. With this, the operation of the functional block 30 is restarted, and the operation mode of the information processing apparatus 3 is restored from the standby mode to the non-standby mode. If power save setting information is set in the power save setting register 570 afterwards, the information processing apparatus 3 performs the intermittent operation in a similar manner thereafter.

Note that, in the example of FIG. 27, the server communication function may be included in the permission target function by arranging the clock signal CLKm output from the clock gate 462 to be input into the communication unit 470, in a similar manner to FIG. 20 described above.

Further, in the example of the FIG. 27, the server communication function may be included in the permission target function by providing the reset signal generator 540 that receives input of the enable signal ENS output from the countdown timer 461 and the reset signal RS and that outputs the reset signal RSn to the communication unit 470, in a similar manner to FIG. 21 described above.

Further, in the example of FIG. 27, the server communication function may be included in the permission target function by providing the switch circuit 530 that controls connection between the bus 550 and the communication unit 470 based on the enable signal ENS, in a similar manner to FIG. 22 described above.

Further, in the example of FIG. 27, the main function of the information processing apparatus 3 may be omitted from the permission target function by providing the reset signal generator 540 that receives input of the enable signal ENS output from the countdown timer 461 and the reset signal RS and that outputs the reset signal RSn to the communication unit 470, omitting the clock gate 462, and arranging the clock signal output from the clock gate 465 to be input into the functional block 30.

<Acquisition of Operation Information Related to Operation of Information Processing Apparatus>

Figure 28:
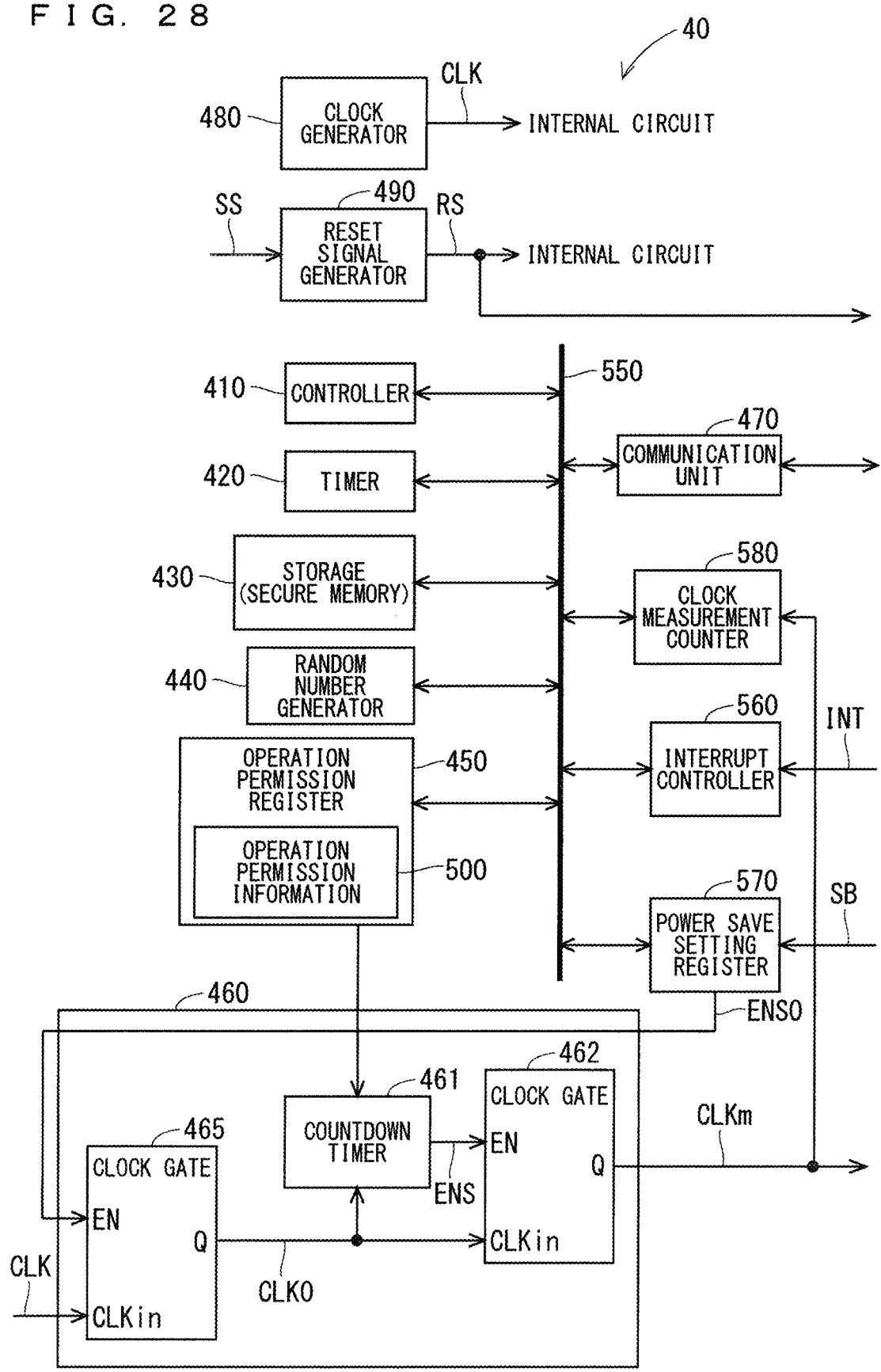
FIG. 28 is a diagram illustrating one example of a configuration of the operation control apparatus.

FIG. 28 is a diagram illustrating one example of a configuration of the operation control apparatus 40 including the information processing apparatus 3 according to this example that acquires operation information related to operation of the information processing apparatus 3. The information processing apparatus 3 according to this example can perform the intermittent operation, in a similar manner to the above example. The information processing apparatus 3 according to this example acquires information related to the intermittent operation as the operation information while the information processing apparatus 3 performs the intermittent operation. Note that the configuration of the main apparatus 30 of the information processing apparatus 3 according to this example is similar to the configuration of the main apparatus 30 of the information processing apparatus 3 illustrated in FIG. 23 described above.

As illustrated in FIG. 28, the operation control apparatus 40 according to this example further includes a clock measurement counter 580, in comparison with the operation control apparatus 40 illustrated in FIG. 25 described above. The clock measurement counter 580 is connected to the bus 550, and is controlled by the controller 410. The clock measurement counter 580 can measure the number of input clocks of the clock signal CLK supplied to the main apparatus 30.

In this example, for example, the clock measurement counter 580 measures the number of clocks input into the main apparatus 30 being supplied with the clock signal CLK in a predetermined period while the information processing apparatus 3 performs the intermittent operation. The predetermined period may be hereinafter referred to as a "clock measurement period".

For example, the clock measurement period is set to an integer multiple of the intermittent operation period T10 (see FIG. 24). In this example, a measurement value of the clock measurement counter 580 is used as the operation information. It can be said that the clock measurement counter 580 functions as an operation information acquisition unit that acquires operation information. The controller 410 controls the clock measurement counter 580 and causes the clock measurement counter 580 to measure the number of clocks input into the main apparatus 30 while the information processing apparatus 3 performs the intermittent operation. Further, the controller 410 can access the clock measurement counter 580 only when the controller 410 operates in the secure mode. Thus, the controller 410 can start operation of the clock measurement counter 580, retrieve a measurement value from the clock measurement counter, and reset the measurement value of the clock measurement counter only when the controller 410 operates in the secure mode.

Here, in this example, the clock signal CLK is supplied to the main apparatus 30 while the information processing apparatus 3 operates in the non-standby mode. Thus, it can be said that the number of clocks input into the main apparatus 30 in a predetermined period to be measured in the clock measurement counter 580 is information indicating a partial time period of the predetermined period during which the information processing apparatus 3 operates in the non-standby mode. In other words, it can be said that the measurement value in the clock measurement period in the clock measurement counter 580 is information indicating a partial time period of the clock measurement period during which the main function of the information processing apparatus 3 operates. The measurement value of the number of clocks in the clock measurement counter 580 may be hereinafter referred to as a "clock measurement value".

Figure 29:
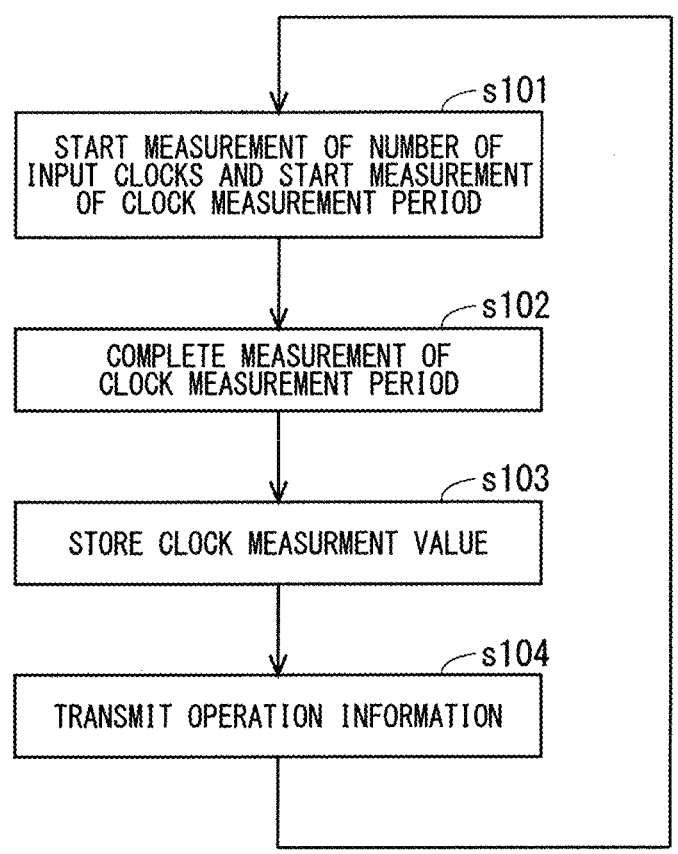
FIG. 29 is a flowchart illustrating one example of operation of the information processing apparatus.

FIG. 29 is a flowchart illustrating one example of operation of the information processing apparatus 3 when the controller 410 controls the clock measurement counter 580 while the information processing apparatus 3 performs the intermittent operation. In this example, the information processing apparatus 3 transmits a clock measurement value of the clock measurement counter 580 to the server apparatus 2.

As illustrated in FIG. 29, in Step s101, the controller 410 activates the clock measurement counter 580, and causes the clock measurement counter 580 to start measurement of the number of clocks. In addition, the controller 410 sets a clock measurement period in the timer 420, and causes the timer 420 to start measurement of the clock measurement period.

Next, when the timer 420 completes measurement of the clock measurement period in Step s102, in Step s103, the controller 410 causes the clock measurement counter 580 to stop the measurement operation, and acquires the current clock measurement value from the clock measurement counter 580. Then, the controller 410 stores the acquired clock measurement value in the storage 430. Subsequently, the controller 410 resets the clock measurement value of the clock measurement counter 580 to 0. It can be said that the clock measurement value stored in the storage 430 is a clock measurement value in the clock measurement period. In other words, the clock measurement value stored in the storage 430 indicates a total number of clocks input into the main apparatus 30 in the clock measurement period.

Next, in Step s104, the controller 410 retrieves the clock measurement value from the storage 430 and encrypts the retrieved clock measurement value, and causes the communication unit 470 to transmit the encrypted clock measurement value, when the operation mode of the information processing apparatus 3 is the non-standby mode. With this, the encrypted clock measurement value is input into the main apparatus 30. The main apparatus 30 causes the second communication unit 350 to transmit the encrypted clock measurement value received by the first communication unit 340 to the server apparatus 2 as the operation information.

After Step s104, Step s101 is executed again, and the information processing apparatus 3 operates in a similar manner thereafter. The information processing apparatus 3 repeatedly executes the series of processing of Steps s101 to s104 while the information processing apparatus 3 performs the intermittent operation.

Figure 30:
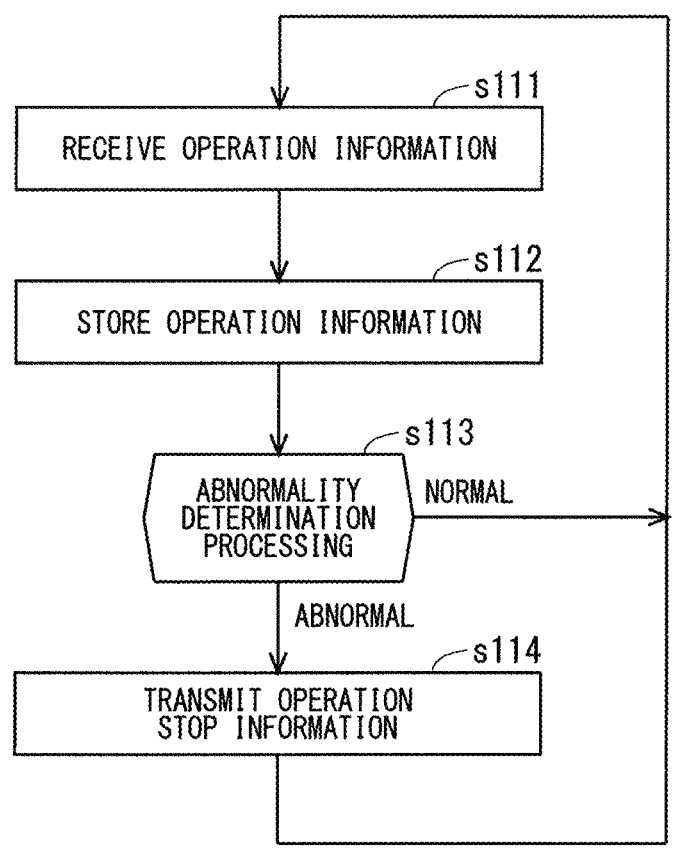
FIG. 30 is a flowchart illustrating one example of operation of the server apparatus.

FIG. 30 is a diagram illustrating one example of operation of the server apparatus 2 when the server apparatus 2 receives the operation information. i.e., the clock measurement value. As illustrated in FIG. 30, when the communication unit 22 of the server apparatus 2 receives the operation information in Step s111, the controller 20 stores the received operation information in the storage 21 in Step s112. In this case, the controller 20 decrypts the operation information, i.e., the encrypted clock measurement value, and stores a cleartext clock measurement value obtained through the decryption in the storage 21.

Next, in Step s113, the controller 20 executes abnormality determination processing of determining whether or not the operation of the information processing apparatus 3 is abnormal, based on the clock measurement value in the storage 21. The abnormality determination processing will be described later in detail.

If it is determined that the operation of the information processing apparatus 3 is abnormal as a result of the abnormality determination processing performed in Step s113, in Step s114, the server apparatus 2 transmits operation stop information, which is information for commanding a stop of a predetermined function of the information processing apparatus 3, to the information processing apparatus 3. The predetermined function may be hereinafter referred to as a "stop target function".

In Step s114, the controller 20 generates the operation stop information for commanding a stop of the stop target function, and inputs the generated operation stop information into the communication unit 22. The communication unit 22 transmits the input operation stop information to the information processing apparatus 3. For example, the stop target function is the main function and the server communication function of the information processing apparatus 3. After Step s114, when Step s111 is executed, the server apparatus 2 operates in a similar manner thereafter. Further, if it is determined that the operation of the information processing apparatus 3 is normal as a result of the abnormality determination processing performed in Step s113 and then Step s111 is executed, the server apparatus 2 operates in a similar manner thereafter.

FIG. 31 is a flowchart illustrating one example of operation of the information processing apparatus 3 when the information processing apparatus 3 performing the intermittent operation receives the operation stop information. For example, Steps s111 to s114 of FIG. 30 performed subsequently to Step s104 of FIG. 29 and Steps s121 and s122 of FIG. 31 performed subsequently to Step s114 are executed within the same non-standby period T11 (see FIG. 24) in which the operation information is transmitted in Step s104.

As illustrated in FIG. 31, in Step s121, the information processing apparatus 3 operating in the non-standby mode receives the operation stop information from the server apparatus 2. In Step s121, the second communication unit 350 of the main apparatus 30 receives the operation stop information, and the controller 310 writes the received operation stop information in the storage 320.

Next, in Step s122, the information processing apparatus 3 stops the stop target function. In Step s122, the controller 310 retrieves the operation stop information from the storage 320, and causes the first communication unit 340 to transmit the retrieved operation stop information. With this, the operation stop information is input into the operation control apparatus 40. In the operation control apparatus 40, the controller 410 writes the operation stop information received in the communication unit 470 in the operation permission register 450. Here, for example, the operation stop information indicates a value "0". Thus, when the operation stop information is written in the operation permission register 450, the value "0" is set in the operation permission register 450. With this, the count value of the countdown timer 461 is set to 0, and the count operation of the countdown timer 461 stops. When the count operation of the countdown timer 461 stops, the enable signal ENS shifts to the Low level, and the clock gate 462 stops output of the clock signal CLKm. With this, the operation of the main apparatus 30 stops. In other words, the stop target function stops. As a result, the intermittent operation of the information processing apparatus 3 stops.

As described above, in this example, when the server apparatus 2 determines that the operation of the information processing apparatus 3 is abnormal based on the operation information acquired in the information processing apparatus 3, the information processing apparatus 3 stops the stop target function. When the reset switch 50 is operated after the stop of the stop target function, for example, the operation of the main apparatus 30 is restored, and the permission target function is restored.

<One Example of Abnormality Determination Processing>

In this example, as described above, the operation information is a clock measurement value in the clock measurement period. It can be said that the clock measurement value in the clock measurement period is information indicating a partial time period of the clock measurement period during which the information processing apparatus 3 operates in the non-standby mode. When the information processing apparatus 3 normally performs the intermittent operation, the partial time period of the clock measurement period during which the information processing apparatus 3 operates in the non-standby mode is fixed. For example, suppose the ratio between the non-standby period T11 and the standby period T12 when the information processing apparatus 3 normally performs the intermittent operation is 1:9, and the clock measurement period is an integer multiple of the intermittent operation period T10. In this case, when the information processing apparatus 3 normally performs the intermittent operation, the partial time period of the clock measurement period during which the information processing apparatus 3 operates in the non-standby mode is one-tenth of the clock measurement period. Thus, when the information processing apparatus 3 normally performs the intermittent operation, the clock measurement value in the clock measurement period is fixed. The clock measurement value in the clock measurement period when the information processing apparatus 3 normally performs the intermittent operation may be hereinafter referred to as a "first reference value".

In contrast, when the main apparatus 30 is hacked and the main apparatus 30 is thereby inhibited from performing the intermittent operation and caused to invariably communicate with the server apparatus 2 to carry out a DoS attack on the server apparatus 2, the standby signal SB is not output from the main apparatus 30, and the clock gate 462 invariably outputs the clock signal CLK. In this case, the number of clocks measured by the clock measurement counter 580 in the clock measurement period is larger than the first reference value. Further, when the main apparatus 30 is hacked and the period in which the main apparatus 30 performing the intermittent operation operates in the non-standby mode is thereby reduced, the number of clocks measured by the clock measurement counter 580 in the clock measurement period is smaller than the first reference value.

In view of this, in the abnormality determination processing according to this example, the controller 20 of the server apparatus 2 determines whether or not the operation information from the information processing apparatus 3, i.e., the clock measurement value in the clock measurement period, and the first reference value match. The first reference value is stored in the storage 21 in advance. If the controller 20 determines that the clock measurement value in the clock measurement period matches the first reference value, the controller 20 determines that the operation of the information processing apparatus 3 is normal. In contrast, if the controller 20 determines that the clock measurement value in the clock measurement period does not match the first reference value, the controller 20 determines that the operation of the information processing apparatus 3 is abnormal.

Note that, in the abnormality determination processing, the controller 20 may determine whether or not the clock measurement value in the clock measurement period falls within a predetermined range. In this case, if the controller 20 determines that the clock measurement value in the clock measurement period falls within the predetermined range, the controller 20 determines that the operation of the information processing apparatus 3 is normal. In contrast, if the controller 20 determines that the clock measurement value in the clock measurement period falls outside the predetermined range, the controller 20 determines that the operation of the information processing apparatus 3 is abnormal. For example, the predetermined range is set to range from a value that is smaller than the first reference value by a first predetermined value to a value that is larger than the first reference value by a second predetermined value. The first and second predetermined values may be either the same or different.

As described above, in this example, the operation control apparatus 40 as the operation control apparatus acquires operation information related to operation of the information processing apparatus 3, enabling execution of processing using the operation information acquired in the operation control apparatus 40. For example, as described above, when the operation information acquired in the operation control apparatus 40 is transmitted to the server apparatus 2, the server apparatus 2 can execute processing using the received operation information. For example, the server apparatus 2 can determine whether or not the operation of the information processing apparatus 3 is abnormal, based on the received operation information.

Further, in this example, when the server apparatus 2 determines that the operation of the information processing apparatus 3 is abnormal, the server apparatus 2 transmits the operation stop information for commanding a stop of the stop target function to the information processing apparatus 3. In response to receiving the operation stop information in the information processing apparatus 3, the operation control apparatus 40 stops the operation of the main apparatus 30 and stops the stop target function. With this, when the main apparatus 30 or the like is hacked to cause abnormal operation of the information processing apparatus 3, the information processing apparatus 3 can stop the stop target function. Consequently, the probability that the stop target function of the information processing apparatus 3 is used by a hacker can be reduced. As a result, security of the information processing apparatus 3 is enhanced.

Note that, when the controller 20 of the server apparatus 2 determines that the operation of the information processing apparatus 3 is abnormal, the controller 20 may store abnormality determination information, which indicates that the operation of the information processing apparatus 3 is abnormal, in the storage 21, without generating the operation stop information. In this case, when the controller 20 determines that the operation permission condition dependent on the processing for operation permission is satisfied based on the server apparatus 2 receiving a request signal from the information processing apparatus 3, for example, the controller 20 confirms whether or not the abnormality determination information is stored in the storage 21. If the abnormality determination information is not stored in the storage 21, the controller 20 generates operation permission information, and causes the communication unit 22 to transmit the generated operation permission information to the information processing apparatus 3. In contrast, if the abnormality determination information is stored in the storage 21, the controller 20 does not generate operation permission information.

As described above, when the server apparatus 2 determines that the operation of the information processing apparatus 3 is abnormal, the following operation is enabled: the information processing apparatus 3 can stop the permission target function, even if the operation permission information is not transmitted despite satisfaction of the operation permission condition dependent on the processing for operation permission when an abnormality occurs in the operation of the information processing apparatus 3. Consequently, when the main apparatus 30 or the like is hacked to cause abnormal operation of the information processing apparatus 3, the information processing apparatus 3 can stop the permission target function. Consequently, the probability that the permission target function of the information processing apparatus 3 is used by a hacker can be reduced. As a result, security of the information processing apparatus 3 is enhanced.

Figure 32:
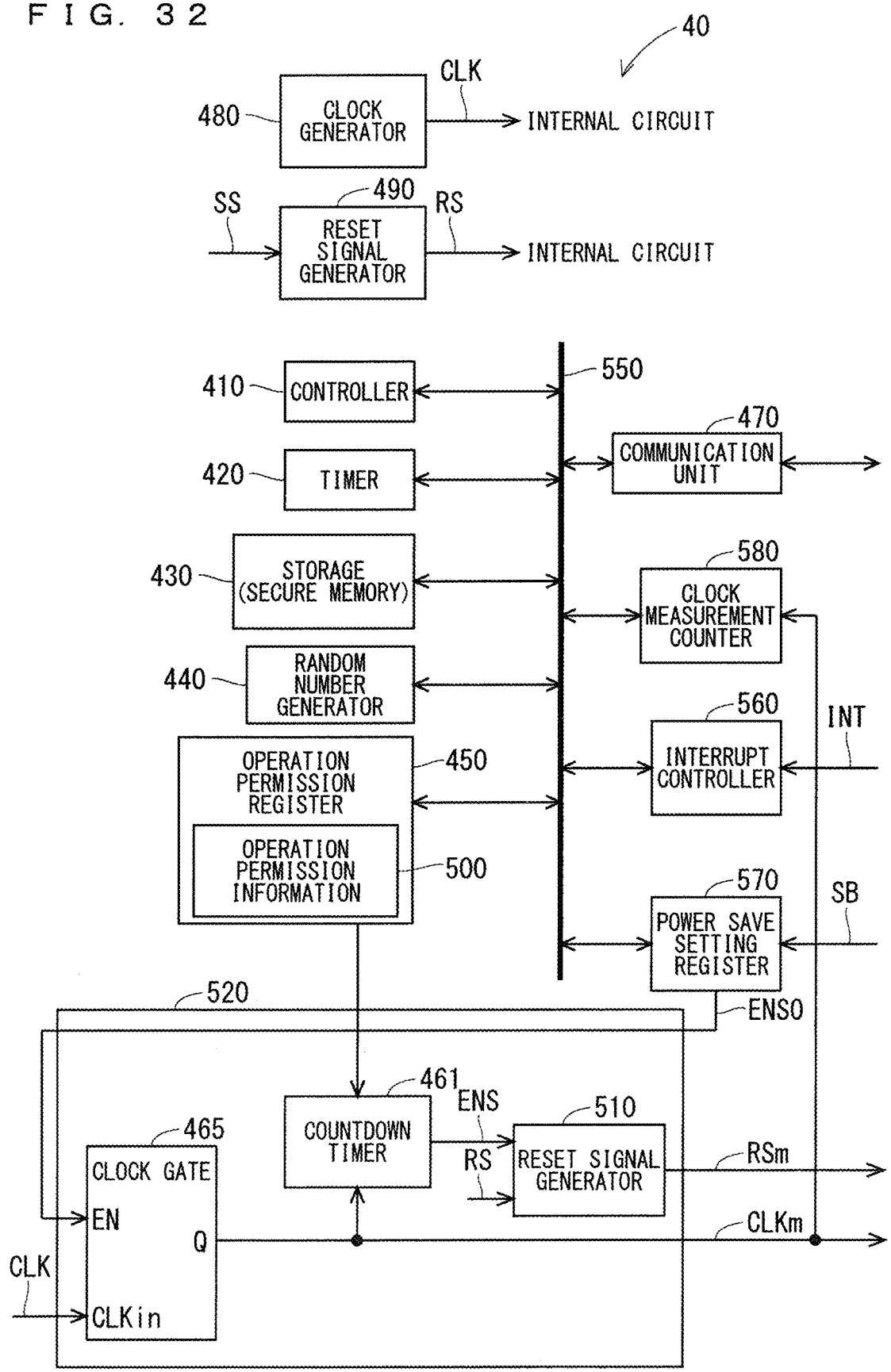
FIG. 32 is a diagram illustrating one example of a configuration of the operation control apparatus.

Further, the information processing apparatus 3 and the server apparatus 2 may operate in a manner similar to the above, with the clock measurement counter 580 being provided in the operation control apparatus 40 illustrated in FIG. 26. FIG. 32 is a diagram illustrating a configuration in which the clock measurement counter 580 is provided in the operation control apparatus 40 illustrated in FIG. 26. In the example of FIG. 32, when the server apparatus 2 determines that the operation of the information processing apparatus 3 is abnormal and the operation stop information is written in the operation permission register 450, the reset signal RSm to be input into the main apparatus 30 is asserted and the stop target function stops.

Figure 33:
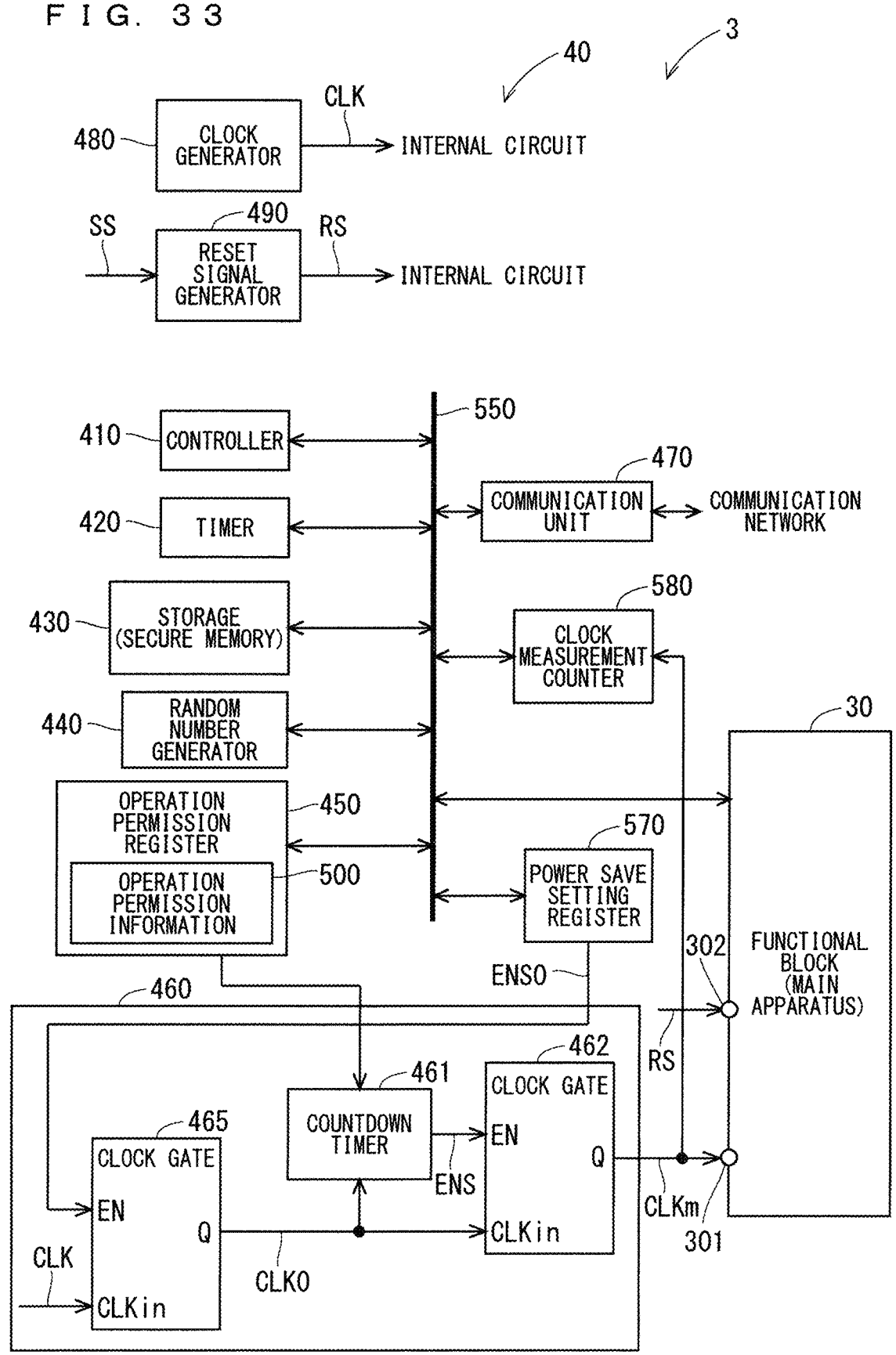
FIG. 33 is a diagram illustrating one example of a configuration of the information processing apparatus.

Further, the information processing apparatus 3 and the server apparatus 2 may operate in a manner similar to the above, with the clock measurement counter 580 being provided in the operation control apparatus 40 illustrated in FIG. 27. FIG. 33 is a diagram illustrating a configuration in which the clock measurement counter 580 is provided in the operation control apparatus 40 illustrated in FIG. 27. In the example of FIG. 33, when the server apparatus 2 determines that the operation of the information processing apparatus 3 is abnormal and the operation stop information is written in the operation permission register 450, output of the clock signal CLKm from the clock gate 462 stops and the stop target function stops accordingly. With this, for example, when the operation control apparatus 40 operating in the normal mode is hacked to cause an operation abnormality in which the information processing apparatus 3 is inhibited from performing the intermittent operation and caused to invariably communicate with the server apparatus 2, the information processing apparatus 3 can stop the stop target function. Consequently, security of the information processing apparatus 3 is enhanced.

Note that, in the example of FIG. 33, the clock signal CLKm output from the clock gate 462 may be input into the communication unit 470, in a similar manner to FIG. 20 described above. The information processing apparatus 3 in such a case is referred to as an "information processing apparatus 3 according to a first modification of FIG. 33".

Further, in the example of FIG. 33, the reset signal generator 540 that receives input of the enable signal ENS output from the countdown timer 461 and the reset signal RS and that outputs the reset signal RSn to the communication unit 470 may be provided, in a similar manner to FIG. 21 described above. The information processing apparatus 3 in such a case is referred to as an "information processing apparatus 3 according to a second modification of FIG. 33".

Further, in the example of FIG. 33, the switch circuit 530 that controls connection between the bus 550 and the communication unit 470 based on the enable signal ENS may be provided, in a similar manner to FIG. 22 described above. The information processing apparatus 3 in such a case is referred to as an "information processing apparatus 3 according to a third modification of FIG. 33".

In the information processing apparatus 3 according to the first to third modifications of FIG. 33, the server communication function is also included in the stop target function.

Further, in the example of FIG. 33, the reset signal generator 540 that receives input of the enable signal ENS output from the countdown timer 461 and the reset signal RS and that outputs the reset signal RSn to the communication unit 470 may be provided, the clock gate 462 may be omitted, and the clock signal output from the clock gate 465 may be input into the functional block 30. The information processing apparatus 3 in such a case is referred to as an "information processing apparatus 3 according to a fourth modification of FIG. 33". In the information processing apparatus 3 according to the fourth modification of FIG. 33, the server communication function is included in the stop target function, but the main function of the information processing apparatus 3 is not included.

Figure 34:
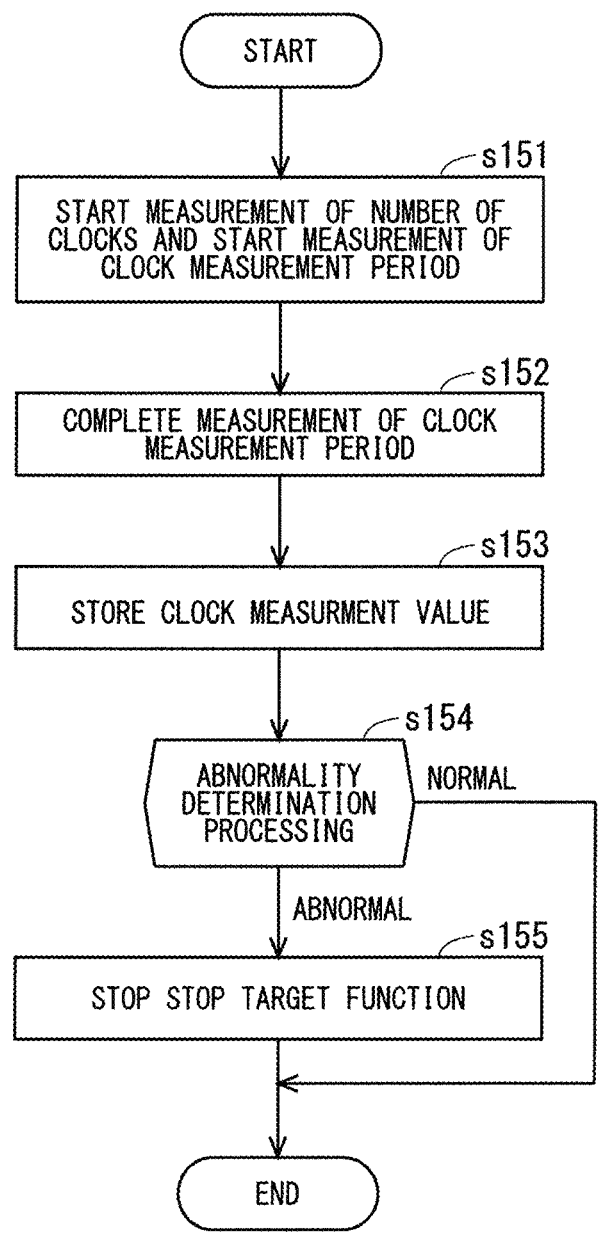
FIG. 34 is a flowchart illustrating one example of operation of the information processing apparatus.

In the above example, the server apparatus 2 performs the abnormality determination processing. However, the information processing apparatus 3 may perform the abnormality determination processing. Specifically, the operation control apparatus 40 of the information processing apparatus 3 may perform the abnormality determination processing. FIG. 34 is a flowchart illustrating one example of operation of the operation control apparatus 40 in such a case. As one example, a case in which the operation control apparatus 40 illustrated in FIG. 28 performs the abnormality determination processing will be described below.

As illustrated in FIG. 34, in Step s151, the controller 410 causes the clock measurement counter 580 to start measurement of the number of clocks, and causes the timer 420 to start measurement of the clock measurement period, in a similar manner to Step s101 described above.

Next, when the timer 420 completes measurement of the clock measurement period in Step s152, in Step s153, the controller 410 causes the clock measurement counter 580 to stop the measurement operation, and acquires the current clock measurement value from the clock measurement counter 580. Then, the controller 410 stores the acquired clock measurement value in the storage 430. Subsequently, the controller 410 resets the clock measurement value of the clock measurement counter 580. It can be said that the clock measurement value stored in the storage 430 is a clock measurement value in the clock measurement period.

Next, in Step s154, the controller 410 performs the abnormality determination processing, based on the clock measurement value in the clock measurement period stored in the storage 430. The abnormality determination processing performed by the controller 410 is the same as the above-described abnormality determination processing performed by the server apparatus 2. The first reference value used in the abnormality determination processing is stored in the storage 430.

In Step s154, if it is determined that the operation of the information processing apparatus 3 is abnormal, in Step s155, the operation control apparatus 40 stops the stop target function. In Step s155, the controller 410 writes operation unable information, which indicates that the stop target function is unable to operate, in the operation permission register 450. With this, the operation permission information 500 in the operation permission register 450 is rewritten into the operation unable information.

For example, the operation unable information indicates a value "0". Thus, when the operation unable information is written in the operation permission register 450, the value "0" is set in the operation permission register 450. With this, the count value of the countdown timer 461 is set to 0, and the count operation of the countdown timer 461 stops. When the count operation of the countdown timer 461 stops, the enable signal ENS shifts to the Low level, and the clock gate 462 stops output of the clock signal CLKm. With this, the operation of the main apparatus 30 stops. In other words, the stop target function stops.

If the stop target function is restored through operation being performed on the reset switch 50 after Step s155, for example, Step s151 is executed again, and the operation control apparatus 40 operates in a similar manner thereafter. Further, if it is determined that the operation of the information processing apparatus 3 is normal as a result of the abnormality determination processing performed in Step s154, Step s151 is executed again, and the operation control apparatus 40 operates in a similar manner thereafter.

Note that the information processing apparatus 3 according to the first modification of FIG. 33 described above may execute Steps s151 to s155. Further, the information processing apparatus 3 according to the second modification of FIG. 33 may execute Steps s151 to s155. Further, the information processing apparatus 3 according to the third modification of FIG. 33 may execute Steps s151 to s155. Further, the information processing apparatus 3 according to the fourth modification of FIG. 33 may execute Steps s151 to s155.

As described above, also when the information processing apparatus 3 performs the abnormality determination processing, security of the information processing apparatus 3 can be enhanced.

Note that, when the server apparatus 2 performs the abnormality determination processing, the first reference value to be used in the abnormality determination processing can be easily changed even after the information processing apparatuses 3 are put on the market. Further, a procedure for the abnormality determination processing can be easily changed even after the information processing apparatuses 3 are put on the market. In contrast, when the information processing apparatus 3 performs the abnormality determination processing, the stop target function can be stopped immediately after it is determined that the operation of the information processing apparatus 3 is abnormal.

The operation information acquired by the information processing apparatus 3 may be information related to operation of the information processing apparatus 3, and is not limited to the above example. For example, the operation information may include at least one of an operation log and a communication log of the information processing apparatus 3.

Further, the clock measurement counter 580 may calculate the number of times the operation mode is set to the non-standby mode in a predetermined period as the operation information, based on the clocks input into the main apparatus 30. In other words, the clock measurement counter 580 may calculate the number of times of occurrence of the non-standby period T11 in the predetermined period as the operation information, based on the clocks input into the main apparatus 30. In the non-standby period T11, clocks of the clock signal CLK are input into the main apparatus 30, whereas in the standby period T12, clocks of the clock signal CLK are not input into the main apparatus 30. Thus, the clock measurement counter 580 can calculate the number of times the operation mode is set to the non-standby mode in the predetermined period, based on the clocks input into the main apparatus 30. The number of times calculated by the clock measurement counter 580 is referred to as "measured count". It can be said that the measured count is information acquired based on the clock signal CLK input into the main apparatus 30, similarly to the clock measurement value in the clock measurement period. For example, the predetermined period is set to an integer multiple of the intermittent operation period T10.

The controller 20 of the server apparatus 2 or the controller 410 of the information processing apparatus 3 performs the abnormality determination processing, based on the measured count. Specifically, for example, the controller 20 or the controller 410 determines whether or not the measured count matches a second reference value. The second reference value is the number of times the operation mode is set to the non-standby mode in the predetermined period when the information processing apparatus 3 normally performs the intermittent operation. For example, if the predetermined period is 10 times the period T10, the second reference value is set to "10". If the controller 20 or the controller 410 determines that the measured count matches the second reference value, the controller 20 or the controller 410 determines that the operation of the information processing apparatus 3 is normal. In contrast, if the controller 20 or the controller 410 determines that the measured count does not match the second reference value, the controller 20 or the controller 410 determines that the operation of the information processing apparatus 3 is abnormal. Note that the controller 20 or the controller 410 may determine that the operation of the information processing apparatus 3 is normal when the measured count falls within a predetermined range including the second reference value, and may determine that the operation of the information processing apparatus 3 is abnormal when the measured count falls outside the predetermined range, in a similar manner to the above-described abnormality determination processing using the clock measurement value and the first reference value. The term "controller" used in the following description of the abnormality determination processing by itself refers to the controller 20 or the controller 410.

Further, the clock measurement counter 580 may calculate an average value of the number of clocks input into the main apparatus 30 in one non-standby period T11 over a predetermined period as the operation information. For example, the predetermined period is set to an integer multiple of the intermittent operation period T10. Here, the number of clocks input into the main apparatus 30 in one non-standby period T11 is referred to as a "non-standby clock count". If the predetermined period is 10 times the period T10, the predetermined period includes 10 non-standby periods T11. Accordingly, the clock measurement counter 580 calculates an average value of 10 non-standby clock counts as the operation information. The average value calculated in the clock measurement counter 580 is referred to as a "measured average value". It can be said that the measured average value is information acquired based on the clock signal CLK input into the main apparatus 30.

The controller performs the abnormality determination processing, based on the measured average value. Specifically, for example, the controller determines whether or not the measured average value matches a third reference value. The third reference value is an average value of the non-standby clock counts over the predetermined period when the information processing apparatus 3 normally performs the intermittent operation. If the controller determines that the measured average value matches the third reference value, the controller determines that the operation of the information processing apparatus 3 is normal. In contrast, if the controller determines that the measured average value does not match the third reference value, the controller determines that the operation of the information processing apparatus 3 is abnormal. Note that the controller may determine that the operation of the information processing apparatus 3 is normal when the measured average value falls within a predetermined range including the third reference value, and may determine that the operation of the information processing apparatus 3 is abnormal when the measured average value falls outside the predetermined range.

Further, the operation information may include a plurality of pieces of information. In this case, in the abnormality determination processing, for example, the controller performs provisional abnormality determination for each of the plurality of pieces of information. The provisional abnormality determination is determination in which the controller provisionally determines whether or not the operation of the information processing apparatus 3 is abnormal, based on each of the plurality of pieces of information. If the controller determines that the operation of the information processing apparatus 3 is normal as a result of the provisional abnormality determination for all of the plurality of pieces of information included in the operation information, the controller conclusively determines that the operation of the information processing apparatus 3 is normal. In contrast, if the controller determines that the operation of the information processing apparatus 3 is abnormal as a result of the provisional abnormality determination for at least one of the plurality of pieces of information included in the operation information, the controller conclusively determines that the operation of the information processing apparatus 3 is abnormal.

For example, the operation information may include at least two out of the clock measurement value in the clock measurement period, the measured count, and the measured average value. For example, suppose the operation information includes the clock measurement value in the clock measurement period and the measured count. In this case, in the abnormality determination processing, the controller provisionally determines whether or not the operation of the information processing apparatus 3 is abnormal, based on each of the clock measurement value and the measured count, as in a manner described above. If the controller determines that the operation of the information processing apparatus 3 is normal as a result of the provisional abnormality determination for each of the clock measurement value and the measured count, the controller conclusively determines that the operation of the information processing apparatus 3 is normal. In contrast, if the controller determines that the operation of the information processing apparatus 3 is abnormal as a result of the provisional abnormality determination for at least one of the clock measurement value and the measured count, the controller conclusively determines that the operation of the information processing apparatus 3 is abnormal.

As another example, suppose the operation information includes the clock measurement value in the clock measurement period, the measured count, and the measured average value. In this case, in the abnormality determination processing, the controller provisionally determines whether or not the operation of the information processing apparatus 3 is abnormal, based on each of the clock measurement value, the measured count, and the measured average value, as in a manner described above. If the controller determines that the operation of the information processing apparatus 3 is normal as a result of the provisional abnormality determination for all of the clock measurement value, the measured count, and the measured average value, the controller conclusively determines that the operation of the information processing apparatus 3 is normal. In contrast, if the controller determines that the operation of the information processing apparatus 3 is abnormal as a result of the provisional abnormality determination for at least one of the clock measurement value, the measured count, and the measured average value, the controller conclusively determines that the operation of the information processing apparatus 3 is abnormal. The clock measurement value, the measured count, and the measured average value may be hereinafter collectively referred to as operation information based on the clock signal CLK.

Figure 35:
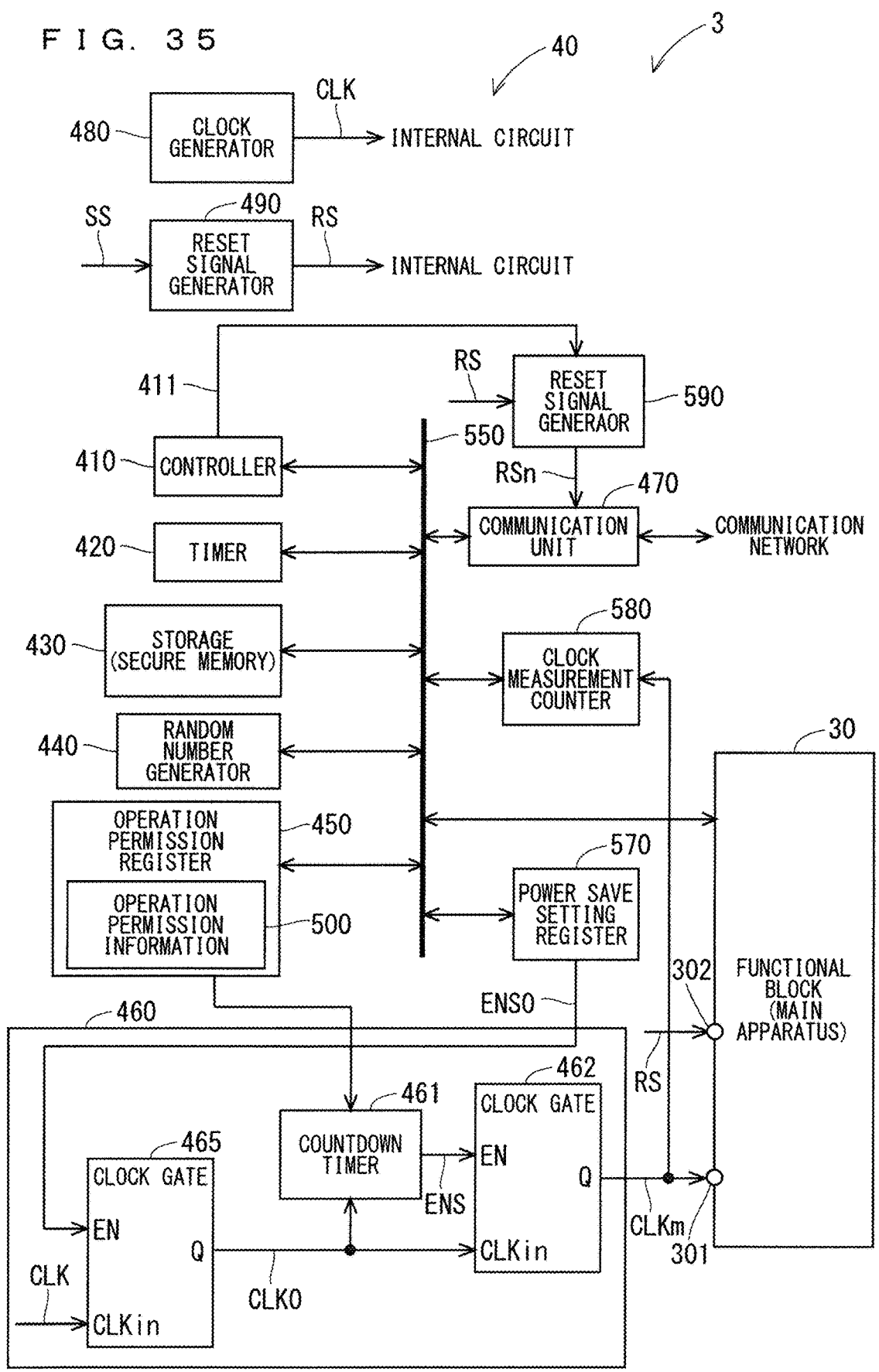
FIG. 35 is a diagram illustrating one example of a configuration of the information processing apparatus.

Further, the permission target function and the stop target function may be either the same or different. In the latter case, for example, the permission target function may be the main function of the information processing apparatus 3, and the stop target function may be the server communication function. FIG. 35 is a diagram illustrating one example of a configuration of the information processing apparatus 3 in such a case. In comparison with the information processing apparatus 3 illustrated in FIG. 33, the information processing apparatus 3 illustrated in FIG. 35 includes a reset signal generator 590 that outputs the reset signal RSn for the communication unit 470. When the reset signal RS is asserted, the reset signal generator 590 asserts the reset signal RSn. In the example of FIG. 35, when it is determined that the operation of the information processing apparatus 3 is abnormal, the controller 410 outputs a command signal 411 for commanding a stop of the operation of the communication unit 470 to the reset signal generator 590. When the reset signal generator 590 receives the command signal 411, the reset signal generator 590 asserts the reset signal RSn to stop the operation of the communication unit 470. With this, when it is determined that the operation of the information processing apparatus 3 is abnormal in the server apparatus 2 or the operation control apparatus 40, the server communication function stops.

Further, in the information processing system 1 of the above example, the following processing (which may be hereinafter referred to as "first function control processing") is performed: The server apparatus 2 determines whether or not the operation permission condition is satisfied. When the operation permission condition is satisfied, the server apparatus 2 transmits operation permission information to the information processing apparatus 3. The information processing apparatus 3 activates the permission target function, in response to the received operation permission information. Such processing, however, need not be performed.

Further, in the information processing system 1 of the above example, the following processing (which may be hereinafter referred to as "second function control processing") is performed: Whether or not the operation of the information processing apparatus 3 is abnormal is determined, and when it is determined that the operation of the information processing apparatus 3 is abnormal, the stop target function is stopped. Such processing, however, need not be performed.

Further, in the information processing system 1, if the second function control processing is performed without the first function control processing, the operation permission information 500 may be stored in the operation permission register 450 in advance. In other words, the operation permission information 500 may be stored in the operation permission register 450 at the time point when the information processing apparatus 3 is shipped from a factory. In this case, for example, the operation permission information 500 indicates an operable period (for example, 30 years) that is longer than the product life of the information processing apparatus 3 (for example, 10 years). When it is determined that the operation of the information processing apparatus 3 is abnormal, the controller 410 of the operation control apparatus 40 stops the stop target function by rewriting the operation permission information 500 in the operation permission register 450 into the operation stop information from the server apparatus 2 or into the operation unable information that the controller 410 generates. Note that, in this case, when the information processing apparatus 3 performs the abnormality determination processing, the information processing apparatus 3 need not communicate with the server apparatus 2.

Further, a procedure for the abnormality determination processing is not limited to the above example. Further, processing using the operation information is not limited to the abnormality determination processing.

<Other Example of Configuration of Main Apparatus>

FIG. 36 is a diagram illustrating another example of a configuration of the main apparatus 30. In the example illustrated in FIG. 36, the controller 310, the storage 320, the sensor apparatus 330, the first communication unit 340, the second communication unit 350, and the processing circuit 360 are respectively contained in packages 311, 321, 331, 341, 351, and 361 different from one other. The controller 310 can communicate with each of the storage 320, the sensor apparatus 330, the first communication unit 340, the second communication unit 350, and the processing circuit 360, based on SP or I2C, for example. Note that a communication method used between the controller 310 and each of the storage 320, the sensor apparatus 330, the first communication unit 340, the second communication unit 350, and the processing circuit 360 is not limited to the above.

As illustrated in FIG. 37, the controller 310 may include a clock generator 312. For example, the clock generator 312 is a ring oscillator. For example, frequency accuracy of a clock signal CLKp output from the clock generator 312 is lower than frequency accuracy of the clock signal CLK output from the clock generator 480 of the operation control apparatus 40.

As in FIG. 37, when the controller 310 includes the clock generator 312, the main apparatus 30 may or may not operate based on the clock signal CLKp. In the latter case, the operation of the clock generator 312 may be invariably stopped. In contrast, in the former case, for example, when reset of the main apparatus 30 is released, i.e., when the reset signal RS to be input into the main apparatus 30 is negated, first, the controller 310 starts operation based on the clock signal CLKp, and performs initial settings of the main apparatus 30. After the initial settings, the controller 310 performs operation based on the clock signal CLKm, without using the clock signal CLKp. After the initial settings, the operation of the clock generator 312 may be stopped. Note that the example of use of the clock signal CLKp is not limited to the above. Further, the clock generator 312 may be other than a ring oscillator. The clock signal CLKp may be hereinafter referred to as an internal clock signal CLKp.

<Other Example of Procedure for Stopping Function>

Figure 38:
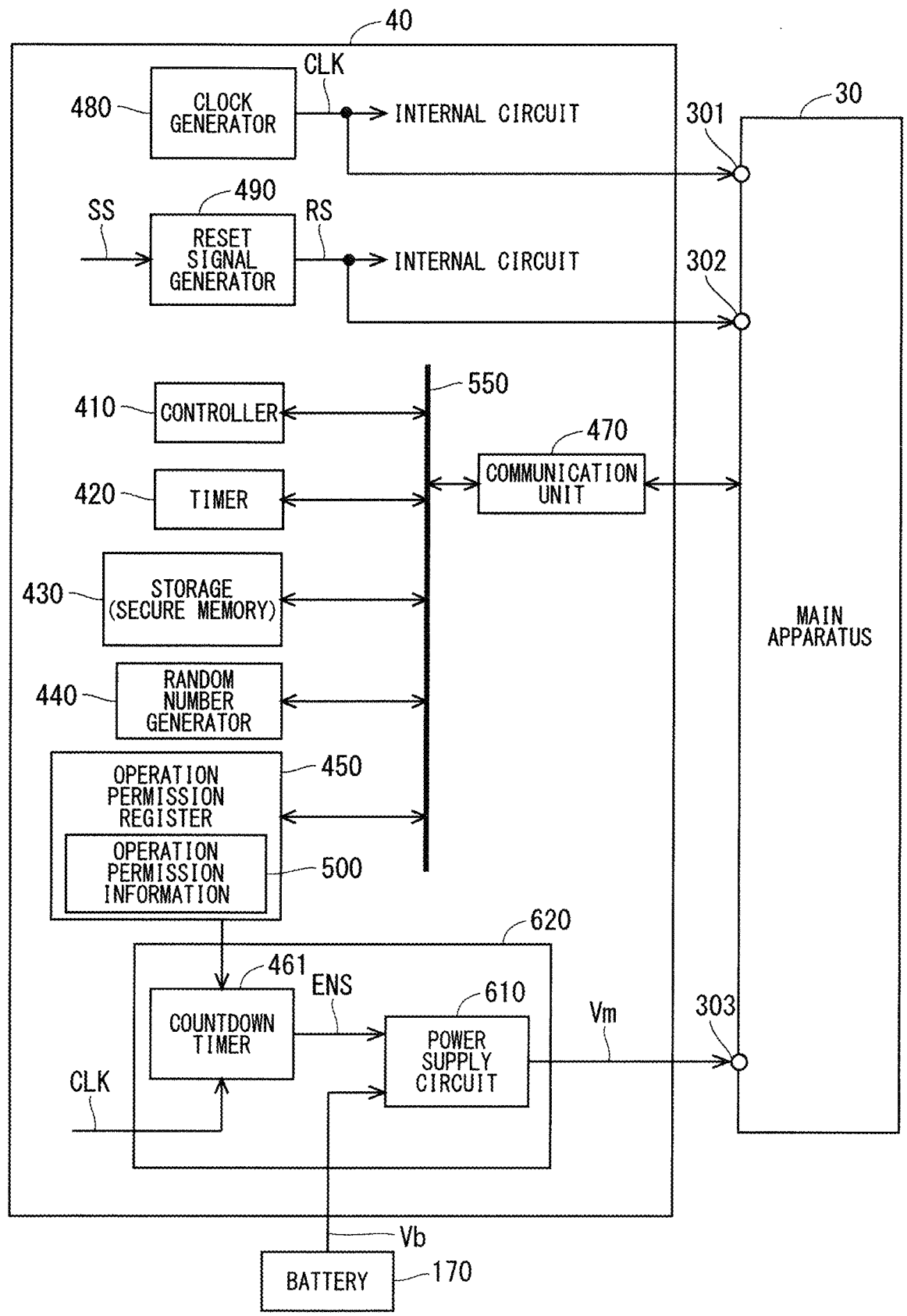
FIG. 38 is a diagram illustrating one example of a configuration of the operation control apparatus.

After the operable period has elapsed or when it is determined that the operation of the information processing apparatus 3 is abnormal, the operation control apparatus 40 may stop the operation of the main apparatus 30 by stopping supply of power to the main apparatus 30. FIG. 38 is a diagram mainly illustrating one example of a configuration of the operation control apparatus 40 in such a case. In the example of FIG. 38, the information processing apparatus 3 includes a battery 170 that generates power for the information processing apparatus 3. The operation control apparatus 40 and the main apparatus 30 operate based on an output voltage Vb of the battery 170.

In comparison with the operation control apparatus 40 illustrated in FIG. 15 described above, the operation control apparatus 40 illustrated in FIG. 38 includes a power supply circuit 610 instead of the reset signal generator 510, and the reset signal RS is input into the main apparatus 30.

The power supply circuit 610 generates the power supply voltage Vm for the main apparatus 30. The power supply circuit 610 can generate the power supply voltage Vm, based on the output voltage Vb of the battery 170, and can output the generated power supply voltage Vm. For example, the power supply circuit 610 is a step-down circuit. The power supply circuit 610 steps down the output voltage Vb of the battery 170, and outputs the stepped-down output voltage Vb.

The main apparatus 30 includes a power supply input port 303, through which the power supply voltage Vm is input. The main apparatus 30 performs operation, based on the power supply voltage Vm input through the power supply input port 303. In the example of FIG. 38, the countdown timer 461 and the power supply circuit 610 constitute an operation controller 620 that controls the operation of the main apparatus 30.

The enable signal ENS output from the countdown timer 461 is input into the power supply circuit 610. The power supply circuit 610 does not output the power supply voltage Vm when the enable signal ENS is at the Low level. In contrast, the power supply circuit 610 outputs the power supply voltage Vm when the enable signal ENS is at the High level.

In the operation control apparatus 40 having such a configuration, when the initial value is set in the operation permission register 450 after reset of the information processing apparatus 3 is released, the enable signal ENS shifts from the Low level to the High level, and the power supply voltage Vm is input into the power supply input port 303 of the main apparatus 30 accordingly. With this, the main apparatus 30 can operate for the initial operable period. When the operation permission condition is satisfied in the initial operable period and the operation permission information 500 is set in the operation permission register 450, the enable signal ENS remains at the High level, and the main apparatus 30 continues its operation. If the operation permission information 500 in the operation permission register 450 is not updated afterwards, the power supply voltage Vm is no longer input into the power supply input port 303 after the elapse of the operable period currently set in the information processing apparatus 3. As a result, the operation of the main apparatus 30 is stopped.

Note that, as illustrated in FIGS. 16 and 17, for example, also when the main apparatus 30 and the operation control apparatus 40 are contained in the same package 600, the operation control apparatus 40 may stop the operation of the main apparatus 30 by stopping supply of power to the main apparatus 30 (i.e., the functional block 30), in a similar manner to the example of FIG. 38.

Figure 39:
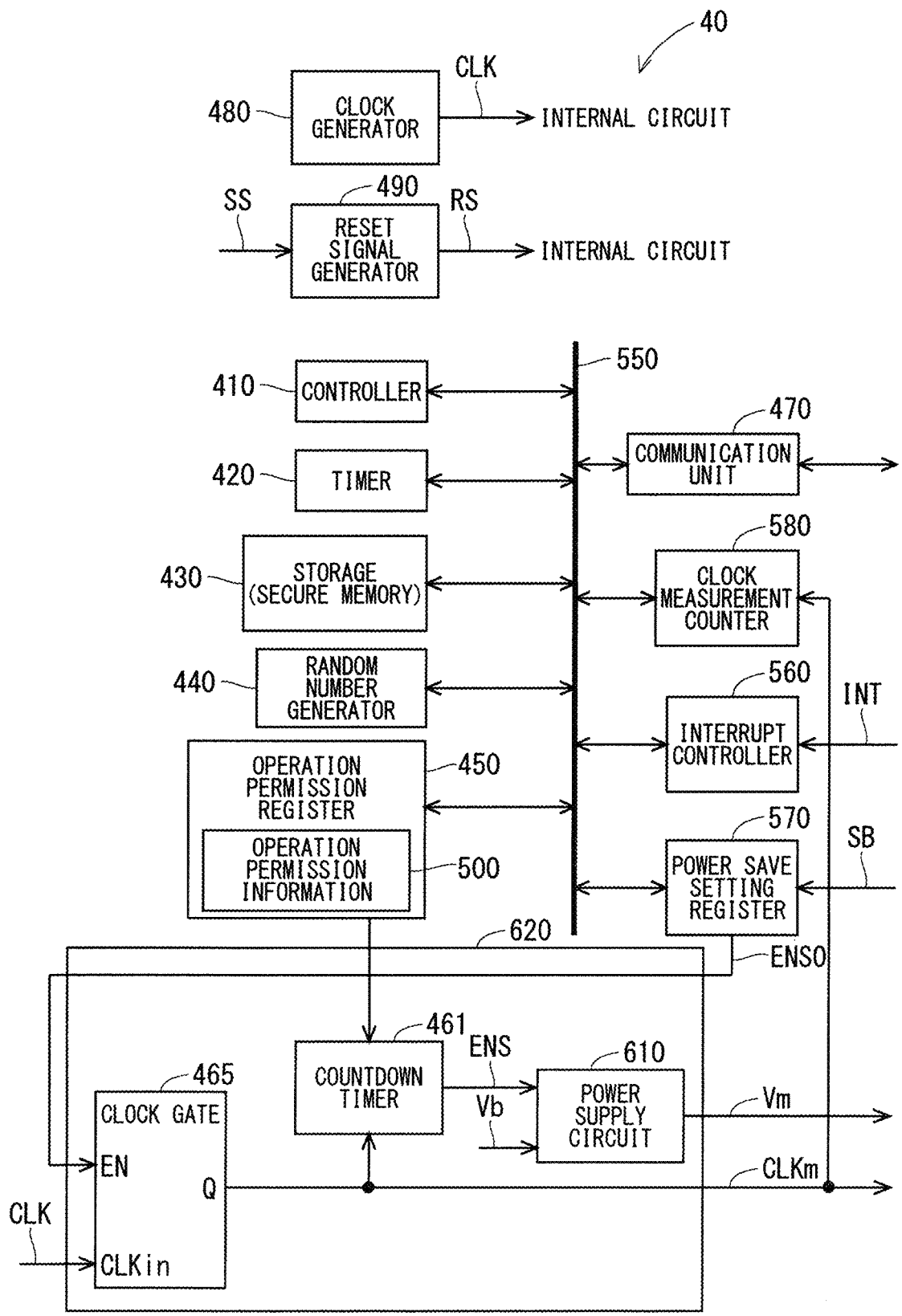
FIG. 39 is a diagram illustrating one example of a configuration of the operation control apparatus.

Further, as illustrated in FIGS. 23 to 28, for example, also when the information processing apparatus 3 performs the intermittent operation, the operation control apparatus 40 may stop the operation of the main apparatus 30 by stopping supply of power to the main apparatus 30, in a similar manner to the example of FIG. 38. FIG. 39 is a diagram illustrating one example of a configuration of the operation control apparatus 40 in such a case.

In comparison with the operation control apparatus 40 illustrated in FIG. 32 described above, the operation control apparatus 40 illustrated in FIG. 39 includes the power supply circuit 610 instead of the reset signal generator 510, and the reset signal RS is input into the main apparatus 30. In the example of FIG. 39, the countdown timer 461, the clock gate 465, and the power supply circuit 610 constitute the operation controller 620 that controls the operation of the main apparatus 30.

In the operation control apparatus 40 illustrated in FIG. 39, when the server apparatus 2 performs the abnormality determination processing, the value "0" is set in the operation permission register 450 in response to setting of the operation stop information from the server apparatus 2 in the operation permission register 450. With this, the count value of the countdown timer 461 is set to 0, and the enable signal ENS shifts to the Low level. As a result, the power supply voltage Vm is no longer output from the power supply circuit 610, and the operation of the main apparatus 30 stops. Further, when the information processing apparatus 3 performs the abnormality determination processing, the value "0" is set in the operation permission register 450 in response to setting of the operation unable information in the operation permission register 450. With this, the count value of the countdown timer 461 is set to 0, and the enable signal ENS shifts to the Low level. As a result, the power supply voltage Vm is no longer output from the power supply circuit 610, and the operation of the main apparatus 30 stops.

Figure 40:
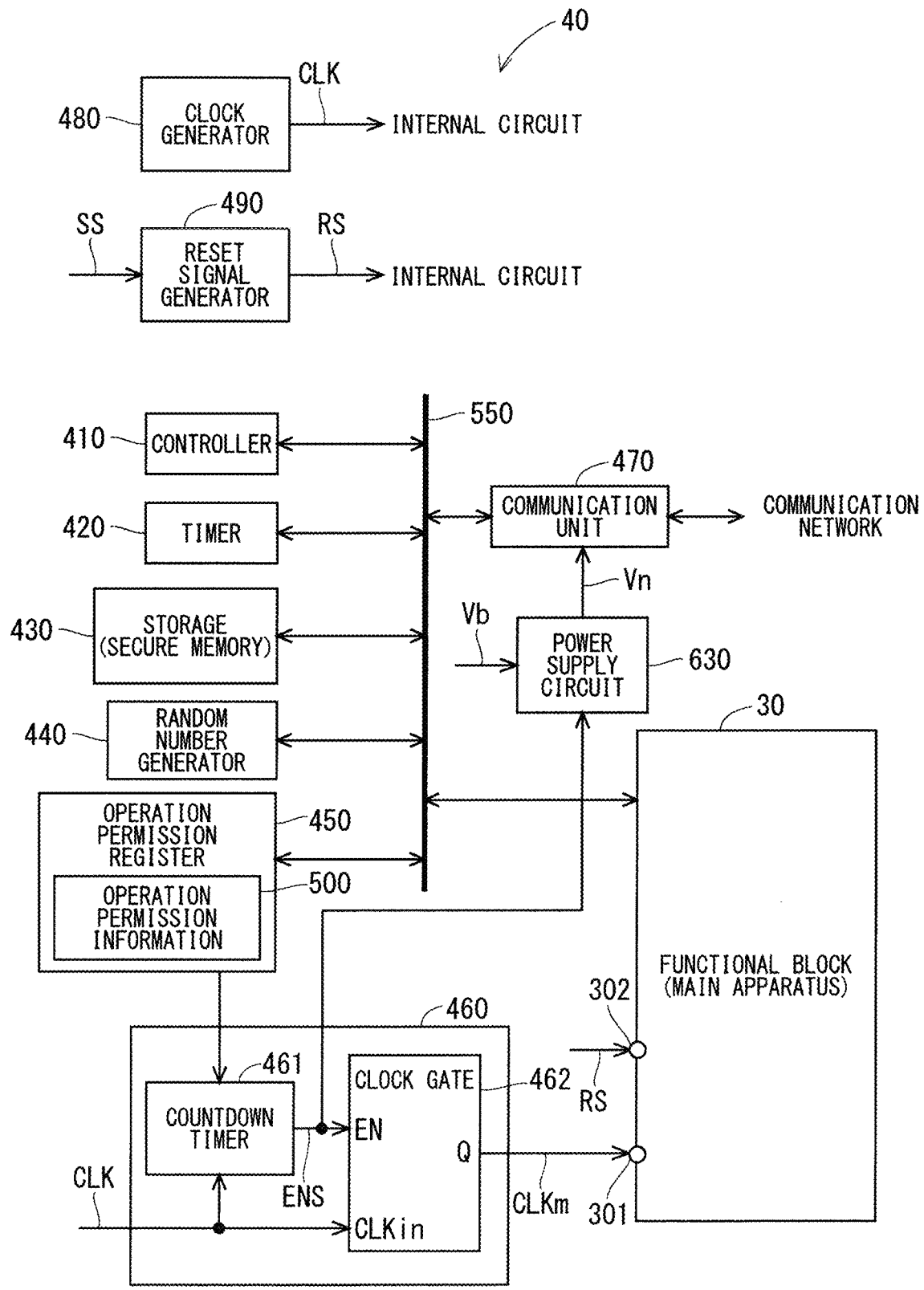
FIG. 40 is a diagram illustrating one example of a configuration of the operation control apparatus.

Further, after the operable period has elapsed or when it is determined that the operation of the information processing apparatus 3 is abnormal, the operation control apparatus 40 may stop the operation of the communication unit 470 by stopping supply of power to the communication unit 470. FIG. 40 is a diagram mainly illustrating one example of a configuration of the operation control apparatus 40 in such a case.

In comparison with the operation control apparatus 40 illustrated in FIG. 21, the operation control apparatus 40 illustrated in FIG. 40 includes a power supply circuit 630 instead of the reset signal generator 540. The power supply circuit 630 can generate a power supply voltage Vn for the communication unit 470, based on the output voltage Vb of the battery 170, and can output the generated power supply voltage Vn. For example, the power supply circuit 630 is a step-down circuit. The power supply circuit 630 steps down the output voltage Vb, and outputs the stepped-down output voltage Vb. The enable signal ENS output from the countdown timer 461 is input into the power supply circuit 630. The power supply circuit 630 does not output the power supply voltage Vn when the enable signal ENS is at the Low level. In contrast, the power supply circuit 630 outputs the power supply voltage Vn when the enable signal ENS is at the High level. Note that, as illustrated in FIGS. 27 and 33, for example, also when the information processing apparatus 3 performs the intermittent operation, the operation control apparatus 40 may stop the operation of the communication unit 470 by stopping supply of power to the communication unit 470.

Figure 41:
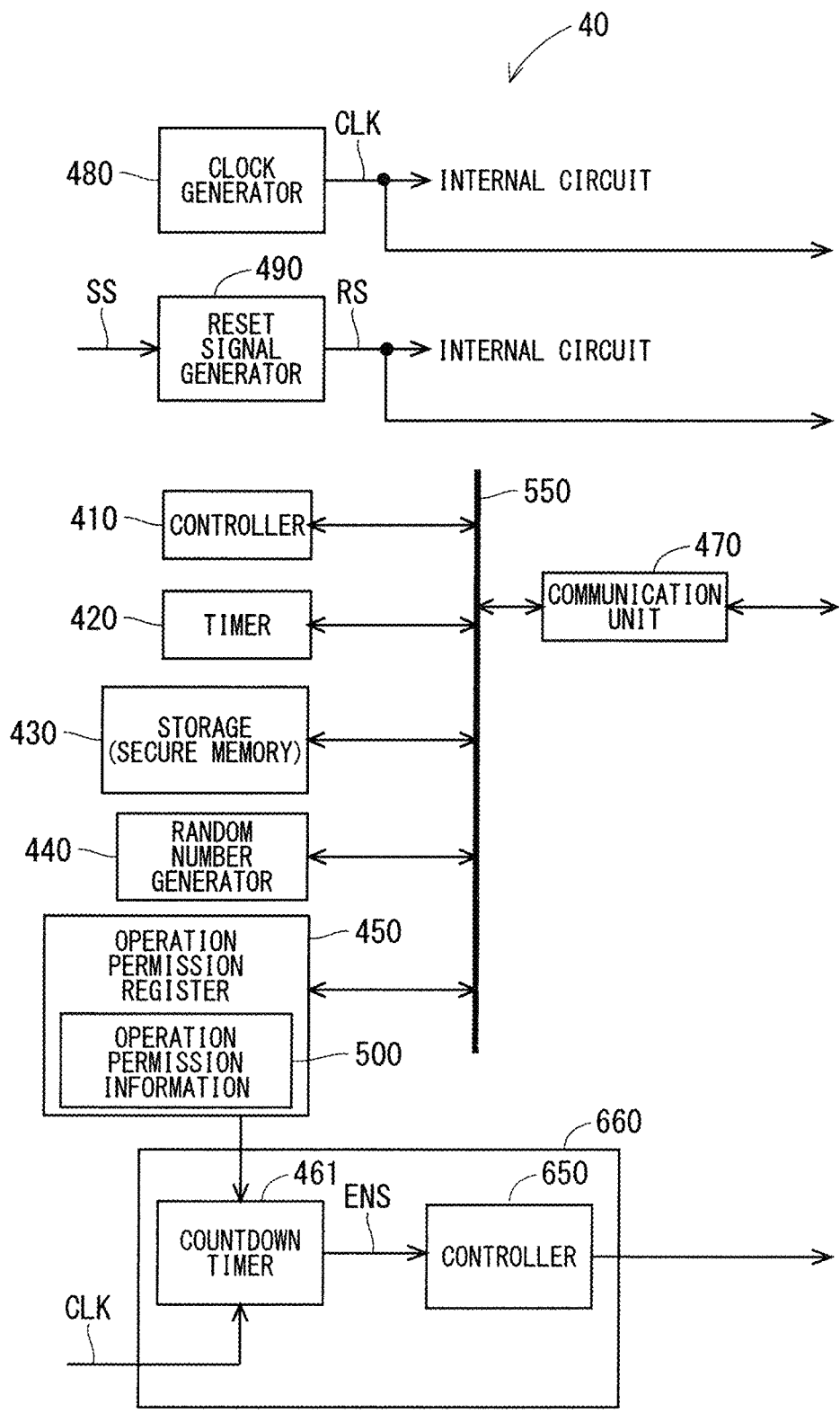
FIG. 41 is a diagram illustrating one example of a configuration of the operation control apparatus.

Further, after the operable period has elapsed or when it is determined that the operation of the information processing apparatus 3 is abnormal, the operation control apparatus 40 may stop the operation of some of the circuits of the main apparatus 30 except the controller 310, regardless of the operation of the controller 310. FIG. 41 is a diagram illustrating one example of a configuration of the operation control apparatus 40 in such a case.

In comparison with the operation control apparatus 40 illustrated in FIG. 38 described above, the operation control apparatus 40 illustrated in FIG. 41 includes a controller 650 instead of the power supply circuit 610. In the operation control apparatus 40 illustrated in FIG. 41, the countdown timer 461 and the controller 650 constitute an operation controller 660 that controls the operation of the main apparatus 30.

The controller 650 stops the operation of some of the circuits of the main apparatus 30, regardless of the operation of the controller 310. Such operation of stopping the operation of some of the circuits of the main apparatus 30 regardless of the operation of the controller 310 may be hereinafter referred to as "force stop control". In contrast, the controller 650 cancels the force stop control on some of the circuits of the main apparatus 30 when the enable signal ENS is at the High level.

For example, the controller 650 performs the force stop control on the second communication unit 350 by controlling signals to be input into the second communication unit 350 that communicates with the server apparatus 2. For example, suppose the controller 310 is capable of communicating with the second communication unit 350 based on I2C in the configurations illustrated in FIGS. 36 and 37 described above. In this case, the controller 650 of the operation controller 660 forcibly fixes an SCL signal to be input into the second communication unit 350 to the Low level. With this, the controller 310 is inhibited from communicating with the second communication unit 350 even when the controller 310 intends to communicate with the second communication unit 350, because the level of the SCL signal is forcibly fixed to the Low level. The controller 650 can perform the force stop control on the second communication unit 350 by fixing the level of a signal line that connects the controller 310 and the second communication unit 350 and that allows the flow of the SCL signal to the Low level. In contrast, the controller 650 can cancel the force stop control on the second communication unit 350 by stopping fixing the signal line to the Low level. When the force stop control on the second communication unit 350 is cancelled, the controller 410 can communicate with the second communication unit 350. As a result, the second communication unit 350 can operate according to the control of the controller 310.

Note that the controller 650 may stop the operation of the circuits of the main apparatus 30 other than the second communication unit 350. Further, the controller 650 may stop the operation of at least one of the circuits of the storage 320, the sensor apparatus 330, the first communication unit 340, and the second communication unit 350.

Further, when the controller 650 is capable of forcibly negating a signal for activating a certain circuit of the main apparatus 30 that is supplied from the controller 310 to the certain circuit, the controller 650 may perform the force stop control on the certain circuit by negating the signal. The signal for activating a circuit may be referred to as a select signal, a chip select signal, an enable signal, or a chip enable signal, for example. The signal for activating a circuit may be hereinafter referred to as an activation signal.

Figure 42:
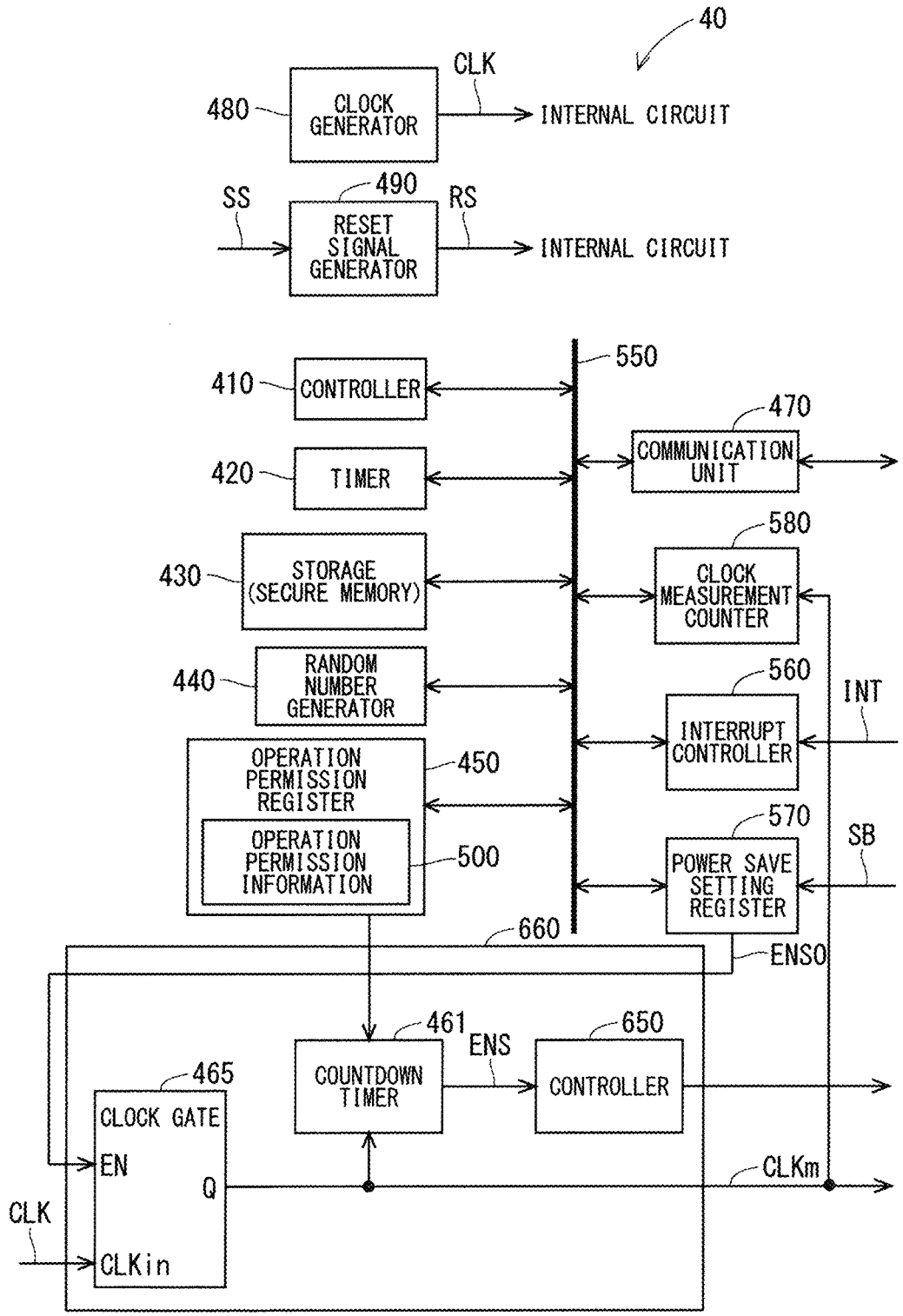
FIG. 42 is a diagram illustrating one example of a configuration of the operation control apparatus.

Further, as illustrated in FIG. 24, for example, also when the information processing apparatus 3 performs the intermittent operation, the operation control apparatus 40 may stop some of the circuits of the main apparatus 30 regardless of the operation of the controller 310, in a similar manner to the example of FIG. 41. FIG. 42 is a diagram illustrating one example of a configuration of the operation control apparatus 40 in such a case. In comparison with the operation control apparatus 40 illustrated in FIG. 39 described above, the operation control apparatus 40 illustrated in FIG. 42 includes the controller 650 instead of the power supply circuit 610.

<Other Example of Operation Information>

In the above example, the operation information used in the abnormality determination processing includes at least one of the clock measurement value in the clock measurement period, the measured count, and the measured average value. However, the operation information may include information other than these pieces of information. Operation information related to operation of the information processing apparatus 3 used in the abnormality determination processing may be hereinafter referred to as "apparatus operation information".

For example, the apparatus operation information may include operation information related to operation of at least one circuit of the plurality of circuits that are included in the main apparatus 30 and that implement functions different from one other. Specifically, the apparatus operation information may include operation information related to operation of at least one of the circuits of the storage 320, the sensor apparatus 330, the first communication unit 340, the second communication unit 350, and the processing circuit 360. A circuit whose operation information is included in the apparatus operation information may be hereinafter referred to as a specific circuit. The following is a description of one example of the information processing system 1 when the storage 320, the sensor apparatus 330, and the second communication unit 350 are each a specific circuit.

Figure 43:
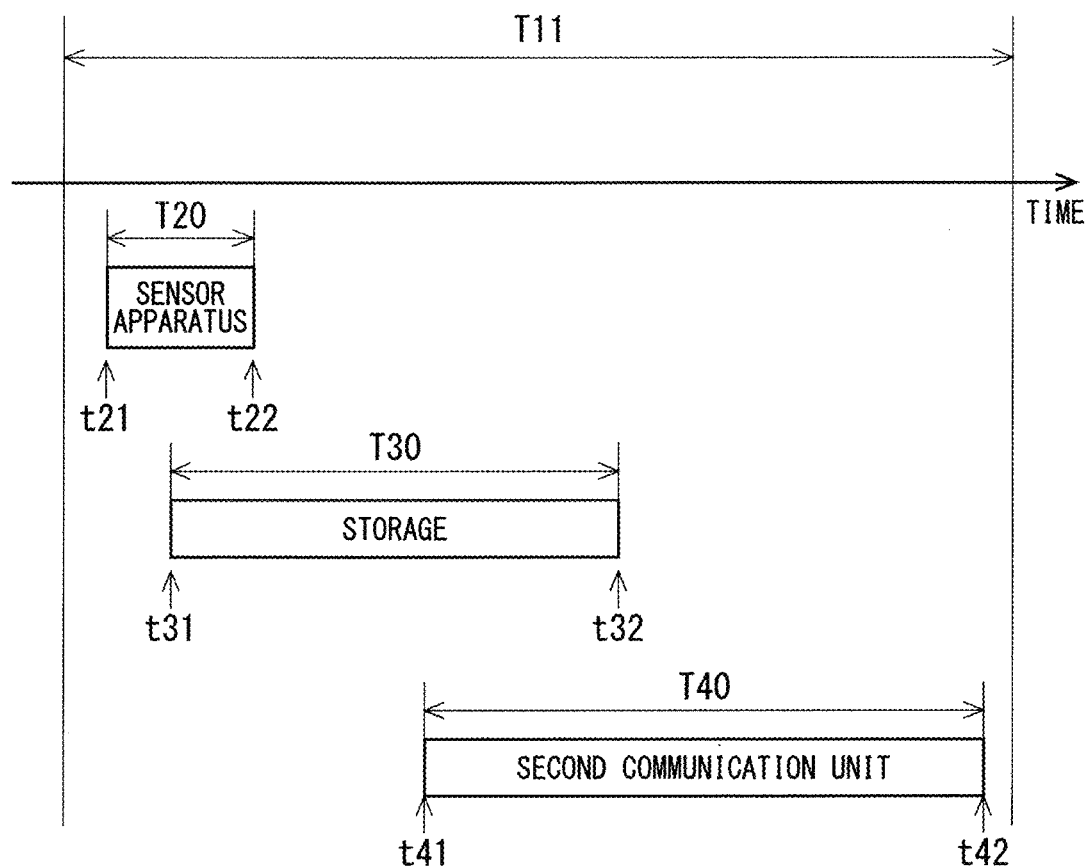
FIG. 43 is a diagram for illustrating one example of operation of the main apparatus.

FIG. 43 is a diagram for illustrating one example of operation of the storage 320, the sensor apparatus 330, and the second communication unit 350 of the information processing apparatus 3 performing the intermittent operation in the non-standby period T11. In FIG. 43, the rectangle labeled "sensor apparatus" indicates an operation period T20 of the sensor apparatus 330. The rectangle labeled "storage" indicates an operation period T30 of the storage 320. The rectangle labeled "second communication unit" indicates an operation period T40 of the second communication unit 350. The following is a description of the information processing system 1 when the storage 320, the sensor apparatus 330, and the second communication unit 350 operate as in FIG. 43.

In the example illustrated in FIG. 43, when the operation mode of the information processing apparatus 3 is set to the non-standby mode, first, the controller 310 controls the sensor apparatus 330 and causes the sensor apparatus 330 to acquire sensor information. Next, the controller 310 stores the sensor information obtained in the sensor apparatus 330 in the storage 320. Next, the controller 310 retrieves the sensor information from the storage 320, and inputs the retrieved sensor information into the processing circuit 360. Next, the controller 310 stores processed sensor information obtained in the processing circuit 360 in the storage 320. Next, the controller 310 retrieves the processed sensor information from the storage 320. Next, the controller 310 controls the second communication unit 350 and causes the second communication unit 350 to transmit the processed sensor information retrieved from the storage 320. After the second communication unit 350 completes the transmission of the processed sensor information to the server apparatus 2, the controller 310 outputs the standby signal SB. With this, the non-standby period T11 ends, and the operation mode of the information processing apparatus 3 is set to the standby mode. In the operation period T40, the second communication unit 350 may transmit information other than the processed sensor information to the server apparatus 2. Further, in the operation period T40, the second communication unit 350 may receive information from the server apparatus 2.

Note that the rectangle indicating the operation period T30 of the storage 230 shown in FIG. 43 stretches uninterruptedly. However, as can be understood from the description above, the storage 230 operates not uninterruptedly but intermittently in the operation period T30.

When the main apparatus 30 operates in this manner, as illustrated in FIG. 43, in the non-standby period T11, operation start timing t31 of the storage 320 occurs after operation start timing t21 of the sensor apparatus 330. The operation start timings t21 and t31 occur in an initial part of the non-standby period T11. Further, in the non-standby period T11, operation start timing t41 of the second communication unit 350 occurs after the operation start timing t31 of the storage 320. The operation start timing t41 occurs in an intermediate part of the non-standby period T11.

Further, in the example of FIG. 43, operation end timing t22 of the sensor apparatus 330 occurs after the operation start timing t31 of the storage 320, and operation end timing t32 of the storage 320 occurs after the operation start timing t41 of the second communication unit 350. In the non-standby period T11, the operation end timing t22 occurs in an initial part, and the operation end timing t32 occurs in an intermediate part. Further, in the non-standby period T11, operation end timing t42 of the second communication unit 350 occurs after the operation end timing t32 of the storage 320. The operation end timing t42 occurs in an end part of the non-standby period T11.

When the main apparatus 30 performing the operation as described above is hacked, the sensor apparatus 330, the storage 320, and the second communication unit 350 may not operate as illustrated in FIG. 43. For example, when the main apparatus 30 is hacked, the second communication unit 350 may communicate with the server apparatus 2 for a long period of time, and an operation time period of the second communication unit 350 (i.e., the length of the operation period T40) in the non-standby period T11 may be significantly longer than that when the information processing apparatus 3 normally operates. Further, an operation time period of the sensor apparatus 330 (i.e., the length of the operation period T20) in the non-standby period T11 may be significantly longer than that when the information processing apparatus 3 normally operates, or an operation time period of the storage 320 (i.e., the length of the operation period T30) in the non-standby period T11 may be significantly longer than that when the information processing apparatus 3 normally operates. Further, when the main apparatus 30 is hacked, the operation start timing t41 of the second communication unit 350 may occur significantly earlier than that when the information processing apparatus 3 normally operates, or the operation end timing t22 of the sensor apparatus 330 may occur significantly later than that when the information processing apparatus 3 normally operates.

Figure 44:
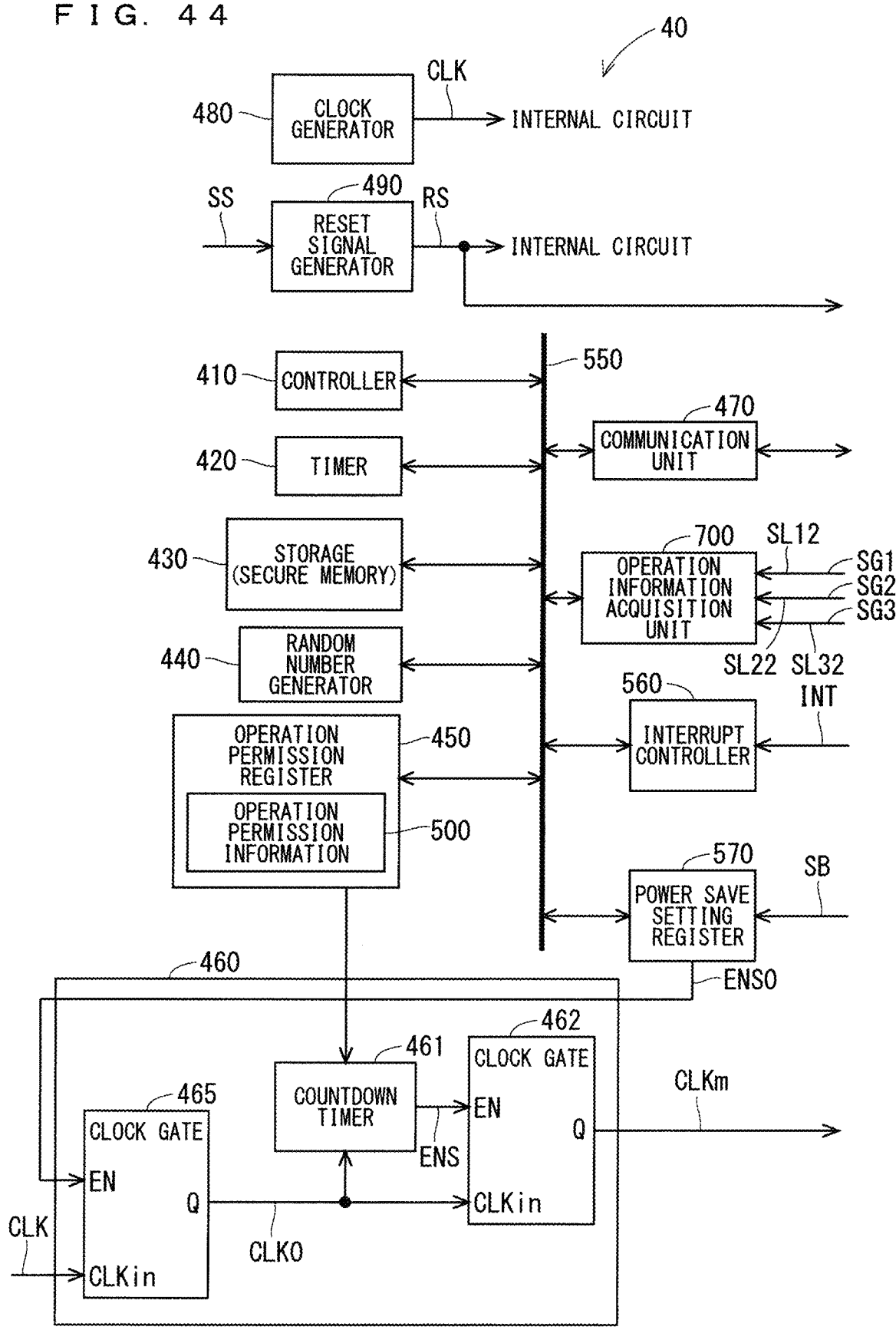
FIG. 44 is a diagram illustrating one example of a configuration of the operation control apparatus.
Figure 45:
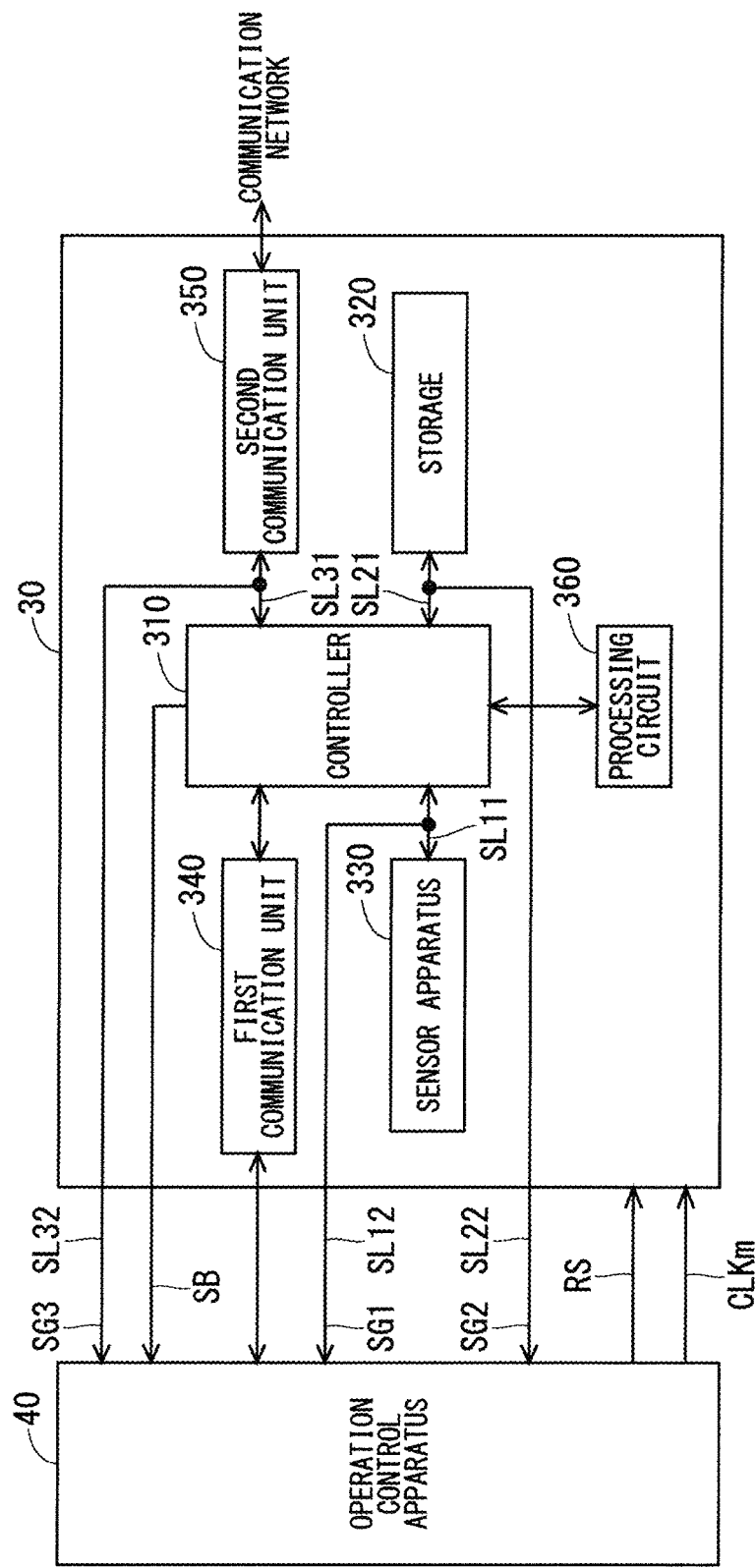
FIG. 45 is a diagram illustrating one example of a configuration of the main apparatus.

In view of this, in this example, whether or not the operation of the information processing apparatus 3 is abnormal is determined based on the operation information of the sensor apparatus 330, the storage 320, and the second communication unit 350. FIGS. 44 and 45 are diagrams illustrating one example of a configuration of the operation control apparatus 40 and the main apparatus 30 in such a case, respectively. In comparison with the operation control apparatus 40 illustrated in FIG. 28 described above, the operation control apparatus 40 illustrated in FIG. 44 includes an operation information acquisition unit 700 instead of the clock measurement counter 580. In comparison with the main apparatus 30 illustrated in FIG. 36 described above, the main apparatus 30 illustrated in FIG. 45 adopts different connection relation with the operation control apparatus 40. The controller 310 of the main apparatus 30 illustrated in FIG. 45 may include the clock generator 312 as illustrated in FIG. 37. Note that the overall configuration of the information processing apparatus 3 is the same as the configuration illustrated in FIG. 23 described above.

The operation information acquisition unit 700 of the operation control apparatus 40 is controlled by the controller 410. The controller 410 can control the operation information acquisition unit 700 only when the controller 410 operates in the secure mode, similarly to the clock measurement counter 580. The operation information acquisition unit 700 acquires apparatus operation information. Specifically, the operation information acquisition unit 700 acquires operation information of a plurality of specific circuits of the main apparatus 30, and uses the acquired operation information as the apparatus operation information. For example, the operation information acquisition unit 700 acquires operation information of the sensor apparatus 330, the storage 320, and the second communication unit 350 of the main apparatus 30, and uses the acquired operation information as the apparatus operation information.

The operation information acquisition unit 700 acquires an operation time period of the sensor apparatus 330 in a predetermined period as the operation information of a specific circuit, for example. Specifically, the operation information acquisition unit 700 acquires an operation time period of the sensor apparatus 330 in the predetermined period as the operation information of the sensor apparatus 330, for example. The operation information acquisition unit 700 acquires an operation time period of the storage 320 in the predetermined period as the operation information of the storage 320, for example. The operation information acquisition unit 700 acquires an operation time period of the second communication unit 350 in the predetermined period as the operation information of the second communication unit 350, for example. For example, the predetermined period matches the non-standby period T11. The predetermined period may be hereinafter referred to as an observation period. The observation period starts when the interrupt signal INT is input into the operation control apparatus 40, and ends when the standby signal SB is input into the operation control apparatus 40. In other words, the observation period starts when supply of the clock signal CLK to the main apparatus 30 starts, and ends when the supply of the clock signal CLK to the main apparatus 30 stops.

The operation information acquisition unit 700 acquires the operation information of the sensor apparatus 330, based on monitoring of a predetermined signal SG1 between the controller 310 and the sensor apparatus 330 of the main apparatus 30. In this example, one end of a signal line SL12 is connected to a signal line SL11 that extends between the controller 310 and the sensor apparatus 330 and that allows the flow of the signal SG1. Another end of the signal line SL12 is connected to the operation information acquisition unit 700. With this, the operation information acquisition unit 700 can monitor the signal SG1 that flows in the signal line SL11 connected to the sensor apparatus 330.

The operation information acquisition unit 700 acquires the operation information of the storage 320, based on monitoring of a predetermined signal SG2 between the controller 310 and the storage 320. In this example, one end of a signal line SL22 is connected to a signal line SL21 that extends between the controller 310 and the storage 320 and that allows the flow of the signal SG2. Another end of the signal line SL22 is connected to the operation information acquisition unit 700. With this, the operation information acquisition unit 700 can monitor the signal SG2 that flows in the signal line SL21 connected to the storage 320.

The operation information acquisition unit 700 acquires the operation information of the second communication unit 350, based on monitoring of a predetermined signal SG3 between the controller 310 and the second communication unit 350. In this example, one end of a signal line SL32 is connected to a signal line SL31 that extends between the controller 310 and the second communication unit 350 and that allows the flow of the signal SG3. Another end of the signal line SL32 is connected to the operation information acquisition unit 700. With this, the operation information acquisition unit 700 can monitor the signal SG3 that flows in the signal line SL31 connected to the second communication unit 350.

When the controller 310 communicates with the sensor apparatus 330 based on SPI, for example, a chip select signal is adopted as the signal SG1 to be monitored, for example. Further, when the controller 310 communicates with the storage 320 based on SPI, for example, a chip select signal is adopted as the signal SG2 to be monitored, for example. Further, when the controller 310 communicates with the second communication unit 350 based on SPI, for example, a chip select signal is adopted as the signal SG3 to be monitored, for example.

In contrast, when the controller 310 communicates with the sensor apparatus 330 based on I2C, for example, an SCL signal and an SDA signal are adopted as the signal SG1 to be monitored, for example. Further, when the controller 310 communicates with the storage 320 based on I2C, for example, an SCL signal and an SDA signal are adopted as the signal SG2 to be monitored, for example. Further, when the controller 310 communicates with the second communication unit 350 based on I2C. for example, an SCL signal and an SDA signal are adopted as the signal SG3 to be monitored, for example.

The operation information acquisition unit 700 monitors the signal SG1 for the observation period, and based on results of the monitoring, the operation information acquisition unit 700 calculates the operation time period of the sensor apparatus 330 in the observation period. For example, suppose the signal SG1 is a chip select signal of SPI. In this case, it can be assumed that the sensor apparatus 330 keeps operating while the chip select signal is asserted. The chip select signal of SPI is asserted when a signal level of the chip select signal is changed from the High level to the Low level, and is negated when the signal level is changed from the Low level to the High level. Accordingly, the operation information acquisition unit 700 can calculate the operation time period of the sensor apparatus 330 in the observation period by monitoring falls and rises of the chip select signal input into the sensor apparatus 330 for the observation period.

As another example, suppose the signal SG1 is an SCL signal and an SDA signal of I2C. In I2C, a START condition is issued at the start of communication, and a STOP condition is issued at the end of communication. It can be assumed that the sensor apparatus 330 keeps operating from the issue of the START condition till the issue of the STOP condition. In I2C, a START/START condition is issued when the SDA signal shifts from the High level to the Low level while the SCL signal is at the High level. Further, a STOP/START condition is issued when the SDA signal shifts from the Low level to the High level while the SCL signal is at the High level. Accordingly, the operation information acquisition unit 700 can calculate the operation time period of the sensor apparatus 330 in the observation period by monitoring the SCL signal and the SDA signal between the controller 310 and the sensor apparatus 330 for the observation period.

In a similar manner, the operation information acquisition unit 700 can calculate the operation time period of the storage 320 in the observation period by monitoring the signal SG2 between the controller 310 and the storage 320 for the observation period. Further, the operation information acquisition unit 700 can calculate the operation time period of the second communication unit 350 in the observation period by monitoring the signal SG3 between the controller 310 and the second communication unit 350 for the observation period.

The operation time period of a specific circuit in the observation period calculated in the operation information acquisition unit 700 may be hereinafter referred to as a measured operation time period of the specific circuit. For example, the measured operation time period of the sensor apparatus 330 refers to an operation time period of the sensor apparatus 330 in the observation period calculated in the operation information acquisition unit 700.

The information processing apparatus 3 may transmit operation information of a specific circuit in a plurality of observation periods to the server apparatus 2 collectively as log information, or may transmit operation information of a specific circuit in one observation period to the server apparatus 2 in every single observation period.

When the server apparatus 2 performs the abnormality determination processing, the controller 20 determines whether or not the operation of the information processing apparatus 3 is abnormal, based on the operation information of the sensor apparatus 330, the storage 320, and the second communication unit 350 included in the apparatus operation information received from the information processing apparatus 3 in Step s113 of FIG. 30 described above. Specifically, the controller 20 determines whether or not the operation of the information processing apparatus 3 is abnormal, based on the measured operation time period of each of the sensor apparatus 330, the storage 320, and the second communication unit 350.

In Step s113, the controller 20 performs provisional abnormality determination, based on the operation information, e.g., the measured operation time period, of the sensor apparatus 330. Further, the controller 20 performs provisional abnormality determination, based on the operation information, e.g., the measured operation time period, of the storage 320. Then, the controller 20 performs provisional abnormality determination, based on the operation information, e.g., the measured operation time period, of the second communication unit 350. If the controller 20 determines that the operation of the information processing apparatus 3 is abnormal as a result of at least one of the provisional abnormality determinations based on the operation information of the sensor apparatus 330, the storage 320, and the second communication unit 350, the controller 20 conclusively determines that the operation of the information processing apparatus 3 is abnormal. In contrast, if the controller 20 determines that the operation of the information processing apparatus 3 is normal as a result of all of the provisional abnormality determinations based on the operation information of the sensor apparatus 330, the storage 320, and the second communication unit 350, the controller 20 conclusively determines that the operation of the information processing apparatus 3 is normal.

In the provisional abnormality determination, for example, the controller 20 determines whether or not the measured operation time period of the sensor apparatus 330 matches a fourth reference value. If the controller 20 determines that the measured operation time period of the sensor apparatus 330 matches the fourth reference value, the controller 20 determines that the operation of the information processing apparatus 3 is normal. In contrast, if the controller 20 determines that the measured operation time period of the sensor apparatus 330 does not match the fourth reference value, the controller 20 determines that the operation of the information processing apparatus 3 is abnormal. The fourth reference value is an operation time period of the sensor apparatus 330 in the observation period when the information processing apparatus 3 normally performs the intermittent operation. Further, the controller 20 may determine that the operation of the information processing apparatus 3 is normal when the measured operation time period of the sensor apparatus 330 falls within a predetermined range including the fourth reference value, and may determine that the operation of the information processing apparatus 3 is abnormal when the measured operation time period of the sensor apparatus 330 falls outside the predetermined range.

Note that the controller 20 may use an average value of the operation time periods of the sensor apparatus 330 in a plurality of observation periods acquired in the operation information acquisition unit 700 as the fourth reference value. For example, when the controller 20 acquires the latest measured operation time period of the sensor apparatus 330, the controller 20 calculates an average value of a plurality of measured operation time periods of the sensor apparatus 330 that are acquired prior to the latest measured operation time period. Then, the controller 20 performs provisional abnormality determination as described above, using the calculated average value as the fourth reference value.

The controller 20 can perform provisional abnormality determination based on the measured operation time period of the storage 320 and provisional abnormality determination based on the measured operation period of the second communication unit 350, in a similar manner to the provisional abnormality determination based on the measured operation time period of the sensor apparatus 330.

When the information processing apparatus 3 performs the abnormality determination processing, in the flowchart illustrated in FIG. 34 described above, the controller 410 of the operation control apparatus 40 causes the operation information acquisition unit 700 to acquire the operation information of the sensor apparatus 330, the storage 320, and the second communication unit 350, instead of executing Steps s151 to s153. Then, in Step s154, the controller 410 determines whether or not the operation of the information processing apparatus 3 is abnormal, based on the operation information of the sensor apparatus 330, the storage 320, and the second communication unit 350 acquired in the operation information acquisition unit 700. The controller 410 can determine whether or not the operation of the information processing apparatus 3 is abnormal, based on the measured operation time period of each of the sensor apparatus 330, the storage 320, and the second communication unit 350, in a manner similar to when the controller 20 of the server apparatus 2 performs the abnormality determination processing.

When the controller 310 communicates with the sensor apparatus 330 based on SPI, a chip select signal and a clock signal may be used as the signal SG1 to be monitored. In this case, for example, the operation information acquisition unit 700 may measure the number of rises or the number of falls of the clock signal during a period in which the chip select signal is asserted (period in which the chip select signal is at the Low level), and may use the measured number as the operation time period of the sensor apparatus 330. Alternatively, the operation information acquisition unit 700 may measure the number of toggles of the clock signal during a period in which the chip select signal is asserted, and may use the measured number as the operation time period of the sensor apparatus 330. Here, the number of toggles of a signal is a value of the sum of the number of rises and the number of falls of the signal. Accordingly, when the operation information acquisition unit 700 counts the number of toggles of the clock signal, the operation information acquisition unit 700 counts up the measured count at each rise and fall of the clock signal. Note that, regarding the storage 320 and the second communication unit 350 as well, the operation information acquisition unit 700 may use the number of rises, the number of falls, or the number of toggles of the clock signal during a period in which the chip select signal is asserted as the operation time period of the storage 320 and the second communication unit 350.

Further, when the controller 310 communicates with the sensor apparatus 330 based on I2C, the operation information acquisition unit 700 may measure the number of rises or the number of falls of the SCL signal during a period from the issue of a START condition to the issue of a STOP condition, and may include the measured number in the apparatus operation information as the operation time period of the sensor apparatus 330. Alternatively, the operation information acquisition unit 700 may measure the number of toggles of the SCL signal during a period from the issue of a START condition to the issue of a STOP condition, and may include the measured number in the apparatus operation information as the operation time period of the sensor apparatus 330. Note that, regarding the storage 320 and the second communication unit 350 as well, the operation information acquisition unit 700 may use the number of rises, the number of falls, or the number of toggles of the SCL signal during a period from the issue of a START condition to the issue of a STOP condition as the operation time period of the storage 320 and the second communication unit 350.

The apparatus operation information may include the operation information of the sensor apparatus 330, the storage 320, and the second communication unit 350, and information other than the operation information. For example, the apparatus operation information may include the operation information of the sensor apparatus 330, the storage 320, and the second communication unit 350, and the clock measurement value in the clock measurement period. In this case, the operation information acquisition unit 700 acquires the clock measurement value in the clock measurement period, based on the clock signal CLKm output from the operation controller 460, similarly to the clock measurement counter 580. Then, whether or not the operation of the information processing apparatus 3 is abnormal is conclusively determined, based on results of provisional abnormality determination based on each piece of the operation information of the sensor apparatus 330, the storage 320, and the second communication unit 350 and results of provisional abnormality determination based on the clock measurement value in the clock measurement period.

Further, the apparatus operation information may include only one piece of operation information of the sensor apparatus 330, the storage 320, and the second communication unit 350. In other words, only a single specific circuit may be used. In this case, when the apparatus operation information does not include information (for example, the clock measurement value) other than the operation information of a specific circuit, results of provisional abnormality determination based on the operation information of the specific circuit are used as conclusive determination results as to whether or not the operation of the information processing apparatus 3 is abnormal.

Further, the apparatus operation information may include only two pieces of operation information of the sensor apparatus 330, the storage 320, and the second communication unit 350. In other words, two specific circuits may be used. In this case, in the abnormality determination processing, provisional abnormality determination is performed based on each of the two pieces of operation information included in the apparatus operation information.

Further, the operation information of a specific circuit included in the apparatus operation information may include operation start timing of the specific circuit in the observation period. Specifically, the operation information of the sensor apparatus 330 included in the apparatus operation information may include operation start timing of the sensor apparatus 330 in the observation period. The operation information acquisition unit 700 can calculate the operation start timing of the sensor apparatus 330 in the observation period, based on monitoring of the signal SG1, in a similar manner to calculating the operation time period of the sensor apparatus 330. For example, when the signal SG1 is a chip select signal of SPI, the operation information acquisition unit 700 can consider timing at which the chip select signal shifts from a negated state (High level) to an asserted state (Low level) as the operation start timing of the sensor apparatus 330. Further, when the signal SG1 is an SCL signal and an SDA signal of I2C, the operation information acquisition unit 700 can calculate timing at which a START condition is issued based on the SCL signal and the SDA signal, and can consider the calculated timing as the operation start timing of the sensor apparatus 330. The operation start timing of a specific circuit in the observation period calculated in the operation information acquisition unit 700 may be hereinafter referred to as a measured operation start timing of the specific circuit. The measured operation start timing of the sensor apparatus 330 refers to operation start timing of the sensor apparatus 330 in the observation period calculated in the operation information acquisition unit 700.

For example, the measured operation start timing of the sensor apparatus 330 is represented as relative timing in the observation period. For example, let TM be the length of the observation period. If the measured operation start timing of the sensor apparatus 330 is timing occurring one-tenth the observation period after the start of the observation period, the measured operation start timing of the sensor apparatus 330 is represented as (TM×1/10), for example.

When the operation information of the sensor apparatus 330 includes measured operation start timing, in the abnormality determination processing, provisional abnormality determination based on the measured operation start timing is performed. When the information processing apparatus 3 normally operates, as illustrated in FIG. 43 described above, the operation start timing t21 of the sensor apparatus 330 occurs in an initial part of the non-standby period T11. In provisional abnormality determination, when the operation start timing of the sensor apparatus 330 in the observation period matching the non-standby period T11 occurs in an initial part of the observation period, it is determined that the operation of the information processing apparatus 3 is normal. For example, if the measured operation start timing of the sensor apparatus 330 occurs at or before one-fifth of the first half of the observation period, it is determined that the operation of the information processing apparatus 3 is normal. In contrast, in the provisional abnormality determination, if the measured operation start timing of the sensor apparatus 330 does not occur in an initial part of the observation period, it is determined that the operation of the information processing apparatus 3 is abnormal. For example, if the measured operation start timing of the sensor apparatus 330 occurs after one-fifth of the first half of the observation period, it is determined that the operation of the information processing apparatus 3 is abnormal.

Note that, in the abnormality determination processing, the average of operation start timings of the sensor apparatus 330 in a plurality of observation periods acquired in the operation information acquisition unit 700 may be used as reference timing. In this case, for example, when the controller acquires the latest measured operation start timing of the sensor apparatus 330, the controller calculates the average of a plurality of measured operation start timings of the sensor apparatus 330 that are acquired prior to the latest measured operation start timing. Then, if the latest measured operation start timing is close to the reference timing, the controller determines that the operation of the information processing apparatus 3 is normal. For example, if a difference between the latest measured operation start timing and the reference timing falls within a predetermined range, the controller determines that the operation of the information processing apparatus 3 is normal. In contrast, if the latest measured operation start timing is not close to the reference timing, the controller determines that the operation of the information processing apparatus 3 is abnormal. For example, if the difference between the latest measured operation start timing and the reference timing falls outside the predetermined range, the controller determines that the operation of the information processing apparatus 3 is abnormal.

Further, when the operation information of the sensor apparatus 330 includes a plurality of pieces of information, in the abnormality determination processing, provisional abnormality determination based on the pieces of information is performed for each of the plurality of pieces of information. For example, when the operation information of the sensor apparatus 330 includes the measured operation time period and the measured operation start timing, in the abnormality determination processing, provisional abnormality determination based on each of the measured operation time period and the measured operation start timing is performed.

Further, the operation information of the storage 320 included in the apparatus operation information may include the operation start timing of the storage 320 in the observation period. Further, the operation information of the second communication unit 350 included in the apparatus operation information may include the operation start timing of the second communication unit 350 in the observation period. In the abnormality determination processing, the controller can perform provisional abnormality determination based on the operation start timing of the storage 320 in the observation period and provisional abnormality determination based on the operation start timing of the second communication unit 350 in the observation period, in a similar manner to the provisional abnormality determination based on the measured operation start timing of the sensor apparatus 330. The operation start timing of the storage 320 in the observation period calculated in the operation information acquisition unit 700 may be hereinafter referred to as measured operation start timing of the storage 320. Further, the operation start timing of the second communication unit 350 in the observation period calculated in the operation information acquisition unit 700 may be hereinafter referred to as measured operation start timing of the second communication unit 350. The measured operation start timing of each of the storage 320 and the second communication unit 350 is represented as relative timing in the observation period, for example, similarly to the measured operation start timing of the sensor apparatus 330.

Further, the operation information of the sensor apparatus 330 included in the apparatus operation information may include the operation end timing of the sensor apparatus 330 in the observation period. The operation information acquisition unit 700 can calculate the operation end timing of the sensor apparatus 330 in the observation period, based on monitoring of the signal SG1, in a similar manner to calculating the measured operation time period of the sensor apparatus 330. For example, when the signal SG1 is a chip select signal of SPI, the operation information acquisition unit 700 can consider timing at which the chip select signal shifts from an asserted state (Low level) to a negated state (High level) as the operation end timing of the sensor apparatus 330. Further, when the signal SG1 is an SCL signal and an SDA signal of I2C, the operation information acquisition unit 700 can calculate timing at which a STOP condition is issued based on the SCL signal and the SDA signal, and can consider the calculated timing as the operation end timing of the sensor apparatus 330. The operation end timing of the sensor apparatus 330 in the observation period calculated in the operation information acquisition unit 700 may be hereinafter referred to as measured operation end timing of the sensor apparatus 330. The measured operation end timing of the sensor apparatus 330 is represented as relative timing in the observation period, for example, similarly to the measured operation start timing of the sensor apparatus 330.

When the operation information of the sensor apparatus 330 includes the measured operation end timing, in the abnormality determination processing, provisional abnormality determination based on the measured operation end timing is performed. When the information processing apparatus 3 normally operates, as illustrated in FIG. 43 described above, the operation end timing t22 of the sensor apparatus 330 occurs in an initial part of the non-standby period T11. In the provisional abnormality determination, when the measured operation end timing of the sensor apparatus 330 occurs in an initial part of the observation period, it is determined that the operation of the information processing apparatus 3 is normal. For example, if the measured operation end timing of the sensor apparatus 330 occurs at or before a quarter of the first half of the observation period, it is determined that the operation of the information processing apparatus 3 is normal. In contrast, in the provisional abnormality determination, if the measured operation end timing of the sensor apparatus 330 does not occur in an initial part of the observation period, it is determined that the operation of the information processing apparatus 3 is abnormal. For example, if the measured operation end timing of the sensor apparatus 330 occurs after a quarter of the first half of the observation period, it is determined that the operation of the information processing apparatus 3 is abnormal.

Note that the controller may perform provisional abnormality determination based on the latest measured operation end timing of the sensor apparatus 330 by using the average of operation end timings of the sensor apparatus 330 in a plurality of observation periods as reference timing, in a similar manner to the provisional abnormality determination based on the measured operation start timing of the sensor apparatus 330.

Further, the operation information of the storage 320 included in the apparatus operation information may include the operation end timing of the storage 320 in the observation period. Further, the operation information of the second communication unit 350 included in the apparatus operation information may include the operation end timing of the second communication unit 350 in the observation period. In the abnormality determination processing, the controller can perform provisional abnormality determination based on the operation end timing of the storage 320 in the observation period and provisional abnormality determination based on the operation end timing of the second communication unit 350 in the observation period, in a similar manner to the provisional abnormality determination based on the measured operation end timing of the sensor apparatus 330. The operation end timing of the storage 320 in the observation period calculated in the operation information acquisition unit 700 may be hereinafter referred to as measured operation end timing of the storage 320. Further, the operation end timing of the second communication unit 350 in the observation period calculated in the operation information acquisition unit 700 may be hereinafter referred to as measured operation end timing of the second communication unit 350. The measured operation end timing of each of the storage 320 and the second communication unit 350 is represented as relative timing in the observation period, for example, similarly to the measured operation start timing of the sensor apparatus 330.

Figure 46:
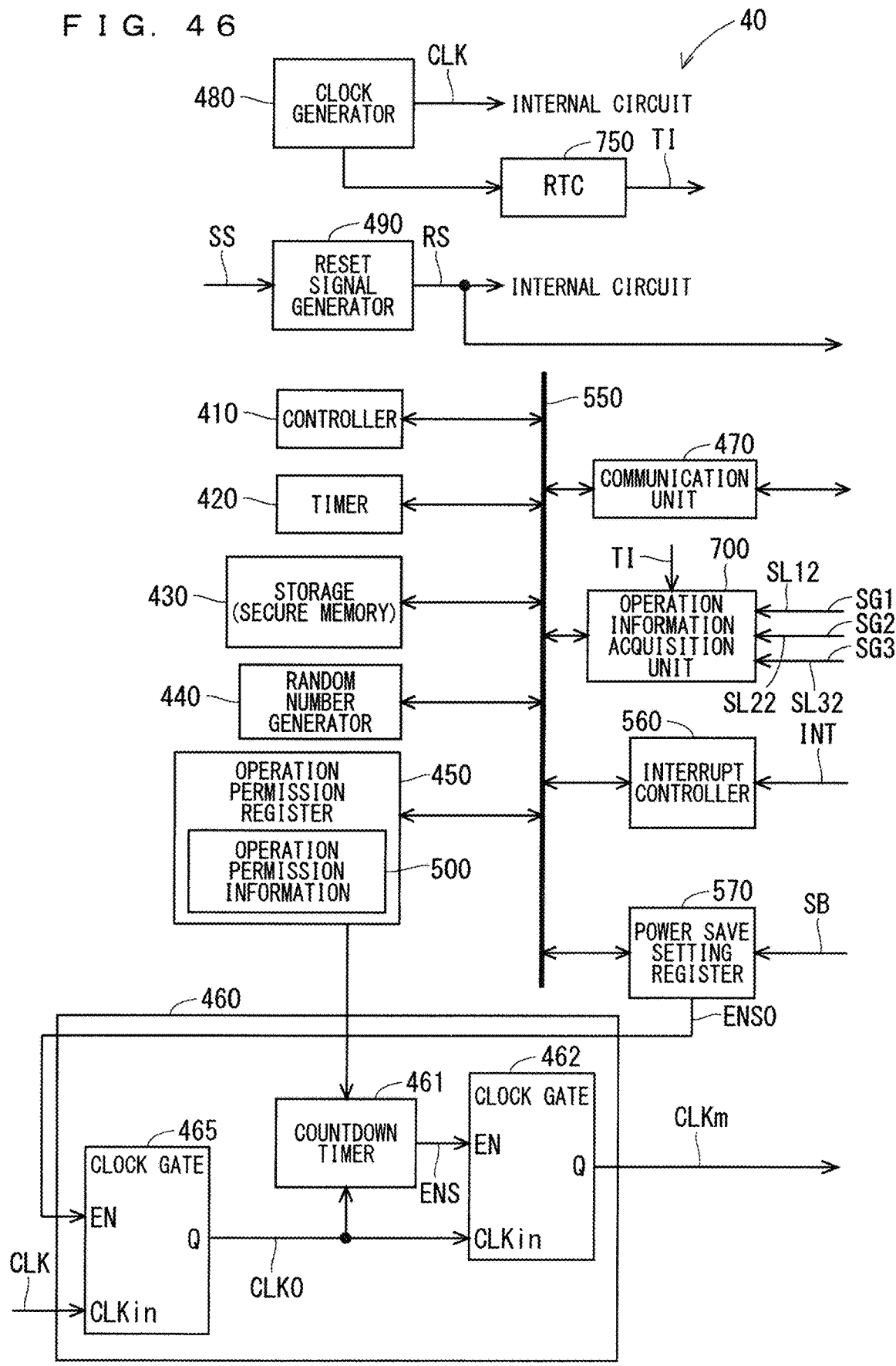
FIG. 46 is a diagram illustrating one example of a configuration of the operation control apparatus.

Note that the measured operation start timing and the measured operation end timing of a specific circuit may be represented by absolute time. FIG. 46 is a diagram illustrating one example of a configuration of the operation control apparatus 40 in such a case. In comparison with the operation control apparatus 40 illustrated in FIG. 44 described above, the operation control apparatus 40 illustrated in FIG. 46 further includes an RTC 750. For example, the RTC 750 operates based on a clock signal output from an oscillator (for example, a crystal oscillator) of the clock generator 480. The RTC 750 measures the current time, and outputs time information TI indicating the current time. The time information TI is input into the operation information acquisition unit 700. The operation information acquisition unit 700 represents the measured operation start timing and the measured operation end timing of a specific circuit by time, based on the time information TI. For example, when the signal SG1 is a chip select signal of SPI, the operation information acquisition unit 700 uses time indicated by the time information TI output from the RTC 750 when the chip select signal reaches the Low level as the operation start timing of the sensor apparatus 330. The measured operation start timing and the measured operation end timing represented by time may be hereinafter referred to as measured operation start time and measured operation end time, respectively.

When provisional abnormality determination based on the measured operation start time of a specific circuit is performed, for example, the controller calculates a difference time period, which is obtained by subtracting measured operation start time acquired immediately before the latest measured operation start time from the latest measured operation start time, every time the latest measured operation start time is acquired. With this, a difference time period is calculated every time the latest measured operation start time is acquired.

In this example, in provisional abnormality determination, the controller acquires the latest difference time period by subtracting measured operation start time acquired immediately before the latest measured operation start time from the latest measured operation start time. Further, the controller calculates an average value of a plurality of difference time periods that are calculated prior to the latest difference time period. Then, the controller determines whether or not the latest difference time period is close to the average value of the difference time periods. For example, if the difference between the latest difference time period and the average value of the difference time periods falls within a predetermined range, the controller determines that the latest difference time period is close to the average value of the difference time periods. If the controller determines that the latest difference time period is close to the average value of the difference time periods, the controller determines that the operation of the information processing apparatus 3 is normal. In contrast, if the controller determines that the latest difference time period is not close to the average value of the difference time periods, the controller determines that the operation of the information processing apparatus 3 is abnormal.

Figure 47:
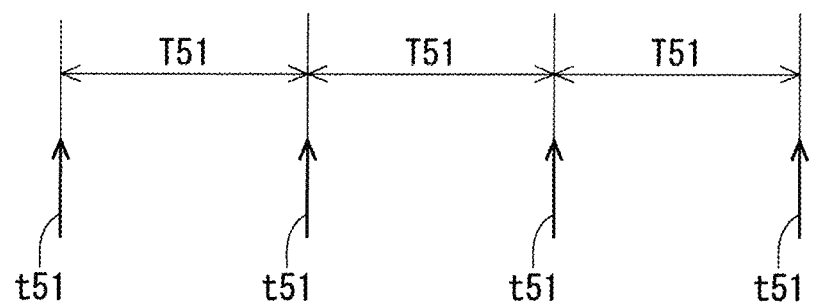
FIG. 47 is a diagram for illustrating one example of operation of a circuit of the main apparatus.

When the information processing apparatus 3 normally performs the intermittent operation, as illustrated in FIG. 47, intervals T51 between operation start timings t51 of a specific circuit in a plurality of non-standby periods T11 are substantially constant. Thus, when the information processing apparatus 3 normally performs the intermittent operation, the difference time periods are substantially constant. Consequently, when the information processing apparatus 3 normally performs the intermittent operation, the latest difference time period has a value close to the average value of the difference time periods. In contrast, when the main apparatus 30 is hacked and the measured operation start time is thereby shifted, the latest difference time period does not have a value close to the average value of the difference time periods. Thus, as described above, the controller can appropriately perform provisional abnormality determination by determining whether or not the latest difference time period is close to the average value of the difference time periods. The controller can also perform provisional abnormality determination based on the measured operation end time in a similar manner.

Note that, when the controller 20 of the server apparatus 2 performs provisional abnormality determination based on the measured operation start time of a specific circuit, the controller 20 may perform the provisional abnormality determination in a procedure different from that described above.

For example, suppose the controller 20 performs provisional abnormality determination based on the measured operation start time of the sensor apparatus 330. In this case, when the controller 20 receives measured operation start time of the sensor apparatus 330 from the information processing apparatus 3, the controller 20 determines whether or not the controller 20 has received sensor information from the information processing apparatus 3 within a predetermined time period from the measured operation start time. For example, the predetermined time period is set to a length equal to the length of the non-standby period T11 that is used when the information processing apparatus 3 normally operates. If the controller 20 does not receive sensor information from the information processing apparatus 3 that transmitted the measured operation start time within the predetermined time period from the measured operation start time, the controller 20 determines that the operation of the information processing apparatus 3 is abnormal. In contrast, if the controller 20 receives sensor information from the information processing apparatus 3 that transmitted the measured operation start time within the predetermined time period from the measured operation start time, the controller 20 determines that the operation of the information processing apparatus 3 is normal. When the server apparatus 2 receives the measured operation start time of the sensor apparatus 330 from the normally operating information processing apparatus 3, the server apparatus 2 receives sensor information from the information processing apparatus 3 within the predetermined time period from the measured operation start time. Thus, the controller 20 can determine whether or not the operation of the information processing apparatus 3 is abnormal by determining whether or not the controller 20 has received sensor information from the information processing apparatus 3 that output the measured operation start time within the predetermined time period from the acquired measured operation start time.

As another example, suppose the controller 20 performs provisional abnormality determination based on the measured operation start time of the second communication unit 350. In this case, when the controller 20 receives measured operation start time from the information processing apparatus 3, the controller 20 determines whether or not the server apparatus 2 has started communication with the information processing apparatus 3 within a predetermined time period from the measured operation start time. For example, the predetermined time period is set to half the length of the non-standby period T11 that is used when the information processing apparatus 3 normally operates. If the server apparatus 2 does not start communication with the information processing apparatus 3 that transmitted the measured operation start time even after the elapse of the predetermined time period from the measured operation start time, the controller 20 determines that the operation of the information processing apparatus 3 is abnormal. In contrast, if the server apparatus 2 starts communication with the information processing apparatus 3 that transmitted the measured operation start time within the predetermined time period from the measured operation start time, the controller 20 determines that the operation of the information processing apparatus 3 is normal. When the server apparatus 2 receives measured operation start time of the second communication unit 350 from the normally operating information processing apparatus 3, the server apparatus 2 starts communication with the information processing apparatus 3 within the predetermined time period from the measured operation start time. Thus, the controller 20 can determine whether or not the operation of the information processing apparatus 3 is abnormal by determining whether or not the server apparatus 2 has started communication with the information processing apparatus 3 that output the measured operation start time within the predetermined time period from the acquired measured operation start time.

Note that the controller 20 may perform provisional abnormality determination based on the measured operation end time of the sensor apparatus 330, in a similar manner to the provisional abnormality determination based on the measured operation start time of the sensor apparatus 330. Further, the controller 20 may perform provisional abnormality determination based on the measured operation end time of the second communication unit 350, in a similar manner to the provisional abnormality determination based on the measured operation start time of the second communication unit 350.

Further, the operation information of a specific circuit included in the apparatus operation information may include operation/non-operation information, which indicates whether or not the specific circuit operates in the observation period. In this case, in provisional abnormality determination, if the controller determines that the specific circuit does not operate in the observation period based on the operation/non-operation information included in the operation information of the specific circuit, the controller determines that the operation of the information processing apparatus 3 is abnormal. In contrast, if the controller determines that the specific circuit operates in the observation period based on the operation/non-operation information included in the operation information of the specific circuit, the controller determines that the operation of the information processing apparatus 3 is normal.

The apparatus operation information may include first operation/non-operation information, which indicates whether or not the sensor apparatus 330 operates in the observation period. The operation information acquisition unit 700 can determine whether or not the sensor apparatus 330 operates in the observation period, based on monitoring of the signal SG1. Further, the apparatus operation information may include second operation/non-operation information, which indicates whether or not the storage 320 operates in the observation period. The operation information acquisition unit 700 can determine whether or not the storage 320 operates in the observation period, based on monitoring of the signal SG2. Further, the apparatus operation information may include third operation/non-operation information, which indicates whether or not the second communication unit 350 operates in the observation period. The operation information acquisition unit 700 can determine whether or not the second communication unit 350 operates in the observation period, based on monitoring of the signal SG3.

As illustrated in FIG. 43 described above, when the information processing apparatus 3 normally operates, the sensor apparatus 330, the storage 320, and the second communication unit 350 operate in the non-standby period T11. Thus, the controller can determine whether or not the operation of the information processing apparatus 3 is abnormal, based on the first operation/non-operation information included in the apparatus operation information. In a similar manner, the controller can determine whether or not the operation of the information processing apparatus 3 is abnormal based on the second operation/non-operation information, and can determine whether or not the operation of the information processing apparatus 3 is abnormal based on the third operation/non-operation information.

Further, the apparatus operation information may include operation order information, which indicates operation order among a plurality of circuits of the main apparatus 30. In this case, in provisional abnormality determination, if the operation order indicated by the operation order information included in the apparatus operation information matches reference operation order, the controller determines that the operation of the information processing apparatus 3 is normal. In contrast, if the operation order indicated by the operation order information does not match the reference operation order, the controller determines that the operation of the information processing apparatus 3 is abnormal. The reference operation order is operation order among a plurality of circuits when the information processing apparatus 3 normally operates.

For example, the apparatus operation information may include operation order information, which indicates operation order among the sensor apparatus 330, the storage 320, and the second communication unit 350 in the observation period. The operation information acquisition unit 700 can specify the operation order among the sensor apparatus 330, the storage 320, and the second communication unit 350 in the observation period, based on monitoring of respective signals SG1, SG2, and SG3. For example, the operation information acquisition unit 700 may determine that the order of the measured operation start timings of the sensor apparatus 330, the storage 320, and the second communication unit 350 corresponds to the operation order among the sensor apparatus 330, the storage 320, and the second communication unit 350 in the observation period. For example, regarding the measured operation start timings of the sensor apparatus 330, the storage 320, and the second communication unit 350, suppose the measured operation start timing of the storage 320 occurs first, the measured operation start timing of the sensor apparatus 330 occurs second, and the measured operation start timing of the second communication unit 350 occurs last. In this case, the operation order among the sensor apparatus 330, the storage 320, and the second communication unit 350 in the observation period is as follows: the operation of the storage 320 is performed first, the operation of the sensor apparatus 330 is performed second, and the operation of the second communication unit 350 is performed third.

As illustrated in FIG. 43 described above, when the information processing apparatus 3 normally operates, in the non-standby period T11, the sensor apparatus 330 operates first, the storage 320 operates next to the sensor apparatus 330, and the second communication unit 350 operates next to the storage 320. Thus, when the apparatus operation information includes the operation order information indicating the operation order among the sensor apparatus 330, the storage 320, and the second communication unit 350 in the observation period, it is indicated that the reference operation order used in provisional abnormality determination is order in which the sensor apparatus 330 operates first, the storage 320 operates second, and the second communication unit 350 operates third.

Note that the apparatus operation information may include operation order information indicating operation order between two circuits of the main apparatus 30. For example, the apparatus operation information may include operation order information indicating operation order between the sensor apparatus 330 and the second communication unit 350.

Further, the apparatus operation information may include information to be transmitted from the second communication unit 350 to the server apparatus 2. Here, the information to be transmitted from the second communication unit 350 to the server apparatus 2 may be generated in the controller 310. Thus, for example, when the signal SG3 to be monitored is a chip select signal of SPI, a clock signal, and a data input signal, the operation information acquisition unit 700 can acquire information to be transmitted from the second communication unit 350 to the server apparatus 2, based on monitoring of the signal SG3. Further, for example, when the signal SG3 is an SCL signal and an SDA signal of I2C, the operation information acquisition unit 700 can acquire information to be transmitted from the second communication unit 350 to the server apparatus 2, based on monitoring of the signal SG3. The information to be transmitted from the second communication unit 350 to the server apparatus 2 included in the apparatus operation information may be hereinafter referred to as specific transmission information.

The operation information acquisition unit 700 may use, as the specific transmission information, address information of the server apparatus 2 being a destination of the sensor information transmitted by the second communication unit 350 included in transmission information acquired based on monitoring of the signal SG3. In this case, the apparatus operation information includes the address information of the server apparatus 2 to which the second communication unit 350 transmits the sensor information. When the server apparatus 2 performs the abnormality determination processing, in provisional abnormality determination, the controller 20 after receiving apparatus operation information compares address information included in the apparatus operation information and address information of the server apparatus 2 to which the controller 20 belongs. If both the pieces of address information match, the controller 20 determines that the operation of the information processing apparatus 3 is normal. In contrast, if both the pieces of address information do not match, the controller 20 determines that the operation of the information processing apparatus 3 is abnormal. With this, when the main apparatus 30 is hacked and the information processing apparatus 3 is thereby caused to transmit sensor information to a server apparatus 2 different from an intended server apparatus 2, it is determined that the operation of the information processing apparatus 3 is abnormal. Further, when the information processing apparatus 3 performs the abnormality determination processing, in provisional abnormality determination, the controller 410 compares address information included in the apparatus operation information and address information of the server apparatus 2 to which the information processing apparatus 3 is supposed to transmit sensor information. If both the pieces of address information match, the controller 410 determines that the operation of the information processing apparatus 3 is normal. In contrast, if both the pieces of address information do not match, the controller 20 determines that the operation of the information processing apparatus 3 is abnormal. Note that the specific transmission information may be information other than the address information of the server apparatus 2.

As described above, when the apparatus operation information used in the abnormality determination processing includes operation information of at least one of the circuits of the main apparatus 30, the controller can appropriately determine whether or not the operation of the information processing apparatus 3 is abnormal. In other words, when the abnormality determination processing based on operation information of at least one of the circuits of the main apparatus 30 is performed, the information processing system 1 can appropriately determine whether or not the operation of the information processing apparatus 3 is abnormal.

For example, suppose whether or not the operation of the information processing apparatus 3 is abnormal is determined based on the operation information based on the clock signal CLK, such as the measured count. In this case, if the clock signal CLK is input into the main apparatus 30 in a manner similar to when the information processing apparatus 3 normally performs the intermittent operate despite the fact that the main apparatus 30 is hacked and the information processing apparatus 3 thereby performs operation different from intended operation, whether or not the operation of the information processing apparatus 3 is abnormal may not be determined.

In contrast, when the abnormality determination processing based on operation information of a circuit of the main apparatus 30, such as the sensor apparatus 330, is performed, whether or not the operation of the information processing apparatus 3 is abnormal can be determined even if the clock signal CLK is input into a hacked main apparatus 30 in a manner similar to when the information processing apparatus 3 normally operates. For example, if the main apparatus 30 is hacked and the operation time period of the sensor apparatus 330 is thereby caused to vary more than in a normal case in the non-standby period T11, whether or not the operation of the information processing apparatus 3 is abnormal can be appropriately determined by performing the abnormality determination processing based on the measured operation time period of the sensor apparatus 330.

Further, when the apparatus operation information includes operation information of a plurality of circuits of the main apparatus 30, whether or not the operation of the information processing apparatus 3 is abnormal can be more appropriately determined.

Further, also when the apparatus operation information includes operation order among a plurality of circuits, whether or not the operation of the information processing apparatus 3 is abnormal can be appropriately determined.

Further, also when the apparatus operation information includes information to be transmitted from the second communication unit 350 to the server apparatus 2, whether or not the operation of the information processing apparatus 3 is abnormal can be appropriately determined.

Further, when the controller 310 of the main apparatus 30 includes the clock generator 312 as illustrated in FIG. 37, the main apparatus 30 may operate based on the internal clock signal CLKp generated by the clock generator 312 despite the fact that the main apparatus 30 is hacked and the input of the clock signal CLK into the main apparatus 30 is thereby stopped. In this case, in the abnormality determination processing based on the operation information based on the clock signal CLK, whether or not the operation of the information processing apparatus 3 is abnormal may not be appropriately determined.

In contrast, when the abnormality determination processing based on operation information of a circuit of the main apparatus 30, such as the sensor apparatus 330, is performed, it can be appropriately determined that the operation of the information processing apparatus 3 is abnormal on condition that the main apparatus 30 operates based on the internal clock signal CLKp despite the fact that input of the clock signal CLK into the main apparatus 30 is stopped.

For example, when input of the clock signal CLK into the main apparatus 30 is stopped, the operation information acquisition unit 700 determines whether or not the sensor apparatus 330 operates, and includes determination result information indicating results of the determination in the apparatus operation information as the operation information of the sensor apparatus 330. In this case, in the abnormality determination processing, the controller determines that the operation of the information processing apparatus 3 is abnormal, when the controller determines that the sensor apparatus 330 operates despite the stop of input of the clock signal CLK into the main apparatus 30, based on the determination result information included in the apparatus operation information. With this, it can be determined that the operation of the information processing apparatus 3 is abnormal when the controller 310 operating based on the internal clock signal CLKp activates the sensor apparatus 330 despite the stop of input of the clock signal CLK into the main apparatus 30.

Note that, when input of the clock signal CLK into the main apparatus 30 is stopped, the operation information acquisition unit 700 may determine whether or not the storage 320 operates, and may include determination result information indicating results of the determination in the apparatus operation information as the operation information of the storage 320. Further, when input of the clock signal CLK into the main apparatus 30 is stopped, the operation information acquisition unit 700 may determine whether or not the second communication unit 350 operates, and may include determination result information indicating results of the determination in the apparatus operation information as the operation information of the second communication unit 350.

Further, the operation time period of the second communication unit 350 in the non-standby period T11 may vary along with variation of the operation end timing of the second communication unit 350 in the non-standby period T11 due to a load condition of the communication network 4, for example. This means that the measured operation time period and the measured operation end timing of the second communication unit 350 may vary due to a reason other than hacking of the main apparatus 30. Further, when the operation end timing of the second communication unit 350 varies in the non-standby period T11, the length of the non-standby period T11 varies. This means that the clock measurement value in the clock measurement period, the measured count, and the measured average value may also vary due to a reason other than hacking of the main apparatus 30. In view of this, the apparatus operation information need not include the clock measurement value in the clock measurement period, the measured count, the measured average value, the measured operation time period of the second communication unit 350, and the measured operation end timing of the second communication unit 350. With this, whether or not the operation of the information processing apparatus 3 is abnormal can be more appropriately determined.

Note that, in comparison with the configuration illustrated in FIG. 28, in the example of FIG. 44, the operation information acquisition unit 700 is provided instead of the clock measurement counter 580 functioning as an operation information acquisition unit that acquires operation information. However, in other configurations of the operation control apparatus 40, the operation information acquisition unit 700 may be provided instead of the clock measurement counter 580. For example, in the configurations illustrated in FIGS. 32, 33, 35, 39, and 42, the operation information acquisition unit 700 may be provided instead of the clock measurement counter 580.

Further, in the example of FIG. 45, the signal lines SL12, SL22, and SL32 connected to the operation information acquisition unit 700 are connected to the configurations illustrated in FIGS. 36 and 37. However, the signal lines SL12, SL22, and SL32 may be connected to other configurations of the main apparatus 30. For example, as illustrated in FIG. 48, the signal lines SL12, SL22, and SL32 may be connected to the configuration illustrated in FIG. 4. Further, the signal lines SL12, SL22, and SL32 may be connected to the configuration illustrated in FIG. 18. In such cases, for example, an activation signal to be input into the sensor apparatus 330 is adopted as the signal SG1. The signal line SL12 is connected to the signal line SL11 that allows the flow of the activation signal to be input into the sensor apparatus 330. Further, for example, an activation signal to be input into the storage 320 is adopted as the signal SG2. The signal line SL22 is connected to the signal line SL21 that allows the flow of the activation signal to be input into the storage 320. Further, for example, an activation signal to be input into the second communication unit 350 is adopted as the signal SG3. The signal line SL32 is connected to the signal line SL31 that allows the flow of the activation signal to be input into the second communication unit 350.

In the above example, the signals SG1, SG2, and SG3 are input into the operation information acquisition unit 700 through the signal lines SL12, SL22, and SL32, respectively. However, the signals SG1, SG2, and SG3 may be input into the operation information acquisition unit 700 through the first communication unit 340. In this case, the signals SG1, SG2, and SG3 transmitted by the first communication unit 340 are received in the communication unit 470 of the operation control apparatus 40. Then, the signals SG1, SG2, and SG3 received in the communication unit 470 are input into the operation information acquisition unit 700. When the first communication unit 340 transmits the signals SG1, SG2, and SG3, the state of the signals SG1, SG2, and SG3 may be illicitly rewritten in the event that the first communication unit 340 is hacked. As a result, the operation information acquisition unit 700 may not be able to appropriately acquire operation information of a specific circuit. In contrast, when the operation information acquisition unit 700 monitors the signals SG1, SG2, and SG3 flowing in the signal lines SL11, SL12, SL21, SL22, SL31, and SL32, the state of the signals SG1, SG2, and SG3 is less likely to be rewritten even if the first communication unit 340 is hacked. Consequently, the operation information acquisition unit 700 can appropriately acquire operation information of a specific circuit.

Further, the main apparatus 30 may be provided with a register for inhibiting the controller 310 from rewriting stored information, and the state of the signals SG1, SG2, and SG3 may be stored in the register. In this case, the operation information acquisition unit 700 retrieves the state of the signals SG1, SG2, and SG3 from the register, and acquires apparatus operation information, based on the retrieved state.

Further, in the above example, the apparatus operation information includes operation information of the sensor apparatus 330, the storage 320, and the second communication unit 350. However, the apparatus operation information may include operation information of another circuit of the main apparatus 30. For example, the apparatus operation information may include operation information of the processing circuit 360. Further, the apparatus operation information may include electrical energy of a circuit of the information processing apparatus 3. In this case, whether or not the operation of the information processing apparatus 3 is abnormal may be determined based on variation of the electrical energy of the circuit. For example, the apparatus operation information may include at least one of electrical energy of the controller 310, electrical energy of the second communication unit 350, and electrical energy of the entire main apparatus 30, which are likely to increase when a corresponding circuit is hacked.

Further, when apparatus operation information acquired in the clock measurement counter 580 and the operation information acquisition unit 700 is input into the server apparatus 2, the display 23 of the server apparatus 2 may display the apparatus operation information in graph form, for example.

While the information processing system 1 has been shown and described in detail, the foregoing description is in all aspects illustrative and the present disclosure is not limited thereto. Further, various examples described above can be applied in combination, on condition that such combinations remain consistent. It is therefore understood that numerous examples which have not been exemplified can be devised without departing from the scope of the present disclosure.

What is claimed is:

1. An information processing system comprising:
an information processing apparatus including circuitry having a permission target function; and
a server apparatus being configured to communicate with the information processing apparatus via a communication network, wherein
the information processing apparatus includes an operation control apparatus including circuitry configured to control the permission target function,
the server apparatus transmits operation permission information indicating operation permission for the permission target function to be performed to the information processing apparatus, in response to success in first two-way authentication processing related to the information processing apparatus, the operation permission information including period information indicating an operable period in which the permission target function is allowed to operate, wherein the operable period is a variable stored in a register,
the operation control apparatus activates the permission target function, in response to the period information included in the operation permission information received by the information processing apparatus,
the information processing apparatus performs second two-way authentication processing for receiving the operation permission information from the server apparatus with the server apparatus in the operable period indicated by the period information,
the server apparatus transmits the operation permission information to the information processing apparatus, in response to the success of the second two-way authentication processing, and
the information processing apparatus, when the information processing apparatus does not receive the operation permission information transmitted in response to the second two-way authentication processing executed in the operable period, repeatedly executes one or more additional two-way authentication processing within the operable period for receiving the operation permission information from the server again.

2. The information processing system according to claim 1, wherein
the information processing apparatus operates for a first period being shorter than the operable period after reset of the information processing apparatus is released, and perform the first two-way authentication processing in the first period.

3. The information processing system according to claim 1, wherein
the operation control apparatus acquires operation information related to operation of the information processing apparatus,
the information processing apparatus transmits the operation information acquired by the operation control apparatus to the server apparatus,
the server apparatus determines whether or not the operation of the information processing apparatus is abnormal, based on the operation information that the server apparatus receives, when the server apparatus determines that the operation of the information processing apparatus is abnormal, the server apparatus transmits operation stop information for commanding a stop of a stop target function of the information processing apparatus, and the operation control apparatus stops the stop target function, in response to reception of the operation stop information in the information processing apparatus.

4. The information processing system according to claim 1, wherein the operation control apparatus acquires operation information related to operation of the information processing apparatus, the information processing apparatus transmits the operation information acquired by the operation control apparatus to the server apparatus, the server apparatus determines whether or not the operation of the information processing apparatus is abnormal, based on the operation information that the server apparatus receives, and when the server apparatus determines that the operation of the information processing apparatus is abnormal, the server apparatus does not transmit the operation permission information despite success of the second two-way authentication processing.

5. The information processing system according to claim 1, wherein the operation control apparatus acquires operation information related to operation of the information processing apparatus, and determines whether or not the operation of the information processing apparatus is abnormal, based on the acquired operation information.

6. The information processing system according to claim 5, wherein when the operation control apparatus determines that the operation of the information processing apparatus is abnormal, the operation control apparatus stops a stop target function of the information processing apparatus.

7. The information processing system according to claim 1, wherein the operation control apparatus acquires operation information related to operation of the information processing apparatus, the information processing apparatus transmits the operation information acquired by the operation control apparatus to the server apparatus, the server apparatus determines whether or not the operation of the information processing apparatus is abnormal, based on the operation information that the server apparatus receives, the information processing apparatus performs intermittent operation, and the operation control apparatus acquires information related to the intermittent operation as the operation information while the information processing apparatus performs the intermittent operation.

8. The information processing system according to claim 1, wherein the operation control apparatus acquires operation information related to operation of the information processing apparatus, the information processing apparatus transmits the operation information acquired by the operation control apparatus to the server apparatus, the server apparatus determines whether or not the operation of the information processing apparatus is abnormal, based on the operation information that the server apparatus receives, and the operation information includes first operation information related to the operation of the information processing apparatus, the first operation information being acquired by the operation control apparatus based on a clock signal for activating a first circuit being configured to implement the permission target function.

9. The information processing system according to claim 1, wherein the operation control apparatus acquires operation information related to operation of the information processing apparatus, the information processing apparatus transmits the operation information acquired by the operation control apparatus to the server apparatus, the server apparatus determines whether or not the operation of the information processing apparatus is abnormal, based on the operation information that the server apparatus receives, and the operation information includes second operation information related to at least one circuit of the information processing apparatus, other than the operation control apparatus.

10. The information processing system according to claim 9, wherein the second operation information includes at least one of an operation time period, operation start timing, and operation end timing of a third circuit included in the at least one circuit.

11. The information processing system according to claim 10, wherein at least one of the operation start timing and the operation end timing is represented as time.

12. The information processing system according to claim 9, wherein the second operation information includes operation order among a plurality of third circuits included in the at least one circuit.

13. The information processing system according to claim 9, wherein the operation control apparatus acquires the second operation information, based on monitoring of a signal flowing in a signal line being connected to the at least one circuit.

14. The information processing system according to claim 1, wherein the operation control apparatus stops the permission target function by controlling a signal to be input into a circuit being configured to implement the permission target function or by stopping supply of power to the circuit being configured to implement the permission target function.

15. The information processing system according to claim 14, wherein the operation control apparatus stops the permission target function by stopping supply of a clock signal for activating the circuit being configured to implement the permission target function to the circuit or by asserting a reset signal to be input into the circuit being configured to implement the permission target function.

16. The information processing system according to claim 1, wherein
the operation control apparatus and a circuit being configured to implement the permission target function are contained in packages different from each other.

* * * * *